US006470242B1

(12) United States Patent
Rudow et al.

(10) Patent No.: US 6,470,242 B1
(45) Date of Patent: *Oct. 22, 2002

(54) DISPLAY MONITOR FOR GOLF CART YARDAGE AND INFORMATION SYSTEM

(75) Inventors: Richard W. Rudow, Mesa; John Coffee, Gilbert; Douglas L. Lecker; Kirk H. Bingeman, both of Chandler; Robert D. Camiano, Phoenix, all of AZ (US)

(73) Assignee: Prolink, Inc., Tempe, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/818,916

(22) Filed: Mar. 28, 2001

Related U.S. Application Data

(63) Continuation of application No. 09/259,344, filed on Mar. 1, 1999, now Pat. No. 6,236,940, which is a division of application No. 08/525,905, filed on Sep. 8, 1995, now Pat. No. 6,236,360, which is a continuation-in-part of application No. 08/423,295, filed on Apr. 18, 1995, now Pat. No. 5,689,431.

(51) Int. Cl.[7] .............................. G05D 1/00; G01S 5/00
(52) U.S. Cl. ........................................... 701/1; 701/300
(58) Field of Search ........................... 701/1, 300, 207, 701/208, 211

(56) References Cited

U.S. PATENT DOCUMENTS

| 1,806,059 | A | 5/1931 | Hoople |
| 1,868,031 | A | 7/1932 | Sudbrink |
| 1,944,468 | A | 1/1934 | Schaffner |
| 3,531,178 | A | 9/1970 | Wirth |
| 4,014,589 | A | 3/1977 | Yerkey |
| 4,032,222 | A | 6/1977 | Lapeyre |
| 4,100,372 | A | 7/1978 | Hypolite |

(List continued on next page.)

Primary Examiner—Michael J. Zanelli
(74) Attorney, Agent, or Firm—Blank Rome Comisky & McCauley LLP

(57) ABSTRACT

A player position determining and course management system for a golf course having a plurality of roving units for use by players in playing the course is disclosed. Each roving unit includes a central processing unit (CPU) including a data processor for executing various tasks ranging from fastest-execution of a task to slowest execution of a task on a schedule of priorities of task completion, a real-time means for controlling the processor to give the tasks priority ranging from fastest execution of a task with highest priority to slowest execution of a task with lowest priority, and a means for precisely timing functions of the system including modulating means utilizing a common digital modulation technique for digitally modulating data transmitted to and from all of the roving units. Each of the roving units include a monitor for displaying the golf course including each of the holes with its tee box, fairway, green, cup and hazards, as well as the position of the roving unit on the course in real time. Additionally, the system includes a course management base station for transmitting and receiving information to the roving units and a monitor for displaying the location of each roving unit on the golf course in real time.

11 Claims, 19 Drawing Sheets

U.S. PATENT DOCUMENTS

| | | |
|---|---|---|
| 4,101,159 A | 7/1978 | Stewart |
| 4,235,523 A | 11/1980 | Lapryre |
| 4,241,870 A | 12/1980 | Marcus |
| 4,419,655 A * | 12/1983 | May |
| 4,505,054 A | 3/1985 | Clark et al. |
| 4,521,078 A | 6/1985 | Baeger |
| 4,640,199 A | 2/1987 | Zigman |
| 4,650,238 A | 3/1987 | Healey |
| 4,668,026 A | 5/1987 | Lapeyre et al. |
| 4,684,164 A | 8/1987 | Durham |
| 4,818,010 A | 4/1989 | Dillon |
| 4,837,551 A | 6/1989 | Iino |
| 4,867,498 A | 9/1989 | Delphia et al. |
| 4,908,611 A | 3/1990 | Iino |
| 5,004,320 A | 4/1991 | Nagai et al. |
| 5,040,990 A | 8/1991 | Suman et al. |
| 5,050,922 A | 9/1991 | Falcoff |
| 5,064,974 A | 11/1991 | Vigneau et al. |
| 5,095,430 A | 3/1992 | Bonito et al. |
| 5,096,271 A | 3/1992 | Portman |
| 5,127,044 A | 6/1992 | Bonito et al. |
| 5,344,020 A | 9/1994 | Ferguson |
| 5,381,267 A | 1/1995 | Woody |
| 5,438,518 A * | 8/1995 | Bianco et al. |
| 5,486,840 A | 1/1996 | Borrego et al. |
| 5,524,081 A * | 6/1996 | Paul |
| 5,589,849 A | 12/1996 | Ditzik |
| 5,596,246 A | 1/1997 | Budzilek et al. |
| 5,662,395 A | 9/1997 | Lechman |
| 5,697,176 A * | 12/1997 | Kuni et al. |
| 5,745,292 A | 4/1998 | Jones |
| 5,822,023 A | 10/1998 | Suman et al. |
| 5,871,251 A | 2/1999 | Welling et al. |
| 5,927,792 A | 7/1999 | Welling et al. |

\* cited by examiner

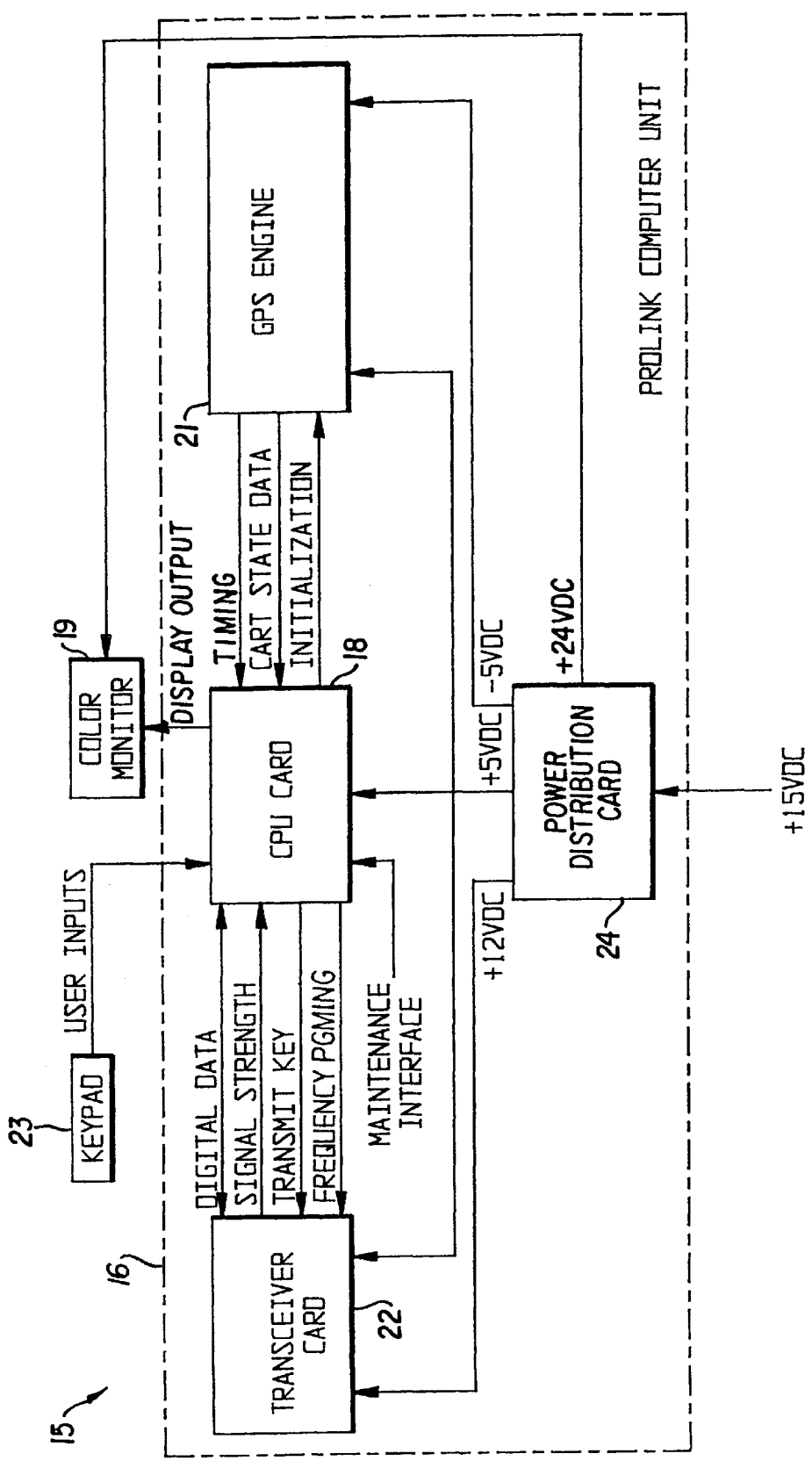

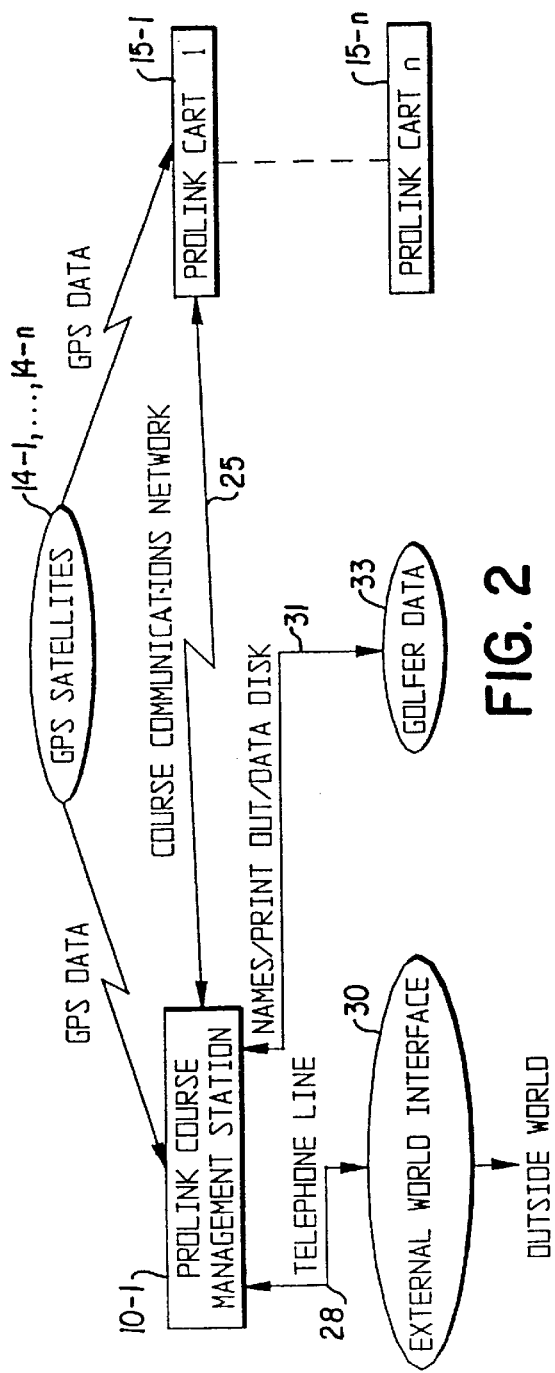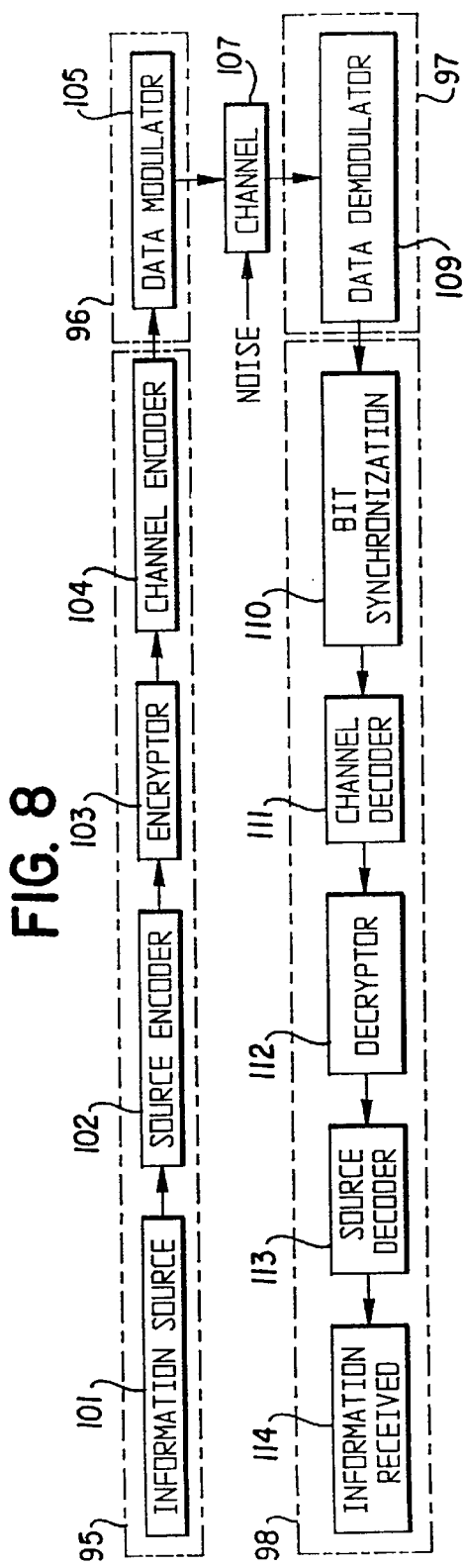

* FRAME RATE = 1 PER SECOND

* EACH FRAME CONTAINS:
  1. DGPS CORRECTION PACKET
  2. CMC PACKET
  3. CART NETWORK ENTRY PACKET
  4. CART STATE PACKET

* ANY NUMBER OF ADDITIONAL FRAMES CAN BE ADDED INTO THE NETWORK AT ANY TIME.

FIG. 17
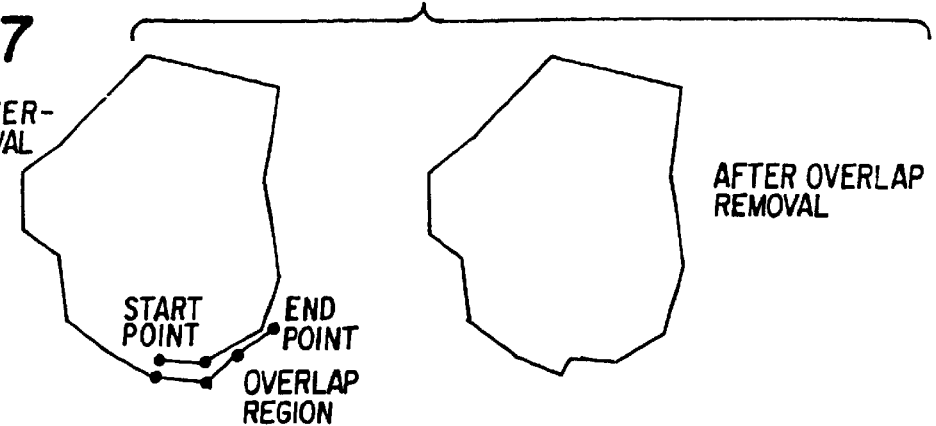
BEFORE OVERLAP REMOVAL
AFTER OVERLAP REMOVAL
START POINT
END POINT
OVERLAP REGION
FIG. 18
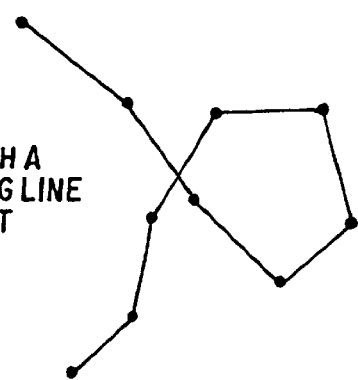
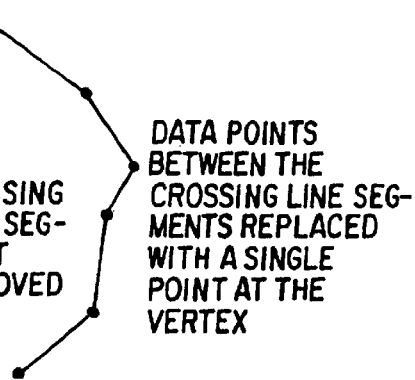
DATA WITH A CROSSING LINE SEGMENT
CROSSING LINE SEGMENT REMOVED
DATA POINTS BETWEEN THE CROSSING LINE SEGMENTS REPLACED WITH A SINGLE POINT AT THE VERTEX
FIG. 20
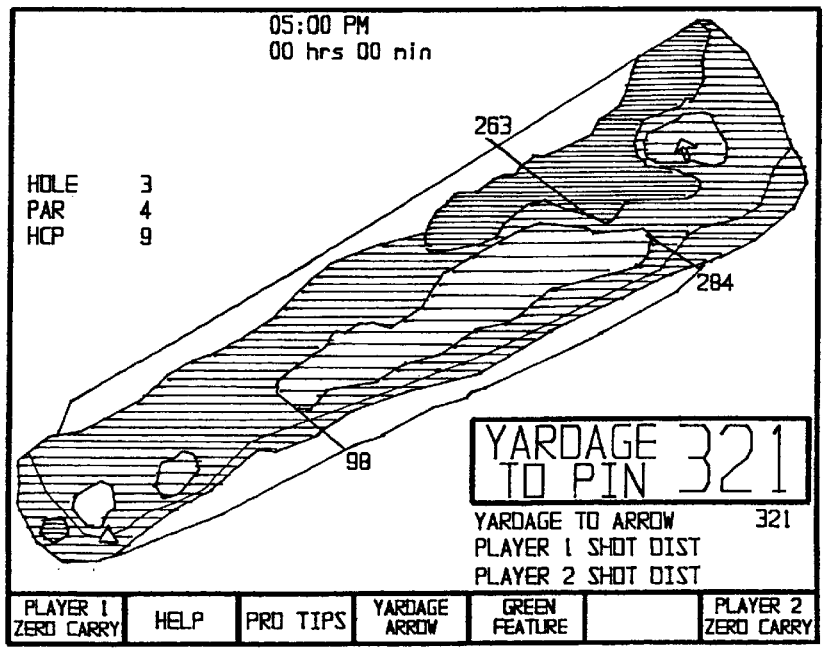

d4 EXCEEDS THE MAXIMUM ERROR, THEREFORE RETAIN POINT 5

LEAST SQUARES IN ADJUSTMENT FOR POINT 5

FIG. 25

CURRENT PLAY TIMES

| HOLE---> | 1 | 2 | 3 | 4 | 5 | 6 | 7 | 8 | TOTAL TIME | TARGET TIME | AHEAD/ BEHIND |
|---|---|---|---|---|---|---|---|---|---|---|---|
| TARGET-> | 16:00 | 15:00 | 10:00 | 16:00 | 15:00 | 10:00 | 15:00 | 15:00 | | | |
| CAR | | | | | | | | | | | |
| 093 | 15:30 | 15:10 | 09:50 | 15:20 | 14:10 | 09:30 | 15:10 | 14:40 | 4:07:10 | 4:14:00 | 0:06:50 |
| 010 | 15:50 | 15:10 | 10:20 | 15:10 | 14:40 | 10:20 | 15:00 | 15:20 | 3:20:20 | 3:19:00 | 0:01:20 |
| 012 | 15:40 | 15:20 | 10:10 | 15:20 | 14:50 | 10:10 | 15:10 | 15:10 | 3:20:20 | 3:19:00 | 0:01:20 |
| 034 | | | | | | | | | | | |
| 108 | | | | | | | | | | | |
| 068 | | | | | | | | | | | |
| 005 | | | | | | | | | | | |
| 006 | | | | | | | | | | | |
| 007 | | | | | | | | | | | |
| 008 | | | | | | | | | | | |
| 009 | | | | | | | | | | | |
| 011 | | | | | | | | | | | |
| 013 | | | | | | | | | | | |
| 014 | | | | | | | | | | | |
| 015 | | | | | | | | | | | |
| 016 | | | | | | | | | | | |
| 017 | | | | | | | | | | | |
| 018 | | | | | | | | | | | |
| 019 | | | | | | | | | | | |
| 020 | | | | | | | | | | | |

↑ - UP         ↓ - DOWN         PgUp - UP 20 CARS         PgDn - DOWN 20 CARS

ESC - EXIT->   → - RIGHT        HOME - LEFT 8 HOLES       END - RIGHT 8 HOLES

DISPLAY MONITOR FOR GOLF CART YARDAGE AND INFORMATION SYSTEM

RELATED APPLICATIONS

This application is a continuation of Ser. No. 09/259,344, filed Mar. 1, 1999, now U.S. Pat. No. 6,236,940, which is a division of Ser. No. 08/525,905, Sep. 8, 1995, now U.S. Pat. No. 6,236,360, which is a continuation-in-part of Ser. No. 08/423,295, filed Apr. 18, 1995, now U.S. Pat. No. 5,689,431.

BACKGROUND OF THE INVENTION

The present invention relates generally to yardage systems and more particularly to a new and improved golf course yardage and information system.

Before starting play on an unfamiliar or infrequently played course, golfers typically familiarize themselves with the layout of each hole. This gives the golfer the knowledge at the tee box of a particular hole being played, for example, as to whether the hole is a 'dog leg left', a 'dog leg right', or straight; whether any hazards, such as sand traps, bunkers, and water traps, are hidden from view; whether and where the range is posted to calculate yardage from the ball's (and the golfer's) present location to the front of the green, the rear of the green, the pin, a key hazard, or a desired lay up position for the green approach shot.

Customarily, golf courses market informative books on the course in the pro shop, to indicate layout features for each hole and yardage from a few locations along the hole to the center of the green. Also, yardage markers typically are provided on sprinkler heads along the route of each hole, so that the player will know the range from that point to the center of the green. These playing aids provide information on the hole layout and location of hazards, and also allow the golfer, by pacing off yardage from the ball to the nearest sprinkler head, to estimate yardage from the ball to the center of the green. Such measures are by no means precise, but do enhance one's knowledge of the hole, and thereby, an opportunity to improve one's game. They also exact a cost—slowing the pace of play of every golfer behind the one or more who are familiarizing themselves with the course, pacing off yardage, and so forth. Slow play has an adverse effect on the course's daily revenue, as well as on other players' enjoyment of the game.

Various proposals have been made toward improving golf course information systems. The intent of these ostensible improvements has been to reduce the average player's score; to increase enthusiasm and speed of play; and to enhance the player's knowledge of the course regarding every hole, the yardage from the ball or "lie" to the green, the distance and bearing to the pin, and the location of hazards. Proposals have included use of buried electrical wires in various layout configurations about the course for interaction with mobile overland components such the golf information system disclosed in U.S. Pat. No. 5,044,634 to Dudley. Other proposals utilize radio direction finding or triangulation techniques, to inform the golfer of gross features of the course and distances from specific markers to the pin or flag for the hole being played such as those described in U.S. Pat. No. 4,703,444 to Storms, Jr. and U.S. Pat. No. 5,056,106 to Wang.

U.S. Pat. No. 5,364,093 to Huston ("Huston") discloses a position and distance measuring system for a golf course that uses the capabilities of the existing U.S. government-sponsored Global Positioning System (GPS) which was established over the last 20 years with space satellites and ground based stations. The GPS system was established as a means for determining distance, range, and position for various governmental purposes, but has become quite useful in many industrial and commercial applications as well. A number of earth-orbiting satellites provide reference points from which to determine the position of a point on or near the earth, using the ground-based receivers. The orbits of these satellites are monitored by the ground station GPS receivers, and the travel times of signals received from the satellites are used to measure distance to each satellite. Each signal from a satellite is coded to permit the receiver to determine the elapsed time between transmission of the signal from the respective satellite and reception at the GPS receiver antenna, and thereby to calculate the distance as the product of that elapsed time and the speed of light. Receivers need not be restricted to large ground stations, but are available in portable, mobile and hand-held versions, for a multitude of private navigation, position and distance-measuring systems.

Distance measurements to three GPS satellites can accurately define the position of an object (i.e., that of the GPS receiver, whether of the stationary or portable type) on or near the surface of the earth. A fourth satellite provides a distance measurement that serves to verify clock timing within the GPS system. With several satellites in "view", and through the use of a computer, the GPS receiver theoretically can calculate distances virtually instantaneously with great accuracy. In practice, however, even small errors that typically occur in the calculated measurement of satellite signal travel time from system and natural phenomena severely reduce the accuracy of the distance and position calculations. Error causing phenomena include atmospheric propagation, receiver contributions, satellite ephemeris, and satellite clock. Furthermore, the U.S. Department of Defense (DOD) purposely introduces errors in the satellite signals to deny civilian users full accuracy. The combined effect of these errors can be as high as 100 meters or so. Erroneous measurements of this magnitude may be tolerated in many GPS-based measurement systems, but would be unacceptable in a golf course positioning and distance measuring system.

Huston proposed a golf course GPS system which employs purely conventional differential GPS, which has found wide use to reduce errors in distance measuring systems. The differential GPS (DGPS) system broadcasts error correction information from a ground receiver of known location in the vicinity of the user. Two GPS receivers are used, one at a known fixed position, so that the difference between that known position and its position calculated from the satellite GPS signal fixes the error in the signal. The fixed position (reference) receiver provides a continuous correction for use by all other receivers, which may be mobile, within its reception area. Knowledge of the error allows all distance and position calculations at the user's receiver to be corrected. Conventional DGPS can reduce errors in position calculations to allow accuracies of within about five meters—quite suitable for most commercial needs, but still unacceptable for a golf course distance measuring system. However, the same conventional DGPS system may be used to determine the location of a golf cart receiver relative to the pin on a hole of a golf course as to determine the location of a ship relative to a land-based point of interest. Weather conditions and terrain have little effect on position determination in the GPS system, and few restrictions are imposed on size or location of a user's receiver.

Details of DGPS are readily available from a number of sources, an example being Blackwell, "Overview of Differential GPS Methods", *Global Positioning System,* vol. 3, pp. 89–100, The Institute of Navigation, Washington, D.C. (1986). The Blackwell (Stanford Research Institute International) paper details four differential GPS techniques, one of which is virtually identical to the previously proposed GPS-based golf course positioning system.

It is a principal object of the present invention to provide a new and improved golf course yardage and information system utilizing DGPS.

Another object of the present invention is to provide such a system having considerably greater accuracy and reliability than is available with conventional DGPS by utilizing unique filtering algorithms.

Another object of the present invention is to provide such a system having a communications network between a base station and golf carts that efficiently utilizes its allocated bandwidth for data transmission while being relatively inexpensive thereby achieving low cost for the overall system.

Another object of the present invention is to provide such a system with a variable length communication network for such a system for easily and efficiently adding or removing golf carts from the network.

Another object of the present invention is to provide such a system with the capability of creating, storing and displaying high resolution color graphics such as a layout of all or a selected group of holes of the course on the base station monitor, and a layout of the current hole and color advertisements on the monitors in each of the golf carts.

Another object of the present invention is to provide an improved technique and method of surveying the layout of the golf course and collecting data therefrom for post-processing and storing of such data for later retrieval and display.

Another object of the present invention is to provide such a system having the capability of detecting when the golf carts are within predetermined zones or regions of the golf course for use in unique system features such as automatic display of the current hole on the monitor of each golf cart, measuring the pace of play for each hole, and automatic pop-up advertisements on the monitor of each golf cart as the carts transition from one hole to the next.

Another object of the present invention is to provide an improved technique and method for mounting a monitor to the roof of a golf cart for exceptional color readability in sunlight.

SUMMARY OF THE INVENTION

Before summarizing the best mode presently contemplated for practicing the golf course yardage and information system of the invention, it bears emphasis that the present invention is not limited to providing distances and information in the context of golf courses. Rather, it may be extended to any number of other consumer, commercial, and industrial applications of satellite navigation and digital communications technology. The present invention will be described in the context of a golf yardage and information system, embodied in what is referred to herein as the PROLINK[1] yardage and course management system (or more briefly, as the "PROLINK system"), but the invention is not limited to use on or for a golf course.

[1]PROLINK is a federally registered trademark of Leading Edge Technologies, Inc. of Chandler, Ariz., the assignee of the invention disclosed in this patent specification.

The PROLINK system includes a golf cart-based subsystem, although it may be packaged alternatively or additionally into a hand-held unit carried by the golfer. Both such versions are included within the generic terminology of a mobile unit, a portable unit, or a roving unit. Each roving unit utilizes state-of-the-art DGPS technology, with considerable enhancement by the features and aspects of the present invention, incorporated in hardware and software.

The PROLINK system possesses the capability to create, store, and display a color or black and white graphical representation or map of the golf course on a video monitor in the cart (or on a liquid crystal display ("LCD") of a hand-held unit). Each hole of the course is selectively displayed with all of its hazards and features, with the golfer's fixed or changing position (strictly speaking, the cart's position) superimposed thereon in real time during play of the hole. The system provides the golfer with an accurate measurement of the distance (typically, in yards) from the current tee box to the current pin placement (both of which may be subject to daily change by the course administrator), as well as from any other location of the cart on a hole to the pin or any other feature of the hole. In essence, an "electronic yardage and hole feature book" is presented by which to enhance club selection for each lie of the ball during play.

An ancillary feature of the PROLINK system is its capability to display personal messages to a golfer at a selected cart, as well as to provide informative tips ("pro tips") at specific holes, and system-wide advertising and promotional messages. The PROLINK system includes a course management subsystem that enables the course administrator (typically the golf professional who operates the pro shop) to track the location of and to communicate selectively with each golfer or all golfers on the course, to monitor and improve the pace of play, and to compile a statistical data base on course operations. Personal messages may be sent to the selected carts and emergency or other overall messages may be sent system-wide at any time, while "pro tip", advertising or promotional messages may be activated based on the cart's location on the course, such as the time between exiting the green of a hole to entering the tee box of the next hole.

The cart-based or other type of roving unit of the PROLINK system provides advantages to the golfer without burdening or significantly changing the way the course or any particular hole is played, or how business is conducted by course management. Such advantages include (1) real-time, accurate indications of distance (typically within two meters) from the cart to significant course features—green, pin, hazards in fairway, etc., (2) a large (e.g., 7.5-inch), high resolution, color display of a map of entire course, individual hole, or green or other detailed features, on the cart monitor, and (3) the capability of individualized communications and messaging to and from the cart.

The position of the cart is displayed in real time on the map of the hole being played, both on the individual cart monitor and a monitor at the course management station. As the cart moves, the yardage-to-pin and yardage to hazard calculations are automatically updated on the display. According to a related feature of the invention, a separate movable cursor on the display allows the player—by simply appropriately positioning the cursor—to obtain a precise yardage measurement to any feature shown on the hole map. Another feature is the capability to read the shot distance of each shot by simply pressing a "shot distance" button adjacent the display.

The golfer may selectively view the entire course layout or obtain a display of an individual hole, in full color, before, during, or after play. An automatic zoom feature increases the selected target area resolution, such as to view the contour of the green or the details of a particular hazard. If desired, the roving unit can record an entire game—stroke-by-stroke—to allow it to be replayed at home or elsewhere from a computer disk as it was originally displayed on the cart monitor. Alternatively, a "hard copy" printout of each shot, from tee to fairway to green, may be obtained from a club house computer. The player can thus analyze the game, and devote time to problem areas to improve skills before the next round of play.

The most significant decision on each shot is selection of the golf club to play the lie relative to the pin location, hazards, and so forth. The PROLINK system enables the player to make consistently better and faster club selection. At the same time, the system enables the golfer to correct natural inconsistencies in swing that may otherwise be attributable to inadequate information concerning target distance and course layout.

In operation of the system, the hole display and yardage functions in the cart system are activated automatically at the beginning of each hole. Yardage from the roving unit to the pin and to key hazards such as traps and water are displayed and updated at all times on the display as these features are viewed. Four arrow keys allow the player to move a cursor around the hole display and obtain yardage to any point on the course. A single button press may, for example, provide a pro tip created by the course golf professional, or a blow-up of the green complete with contour lines for the critical approach shot. In addition, the player's driving distance is displayed automatically after a tee shot, and the distance to the pin for the next shot is available automatically. After the player reaches the green, a screen allows advertising, promotional messages, and any other information, such as course trivia, to be displayed. When the player approaches within a fixed distance of, or reaches the next tee, the PROLINK system automatically moves to the next hole layout display for continuing play. Furthermore, the PROLINK system is non-intrusive in that a user could play an entire round of golf without pressing a single button and still obtain precise yardage to the daily pin placement and key hazards. Rather, the user is only required to interact with the system for advanced features such as pro-tips, enhanced green views or shot distance to name a few.

The course management portion of the PROLINK system includes a base station computer unit, receiver/transmitter unit and video monitor in the clubhouse (or other desired location) to give the course administrator better insight into daily operations and revenues. Principal advantages of the course management portion include (1) the capability to identify, locate and monitor movement of every golf cart on the course in real-time, with precise positioning during play on each hole, (2) use of that knowledge to pinpoint location and analyze cause of bottlenecks, toward improving speed of play, and greater enjoyment by all players, (3) compilation of an extensive computerized data base to provide management and designated staff personnel with accurate statistical insight into course operations and techniques for instituting improvements, and (4) availability of a convenient source of communication and messaging to all roving units, with potential concomitant revenue enhancement through advertising and promotions.

The data compiled as part of the club's data base is readily used for management information system ("MIS") reporting to management and board members, and to provide reports complete with tables, charts and graphs on an as-needed basis for club members and players, or, in the case of municipal and other public courses, to provide necessary reports to the appropriate authorities as well as statistical and course information to players. The compiled data may include date and times rounds were commenced, player names for each round, tee times, actual start times, actual finish times, time required for each round, time required for each hole, strokes per hole, daily pin placements, and total rounds, by way of example.

The size of a golf course's ranger staff may be reduced by virtue of having a wealth of information available to the course administrator from the PROLINK system. Despite their fewer number, the rangers may be used more efficiently by dispatching them to precise locations where bottlenecks or other barriers to efficient play are occurring. Each roving unit is assigned a unique ID number which is transmitted by the system for periodically monitoring (and displaying) (e.g., every 2 to 16 seconds, depending upon the number of carts on the course) each unit during play, for identifying selected golfers for messages, or those who may be causing problems, or for other purposes.

In particular, the PROLINK course management system includes a Course Management Computer (CMC), with a combination of radio frequency (RF) data links and personal computer (PC) modem links that allow the base station and golf carts to communicate and share information with one another. The network communication system of the PROLINK system employs a cost-effective and bandwidth efficient technique for the transmission of data between the base station and the golf carts. Frequency shift keying (FSK) is the modulation technique chosen for data transmission because FSK is both inexpensive and simple to implement thereby minimizing cost of the overall PROLINK system. Although FSK lacks bandwidth efficiency relative to other, more costly, modulation techniques, such as phase shift keying (PSK), the PROLINK system makes very efficient use of available bandwidth by employing a precise, time controlled time division multiplexed (TDM) scheme that is synchronized to a precise pulse per second (PPS) signal available from a GPS receiver for allocating to each cart and the base station a precise time to transmit its respective data. This ensures that when one cart is transmitting, all other carts as well as the base station are not transmitting. Such a precise, time controlled TDM communication network obviates the need for the base station to poll each of the carts to request it to send information and, thus, substantially increases the bandwidth efficiency of the communication network.

The PROLINK system also employs a unique technique and method for collecting data indicative of the layout of the golf course including such features as tee boxes, greens, fairways, water hazards and sand traps. Such collected data is then post-processed and efficiently stored in memory in vector form for later retrieval and display. Moreover, once the data representing the golf course is stored in memory, such data can be used to efficiently determine the location of a golf cart relative to predetermined zones or regions. To that end, the PROLINK system utilizes a unique zone detection algorithm and creates a number of different zones corresponding to actual areas or objects on the golf course. For example, zones are created corresponding to a tee box area or a green area of a particular hole on the course. Accordingly, the PROLINK system has the capability to detect a golf cart to be within an actual area on the golf course when the coordinates of the golf cart lie within the corresponding zone.

By the use of such a zone detection algorithm, various features of the PROLINK system are readily implemented. Such features include automatic hole display on the cart monitor as the cart enters the tee box zone of a new hole, and automatic pop-up, high resolution, color advertisements when the cart is in transition from one hole to the next. Additionally, the speed of play for a hole may be obtained by measuring the time from when a golf cart enters the tee box zone of a hole to when the cart exits the green zone of that hole.

Although use in connection with golf course operations is of principal interest, the PROLINK system architecture can be utilized for mapping and location information as well as command and control capabilities for mass transit, forestry, express package services, shipping, and other applications.

BRIEF DESCRIPTION OF THE DRAWINGS

The above and still further objects, features, aspects and attendant advantages of the present invention will become apparent from a consideration of the following detailed description of the best mode presently contemplated for practicing the invention, with reference to a preferred embodiment and method, in conjunction with the accompanying drawings, in which:

FIGS. 1A, 1B, and 1C are, respectively, a simplified diagram of a portion of the PROLINK system in use on a golf course, a block diagram of the principal electronic components of a cart-based PROLINK computer unit of the system, and the visual display mounted on the interior of the roof of a cart for viewing by the occupants;

FIG. 2 is a simplified block diagram of the overall PROLINK system;

FIG. 8 is a block diagram of the PROLINK system communication processing;

FIG. 17 is a pictorial diagram illustrating the results of a portion of the post processing algorithm for removing overlapping segments;

FIG. 18 is a pictorial diagram illustrating the results of a portion of the post processing algorithm for removing crossing line segments;

FIG. 20 is a pictorial diagram illustrating a digital map of a hole on the golf course showing distances from the cart to pin and from the cart to various markers to be displayed on a monitor of the cart;

FIG. 25 is a pictorial diagram illustrating the pace of play feature for displaying holes times on a monitor of the base station course management computer.

DETAILED DESCRIPTION OF THE PREFERRED EMBODIMENT AND METHOD

Figure 1A:
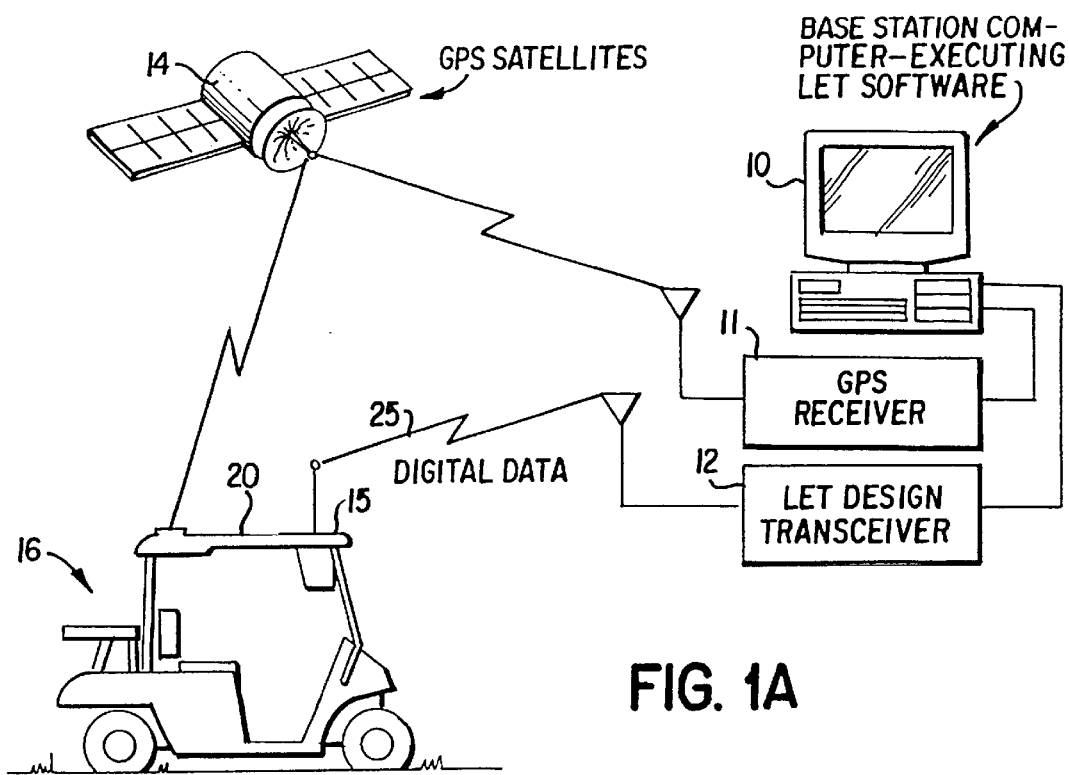

Referring to FIG. 1A, a presently preferred embodiment of the PROLINK system includes a base station 10 (sometimes referred to as the course management station, or CMS) located at a convenient place on the golf course premises such as in the clubhouse (preferably, in the pro shop). The CMS includes a computer (sometimes referred to herein as the course management computer, or CMC). The present invention also includes software to be described hereinafter for execution by the CMC. A related GPS receiver 11 (a Navstar XR5-M6 GPS receiver in the preferred embodiment) receives transmissions from GPS satellites such as 14, and a transceiver 12 provides two-way radio frequency (RF) communication with a multiplicity of mobile receivers which may be cart-based (as at 15) or hand-held units (handsets, not shown). From time to time, the mobile units will be referred to herein as roving units. In the preferred embodiment, each roving unit is cart-based, i.e., installed on its own golf cart 16, but could be a hand held unit, if desired.

Figure 1C:
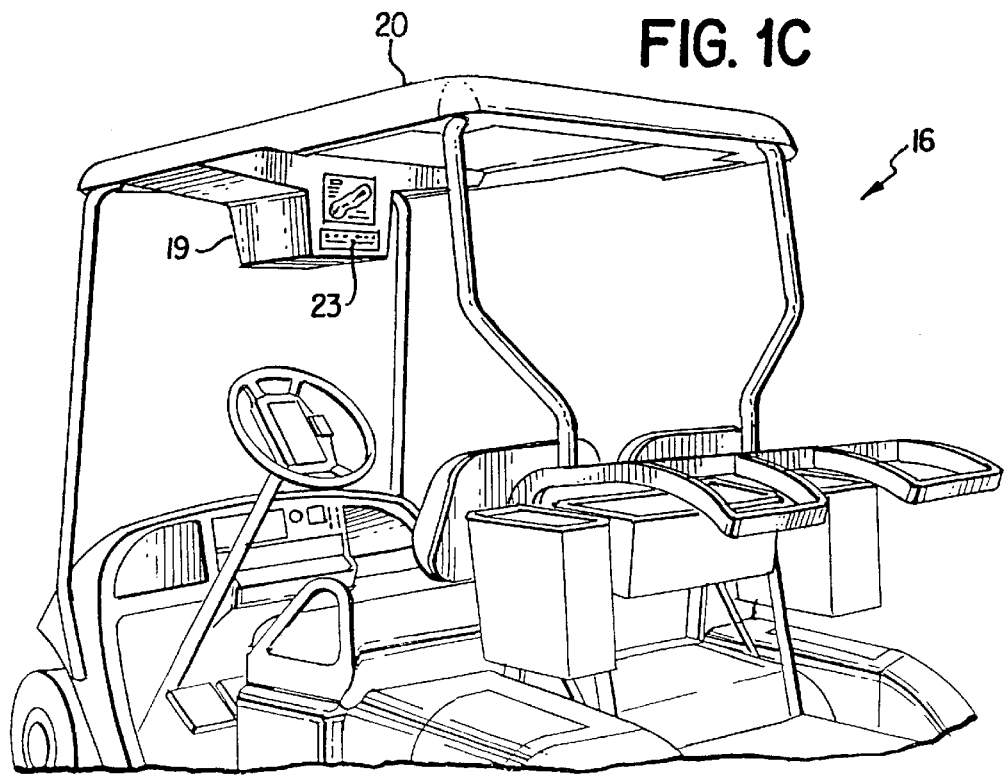

Each roving unit provides the user with a high resolution visual image of the course hole being played on display monitor 19 of FIG. 1C, and simultaneously displays accurate distance measurements from the roving unit to the pin for that hole. The Prolink system acquires conventional GPS data transmitted from all GPS satellites in view (i.e., capable of being received by an ordinary GPS receiver in proximity to the golf course). CMC 10 includes a computer with a central processing unit (CPU) and video monitor.

Referring to FIG. 1B, the cart-based unit (CBU) 15 includes a cart-based PROLINK Computer Unit (PCU) 16 including CPU/video card 18, GPS receiver 21, an RF digital data transmitter/receiver (transceiver) card 22, and a power distribution card 24. CBU 15 further includes color monitor 19, for displaying a digital map of the golf course as well and various information to be discussed presently, and keypad 23 for selecting various PROLINK user options as will also be discussed presently.

The monitor 19 is shown in somewhat more detail in FIG. 1C. It is mounted at the underside of the roof 20 of golf cart 16, and is turned on (together with the other electronics in the cart-based unit) at the time the cart is checked out from the course cart shop. Except for an advertising display presented prior to play and between holes, the monitor normally displays the layout of the hole being played, and this is done automatically (as the default display) as the cart approaches within a predetermined distance of the tee boxes for the hole. Alternatively, the user (typically, the golfer playing the course, although maintenance people and others may at times use the cart) may select some other option at any particular time by operating keypad control buttons 23 on a control panel mounted just under the monitor in the cart roof. The components of cart-based PCU 16 will be described in more detail later.

FIG. 2 is a simplified block diagram of an exemplary overall PROLINK system. GPS data transmitted by GPS satellites 14-1, . . . , 14-n is received by the PROLINK course management station (CMS) 10 and simultaneously at the cart-based units of the Prolink system 15-1, . . . , 15-n. An RF course communication network 25 is established via the transceivers between the course base station 10 and the carts 15 for transmission of advertising, general information, system-wide and individual cart messages from the base station, DGPS corrections, and transmission of messages from the carts to the base station. A telephone line 28 provides a data/voice/fax communication link between the base station constituting the course management station (CMS) 10 and an interface 30 to the outside world.

The golf carts in which the roving units are installed are normally garaged at a course cart shop when not in use. The cart attendant, who obtains identification from each golfer/renter at the time the cart is checked out, may record this information for subsequent entry of the golfer's name and the ID number of the respective cart into CMS 10 for correlation purposes. With this information available for instant readout, any personal messages that may need to be directed to a player during a round of golf can be communicated to that player's cart anywhere on the course.

Also, when players return their cart to the attendant, the data on the round captured and stored in the cart-based computer is readily transmitted to CMS 10 via transmission line 31 and a print out may be generated in the clubhouse for pick-up and use by the golfer.

While the preferred embodiment of the PROLINK system uses DGPS, it is possible to take advantage of certain features of the present invention in other position determining or distance measuring systems. Such other systems might include dead reckoning navigation, inertial navigation (a form of dead reckoning), LORAN C, Omega, Transit satellites, and radio direction finding, to name a few. In a typical commercial GPS system, the fixed base station/GPS receiver is located at a precise survey point and satellite computed position. In a golf position determining application, such as the PROLINK system, the position error attributable to GPS (as a consequence of signal degradation due to selective availability and the Earth's atmosphere) is common to the base station and all roving units of the system.

The five meter accuracy attainable with DGPS still represents considerable error from the viewpoint of the golfer seeking to determine yardage from his or her ball lie to pin placement on the hole. The PROLINK system, however, employs certain unique filtering algorithms for improving yardage accuracy, to be described hereinafter, that reduce the remaining error so as to obtain position accuracy of less than two meters. The system also provides the capability to perform differential GPS positioning without need for a precise base station survey point.

It is imperative, of course, that the base station 10 and the golf carts (the CBU) 15 be adapted to communicate with each other in a robust, reliable manner, and that capability is a feature of the PROLINK system. Additionally, both the CMS 10 and the CBU 15 must be capable of assimilating the collected information. The PROLINK system provides for data assimilation in a full color electronic digital map of the overall course and each hole.

Information transmitted from the CMS 10 to each CBU 15 includes DGPS corrections for CBU computation of position, velocity, and distances. Also, network control data provides essential timing information for the base station/cart communications, messages, dynamic object status (such as pin placements and tee box locations), initialization message with time and position data to 'cold start' the CBU GPS receivers if required, and golfer names and start times information for the course rangers. Information supplied by each CBU to the CMS includes the location of each golf cart by ID, message information from the golfers, pace of play data and player score and statistics information for post-play output.

By use of variable length communications network innovations of the PROLINK system, an almost unlimited number of carts can be supported by the system. Typically, an 18 hole course may utilize some 70 to 80 golf carts, a number which is easily accommodated by the system of the invention.

The course management portion of the system performs various functions beyond those already mentioned. For example, a high resolution color computer monitor displays the course map with all its features, and indicates on the map the locations of the individual roving units on the course including golf carts, refreshment carts, and maintenance carts, updated in real time as the carts move about the golf course. A zoom feature allows enlargement of any area of the map of interest, such as a particular hole or a number of contiguous holes. Pop up windows may be engaged by the CMS operator to execute any of several actions, such as a global message for distribution to the golf carts. Advertising and promotional messages, such as the day's lunch special, sports scores, identity of a golfer who hit the longest drive in a scramble, and personal messages may be sent to the carts. Also, the course management portion provides overall system timing, and master control of the PROLINK system communications network.

Figure 3:
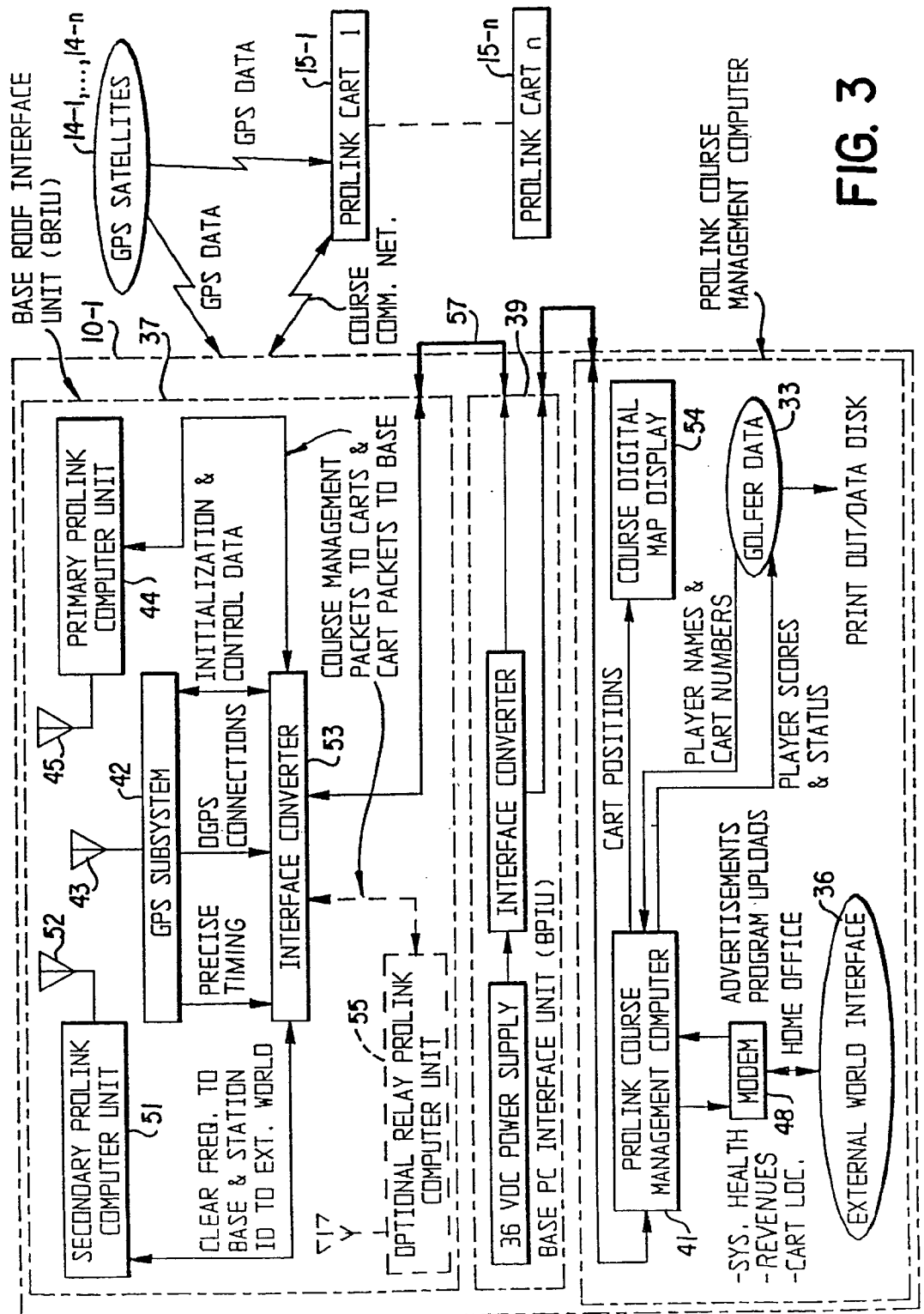
FIG. 3 is a more detailed block diagram of the course management system (CMS)/base station portion of the PROLINK system.

A block diagram of the course management station 10 of the PROLINK system is shown in FIG. 3. The CMS 10 includes base roof interface unit (BRIU) 37, base PC interface unit (BPIU) 39 and PROLINK course management computer (CMC) 41. BRIU 37 is typically mounted on or near the roof of the building or structure that CMS 10 is installed for improving transmission and reception. CMC 41 is the master control for entire PROLINK system. BPIU 39 provides an interface between BRIU 37 and CMC 41. BPIU 39 converts RS-232 formatted data from CMC 41 to RS422 formatted differential data to BRIU 37 and vice versa. This conversion is performed because RS422 formatted differential data provides more robust data for traversing relatively long distances through cable 57 to reach BRIU 37 which as previously mentioned is typically mounted on or near the roof of a building and, thus, may be several hundred feet away from CMC 41. The design allows the BRIU to be up to 4000 feet away from the CMC.

BRIU 37 includes a GPS subsystem 42 with antenna 43, a primary PROLINK computer unit (PCU) 44 with antenna 45 for transmitting and receiving data packets to and from each of the carts, a secondary PROLINK computer unit (PCU) 51 with antenna 52 for monitoring frequencies before transmission and for broadcasting a station identification to assure compliance with the Federal Communications Commission regulations, and interface converter 53 for providing an interface between BRIU subsystem 37 and CMC 41. BRIU 37 may optionally include a relay PROLINK computer unit 55 for courses with particularly harsh terrain that may not be line-of-sight with the BRIU to assure reliable radio communication.

GPS subsystem 42, generates differential GPS (DGPS) corrections using the GPS signal data received from GPS satellites 14-1, . . . , 14-n in view. These are generated as differential pseudo range and pseudo range rate corrections for each visible GPS satellite with respect to the fixed survey point of the CMS base station location, for example, at or near the golf course club house. The DGPS corrections are communicated to the CMC via BPIU 39. Similarly, CMC 10 creates a communication packet that is robust against bursty channel errors, which is sent via BPIU 39 to primary PCU 44 for subsequent transmission to the cart-based units 15-1, . . . , 15-n.

GPS subsystem 42 also provides precise system timing to CMC 10, primary PCU 44, and secondary PCU 51 by means of a pulse per second (PPS) signal implemented as an interrupt to the computer, for system timing down to near microsecond levels to precisely control the RF communication via primary PCU 44. The GPS time tagged message broadcast from the GPS subsystem immediately following the particular PPS indicates the time of the occurrence of the PPS. A description of system timing will be set forth presently. In the unlikely event that the GPS subsystem is not properly initialized on power up, CMC 10 provides it with initial position, time, and date for proper satellite acquisition.

The GPS subsystem 42 is preferably a Navstar System Limited XR5M6 GPS base station. Navstar is an England-based company with a subsidiary located in Sarasota, Fla. The GPS antenna 43 is a microstrip patch antenna with a built-in pre-amplifier with circular disk ground plane to minimize multipath interference.

CMC 41 serves as the master control for the entire PROLINK system. It may, for example, be an IBM-compatible 486-based 66 MHz PC (personal computer) with 8 megabytes (MB) of RAM (random access memory), an 200 MB hard drive, and extended graphics capability with a local bus video system, a video accelerator high-resolution card having 1024 pixels vertical resolution and 1280 pixels horizontal resolution, and nominally 256 colors. In addition to its capabilities described above, this computer enables asset (e.g., golf cart-based units) management by the course administrator. The course digital map display 54 is preferably a color video (computer) monitor with 17- to 21-inch screen size.

Primary PCU 44 transmits information to the cart-based units 15 under the command of CMC 10, and sends data received from the carts to the CMC for processing and response. Computer unit 44 converts the packetized serial data stream supplied by CMC 41 to a binary frequency shift keyed (FSK) digital modulation, for broadcast on the PROLINK system. Data received from the cart-based units are likewise converted at unit 44 from FSK to a packetized serial bit stream for processing by CMC 41.

If the golf course is sufficiently hilly or has other obstructions to line-of-sight (LOS) communication between carts and the base station, RF reflectors, diffractors, or repeaters may be employed to alleviate the problem. A reflector, specular or diffuse is the preferable device. A specular reflector strategically located atop an obstruction reflects a concentrated beam of RF energy in which angle of incidence equals angle of reflection. A diffuse reflector reflects the energy in many directions as a function of wavelength of the RF signal and roughness of the reflector surface. Alternatively or additionally, communication may be maintained by bending the RF energy around an obstruction, using appropriately mounted RF knife edge diffractors albeit with greater RF power loss than with reflectors. The amount and depth of diffraction is a function of the sharpness and height of the diffractor edge.

Another alternative for maintaining communications where obstructions are present is the use of repeaters with directional antennas. These may be substantially identical to PCU 44, and are also effective to extend the range of communication. The repeater receives communications simultaneously with the RF transceiver, but at a different frequency to avoid interference with the primary course communication frequency. Solar powered repeaters with highly directional (e.g., Yagi) antennas are preferable.

The secondary PCU 51 monitors frequencies before transmission to assure compliance with Federal Communications Commission requirement that shared frequency users must not be interrupted. If transmission by another user is detected by computer unit 51 on the frequency being used for the PROLINK system, the CMS computer immediately commands the network to switch to a predetermined unused frequency. In addition, frequency transitions by the PROLINK system are commanded periodically by the CMS computer whether or not an actual interfering user is present, so as to comply with an FCC rule that no user may assert exclusive use of a frequency. These features will be described in detail hereinafter.

The CMC 41 and associated video display monitor 54 may be located in the pro shop where the club pro assigned the duties of course administrator can monitor play. The CMC automatically collects statistics on average speed of play of golfers by individual or group for analysis of ways to speed up play or to identify responsible golfers, course bottlenecks, or other problems. The monitor displays the location of all players and flow of play in real time.

Modem 48 allows play speed and other course utilization data and overall system operational data to be downloaded from the computer. The latter data include the status of each cart-based unit 15, such as a need for emergency repair following a breakdown. Similarly, the modem allows data to be loaded into the computer, such advertising matter to be sent to the carts for display. The system may be implemented to allow a PROLINK maintenance provider to call into the system for remote extraction of information concerning system performance history since the last review, and to load new software upgrades into the PROLINK system. The modem may also be used to allow players in other cities or course owners to preview the course on which the system is installed, by observing course features and actual play in progress, in anticipation of playing the course during an upcoming visit. Conventional security measures may be invoked by the user course or by the system supplier to limit system user access to certain functions and information.

Each cart with a roving unit is assigned an ID number to be incorporated in the header of a message packet for communication with the golfer(s) who rented the cart. Correlation of golfers with carts is performed by entering data into the CMC 41 by an attendant at the time of cart checkout. On completion of play of the round, the CMC may be activated by a trigger signal when the cart departs from the 18th hole, or by manual selection, to compile the stored data for the individual player's statistics for that round, including drive distance on each hole, score for each hole and total score, play times, and so forth. This statistical data is then available to the course manager and to the golfer in the form of a hardcopy printout or computer disk. As a result, the golfer is able to replay and analyze his or her game at a convenient time at home.

Figure 4:
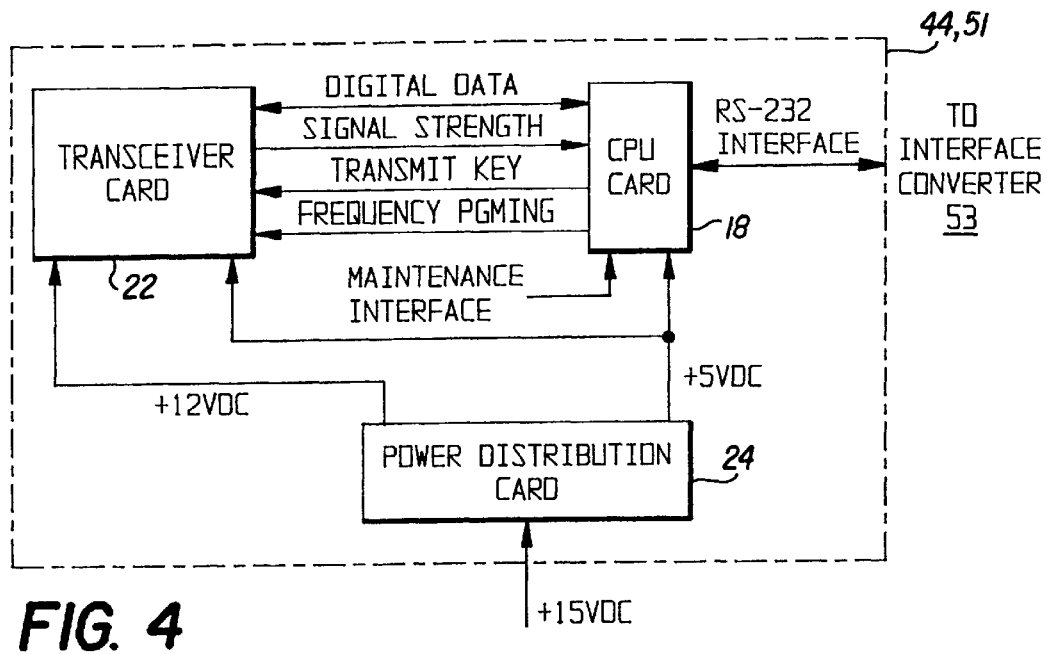
FIG. 4 is a block diagram of the electronic components of a base station PROLINK computer.

Referring to FIG. 4, a block diagram illustrating the components of primary PCU 44 and secondary PCU 51 is shown. It is understood that components shown in FIG. 4 that are identical to components shown in FIG. 1B are identified by the same reference numbers. Primary and secondary PCUs 44 and 51 are each identical to cart-based PCU 16 (of FIG. 1B) with the exception that PCUs 44 and 51 do not include a GPS engine since both PCUs 44 and 51 utilize GPS subsystem 42. Accordingly, CPU card 18 is coupled to GPS subsystem 42 via interface converter 53. The structure and operation of CPU card 18, digital data transceiver (RF) card 22 and power distribution card 24 will be discussed in detail when the components of PCUs 44 and 51 are discussed in detail with reference to FIGS. 12–15.

Figure 5:
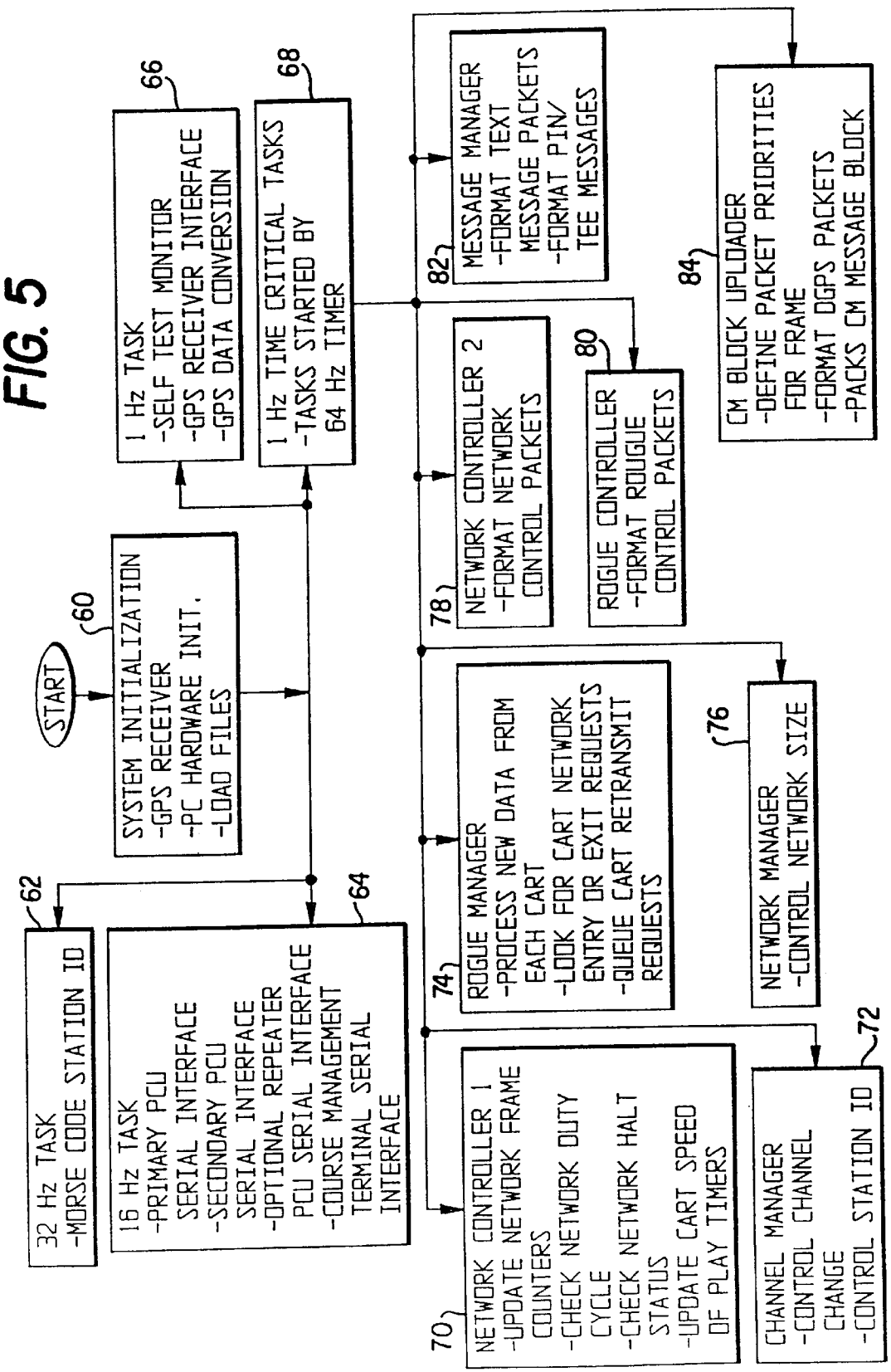
FIG. 5 is a block diagram of the base station computer software.

FIG. 5 is a block diagram illustrating a top level description of the tasks performed by the CMC software as well as the rate at which each task needs to be performed. At both the cart and the base station sides, a real time operating system takes inputs from a user and automatic inputs from external sources, and responds accordingly. Before execution, system initialization 60 is performed to set up the CMC video environment and the communication ports, and to bring up the communication network by which the CMC talks to all carts on the golf course (it is assumed here that all golf carts on the course are equipped with PROLINK roving units, as would generally be the case). System initialization 60 also initializes a GPS receiver with its position and time, polls primary and secondary PCUs in the base roof interface unit and loads data files such as course maps and information containing the number of golf carts that are in the system.

Upon completion of system initialization, a number of tasks are commenced. Thirty-two (32) hertz (Hz) task 62 when activated sends out morse code data to enable the secondary PCU 51 to broadcast the station identification on the RF communication channel that CMS 10 is currently operating on.

Sixteen (16) Hz task 64 includes communication tasks that send and receive data from the various devices in the system such as the primary and secondary PCUs (44 and 51). Also, GPS receiver data is checked during the 16 Hz task to see if any new data has been received.

The one (1) Hz task 66 is a self-test monitor task that determines whether all of the components of the PROLINK system are functioning properly. One Hz task 66 also decodes new messages received from the GPS receiver and performs GPS data conversion as presently described. These one Hz tasks of block 66 may be referred to as non-critical tasks because although they have to occur at a rate of one Hz, the time that they occur during a one second interval is not critical. Rather, the tasks just must be performed within a one second time interval.

One (1) Hz time critical task 68, however, include tasks that must be performed at a rate of one Hz of which must be performed at specific times within a one second frame. One Hz time critical task 68 includes a number of subtasks. Network controller 1 subtask 70 keeps track of the network timing by updating some of the frame counters and determining if there are any carts on the course and updates the speed of play timers for those golf carts.

Channel manager subtask 72 determines whether the current channel that is being operated by the PROLINK system needs to be changed to a different channel because, for example, an event has occurred to cause the data to be disrupted such as someone else attempting to use the channel or if the PROLINK system has been using one channel for a 15 minute interval.

Rogue manager subtask 74 manages the different rogues on the golf course by verifying the data received from each of the rogues, determining the status of each of the rogues to determine whether any special actions for those rogues are required such as allowing the rogue to enter or exit the network, or receiving special messages from the rogues. Rogue is synonymous in this application with the term carts or golf carts or any type of mobile vehicle or handset system.

Network manager subtask 76 controls the size of the variable length network by lengthening or shortening the variable length network according to the number of carts on the course.

Network controller 2 subtask 78 follows the channel manager, rogue manager and network manager subtasks which have already determined what activity has taken place in the last frame and, thus, subtask 78 creates a network control packet that reflects the decision of the network manager as to the size of the variable length network and as to what additional network activity is to be commenced. For example, in the case of a channel change, network controller 2 creates a network control packet that includes information to inform the rogues that there is going to be a channel change. This network control packet will be described in detail later.

Rogue controller subtask 80 performs a similar task based upon the results of rogue manager subtask 74, creating rogue control packets for transmission to each of the rogues.

Message manager subtask 82 determines whether the course management system operator has entered a message to be transmitted to the rogues and formats the text message for transmission to one or more rogues as time and space permit in the output stream. Subtask 82 also produces the pin and tee placement messages and transmits those messages once every 16 seconds to the rouges.

Course management block uploader subtask 84 assembles all of the data packets that have been created by network controller 2 subtask 78, rogue controller subtask 80, and message manager subtask 82 and packs them, along with differential GPS data messages into the data packet to be sent to the rogues (golf carts). Subtask 84 does this by assigning priorities between text messages and the pin-tee messages and rogue control packets and network control packets along with the differential GPS data so that all of the differential GPS data which is critical for providing accurate calculation of yardage is sufficiently updated. This information is allocated to a predetermined number of bits per frame, for example, 768 bits. Accordingly, some of the differential GPS packets or messages may be delayed a couple seconds by including such data in subsequent frames.

Another significant aspect of the system software according to the invention is the use of a windowing graphical user interface which is tailored to support real-time operating systems by requiring only relatively little CPU throughput for operation. The graphical user interface utilizes on-screen windows that contain important information to the particular user, and is employed on both the golf cart mobile unit display and the course management display.

Figure 6:
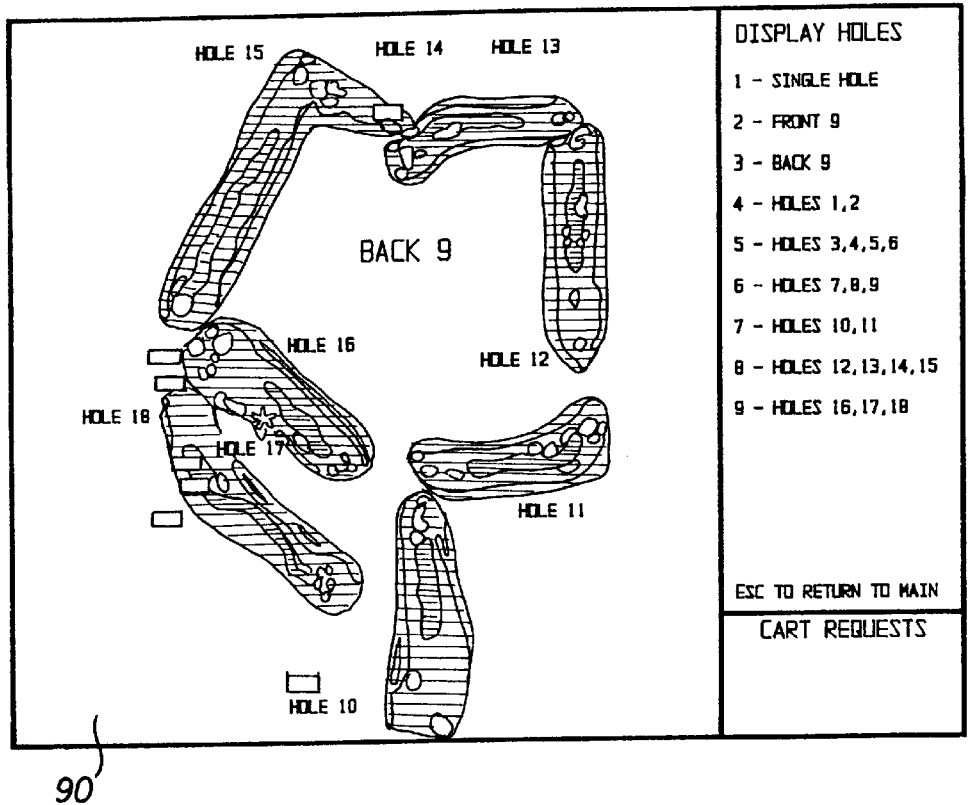
FIG. 6 is a graphical user interface (GUI) windows display on the CMS computer monitor.

FIG. 6 illustrates a typical image appearing on course management display 54. The main window includes a layout of the entire golf course or a selected group of holes and shows the specific location of each of the golf carts on the course by an icon as denoted by reference number 90 having the cart number or other descriptor indicated therewith. The CMC correlates the cart location over the digital map of the course, and of each particular hole. It is important for such correlation that the physical dimensions and characteristics of the hole be known with precision, requiring a precise survey of the hole. This in itself is a complicated issue for which the PROLINK system provides an innovative solution as will be described later. For the moment, it may be assumed that such accurate survey of the golf hole with precise information on coordinates already exists. With that survey information, an accurate correlation of the cart over the particular hole can be made. According to the invention, the coordinates of the cart in latitude, longitude and altitude are determined and converted to a two-dimensional X-Y reference frame. Symbols for each cart are displayed on the CMC map display at the locations transmitted by the carts. This display allows the course manager to see if carts drive into restricted areas such as greens. Or alternately, the system can automatically alert the manager of such an event. Moreover, the manner in which the cart icon is displayed may be changed, i.e., blinking or different color, if the cart is playing too slow or has sent a message to the course manager.

The right side of the image of FIG. 6 includes a menu of options for the user/operator to perform. These include changing the holes to be displayed or sending a message to one or more golf carts. Additionally, the window in the lower right corner shows messages received from the golf carts.

Figure 7:
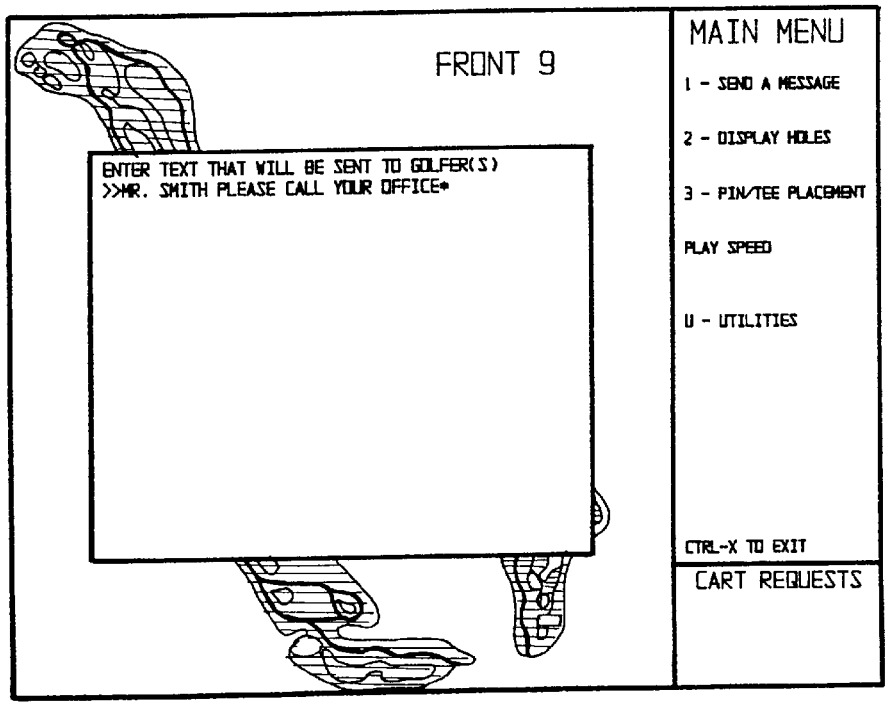
FIG. 7 is a GUI windows display with pop-up message on the CMS computer monitor.

FIG. 7 illustrates another important utility of the CMC's graphical user interface (GUI), with reference again to FIG. 6 as well. FIG. 7 shows a display of the holes for the front nine illustrating all the carts within that area—one of which happens to occupied by Mr. Smith. FIG. 7 shows system reaction to indicate the need for operator action, intervention or awareness, by the appearance of a pop-up window. In this example, a message entry window is show, with a message to Mr. Smith's cart to inform him to call his office. The CMC software of the invention provides the course manager with the ability to send messages from the CMC globally to all golf carts on the course, or privately to a particular cart as illustrated in FIG. 7. As an example, if the course manager deemed it necessary to send a lightning alert to all carts and a request to clear the course for that reason, he or she need merely invoke the message window through the CMC, type the message that all golfers should immediately clear the course, and press the "send" button. In response, the message is immediately broadcast to all carts on the course, and is received at the cart-based mobile units as a pop-up window containing that message.

The course management system of the invention is also provided with the capability to compile long-term course utilization statistics that are retrievable by the course management team. One important course utilization statistic is the mean hole play time calculated over a predetermined period of time. This provides a yardstick against which individual cart play times may be measured. Another statistic might be the frequency at which a particular hole is a bottleneck to smooth flow of play on the course. Such information can be a basis for a decision to redesign the hole layout to improve speed of play.

The PROLINK system has the capability to send information bi-directionally between the clubhouse base station and the golf cart roving units. The CMC must send a significant amount of information to the roving units, such as differential GPS corrections to assure that the carts have very accurate yardage information, personal and global messages to golfers, pin placement and tee box location updates to golfers on the course, and so forth. Similarly, the mobile units need to send information to the CMC such as the state of the course, the cart position, time of play for a given hole, general information or requests from golfers such as to send the refreshment cart and so forth.

A block diagram of the PROLINK communications system is shown in FIG. 8. An information source 101 at the transmitting end which may be the base station or roving unit (cart) supplies information which is processed through a source encoder 102, an encryptor 103, a channel encoder 104, and a data modulator 105. The processed information is transmitted over a channel 107, which is a frequency band over which FCC-permitted communication may be made between various users. At the receiving end, which may be a roving unit or the base station depending upon which of the two was transmitting, the incoming data is demodulated at 109, and bit synchronized at 110. The data is then processed through channel decoder 111, decryptor 112, source decoder 113, and reproduced as the received information at 114, such as on a display screen of a computer monitor.

In order to make such a system attractive to the golf industry, as well as other industries, low cost is a requirement. The largest single cost factor of the PROLINK system is the number of roving units or carts on the course at any given time (for example, 80 on a typical 18-hole course). The single base station used to control those 80 carts on the course is a substantially smaller factor in the cost of the overall system. To that end, conserving costs of the cart-based unit (CBU) components must be achieved, but not at the expense of degradation of performance or reduced reliability.

One scheme for achieving low cost involves employing an RF transmitter/receiver subsystem that uses a common digital modulation scheme. In particular, the communications scheme for the PROLINK system uses frequency shift keying (FSK), a digital modulation technique that is both inexpensive and simple to implement. Although other modulation techniques could be utilized, such as phase shift keying (PSK), such techniques are substantially more expensive to implement. Therefore, by the use FSK, the PROLINK system allows extremely cost-effective digital receivers to be manufactured with many readily available components.

However, one disadvantage with FSK is that it lack spectrum efficiency: For example, when compared with PSK, which more efficiently utilizes an FCC authorized and available frequency spectrum, a 1200 bit-per-second (bps) FSK message requires the same bandwidth and frequency spectrum as a considerably faster 4800 bps PSK message. Therefore, if FSK is the technique chosen because of its cost savings, the PROLINK system must make very efficient use of the available bandwidth for transmission of data. To that end, the PROLINK system minimizes this bandwidth utilization problem by greater efficiency in the deployment of a variable length packet communications network. The communications network uses a precise timing, time division multiplexing (TDM) technique in which all information is sent and received on a single frequency and each cart, as well as the base station, transmits its information at precise times allocated so that only one is transmitting per instant in time. In TDM, time slices are created on a single frequency such that each cart and the CMC can broadcast in specific allocated time slots, but no two transmitters broadcast at the same time because they will interfere with each other. Therefore, if TDM is precisely time controlled to ensure that when one transmitter is on, all others are off, then the need to have the base station poll each of the carts to request it to send information is abated. This results in a substantial savings in bandwidth. Accordingly, the PROLINK system precisely controls the timing of each transmitter on every cart and on the CMC to achieve efficient bandwidth utilization for FSK modulation. Moreover, because FSK is the modulation technique chosen, the PROLINK system substantially reduces the cost of each transmitter thereby allowing for a low-cost, affordable golf yardage and management system as described herein.

Accordingly, a significant innovation of the PROLINK system that allows sending and receiving information efficiently—indeed, with apparent great speed at only 2048 bps—is the variable link network, which will be discussed later. For the moment it is sufficient to note that to execute the variable link network a very precise system timing is required. It is essential that the timing accuracy of the base station (CMS) and the carts (CBU) be precise to one-half of a millisecond (ms) for the communications network employed in a manner to be described. Identical timing mechanisms are used by the cart-based unit PCUs 16 and the base station PCUs 44 and 51. The manner in which system timing is implemented in the PROLINK system is significant, at least in part, because it is achieved at very low cost by using GPS system timing rather than relying on expensive, accurate clocks.

Figure 9:
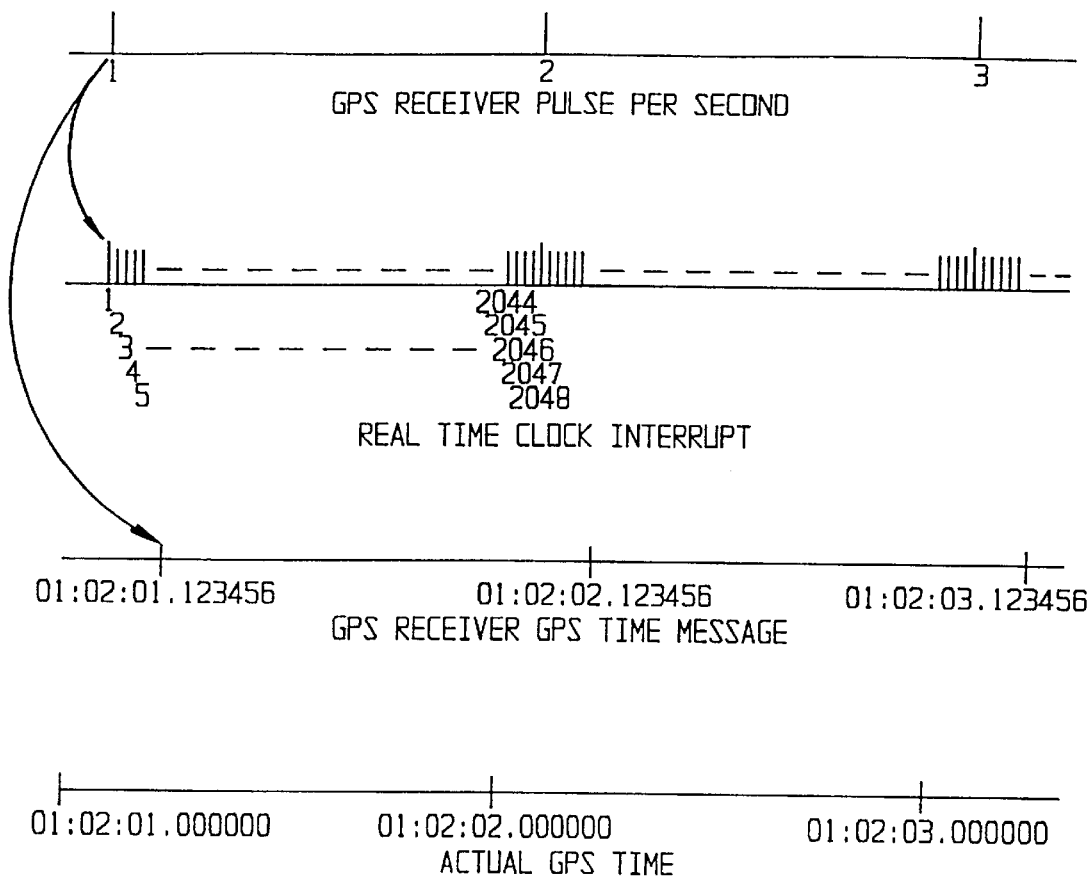
FIG. 9 is a graphical diagram illustrating the system timing mechanization.

To examine how such accuracy may be achieved, reference is made to FIG. 9, which illustrates system timing mechanization, with actual GPS time line depicted at the bottom of the Figure. The first time point is chosen arbitrarily, showing that the time line starts at 01:02:1.0 second, moves to 01:02:2.0 second, then 01:02:03.0 second, and continues on indefinitely. The GPS system has extremely precise timing, with the GPS receivers employing the pulse-per-second (PPS) output as a typical method of informing a user of the time that a particular measurement is valid.

The PROLINK system receives the pulse per second signal from the GPS receiver as an interrupt into the CPU. The interrupt informs the PROLINK software of the instant in time (accurate to about 1 microsecond) at which the time and position message to be subsequently received over the GPS receiver serial interface is valid. This message is received by the CPU up to 0.5 seconds after the PPS signal. The PPS event is used to reset the real-time interrupt counter which interrupts the processor at 2048 Hz.

Upon receipt of the position/time message from the GPS receiver, the GPS time at which the last PPS occurred is known. The number of 2048 Hz interrupts received since the PPS occurred can be counted to synchronize the system to GPS time. This allows time to be maintained accurately to 1/2048 second or slightly better than 0.5 milliseconds. This ensures that tick zero of the of the 2048 Hz real-time clock is aligned with the GPS integer second.

Additionally, the PROLINK system is capable of calibrating errors in the real-time clock using the GPS PPS signal. Errors in the real-time clock may be due to, for example, temperature changes which cause crystal oscillators to drift in frequency. Each time a PPS signal is received, a count of 2048 real-time clock interrupts is expected. However, if less than 2048 interrupts have been received between successive received PPS signals, then the clock is running too slow. For example, if only 2000 interrupts were counted, then the clock is running 48/2048 seconds too slow. In a similar manner, if more than 2048 interrupts have been received between successive received PPS signals, then the clock is running too fast. For example, if 2100 interrupts were counted, then the clock is running 52/2048 seconds too fast. Accordingly, this count difference from the expected 2048 counts can be used to correct the interrupt time and to produce counts as close as possible to 2048 occurring between successive received PPS signals.

It bears emphasis that it is not required for the PPS from the GPS receiver to be synchronized to GPS time in integer seconds. As pointed out in the description of FIG. 9, the integer GPS time seconds starting at 01:02:01.00 second does not correspond to the exact time at which the PPS actually occurred as indicated by the GPS receiver GPS time message. Rather, in the example, the pulse per second actually occurred at 01:02:01.123456 second. Hence, the fact that integer second synchronization of the PPS exists on some GPS receivers and not on others is immaterial to proper operation of the PROLINK system.

As previously discussed, a significant requirement of TDM is a very accurate time base, because of the need for every unit to know when it is allowed to transmit and when it is expected to receive information. The traditional scheme for solving this problem is for the base station to call individual users (e.g., "Cart 82, where are you?"), and the cart to which the inquiry is made sends a response. This process continues as each cart is identified and an inquiry made as to its whereabouts, with a subsequent reply by the cart. This scheme is very bandwidth inefficient because the base station must transmit data to each cart to request information.

In the PROLINK system, bandwidth efficiency is considerably better than with the traditional polling technique just described. This is achieved in great part by virtue of the accurate timing information on the system from the GPS receivers. In the variable length packet communications network of the system each cart is given a time slot for allowed transmissions. The carts independently know what their respective time slots are from the timing provided by the GPS receiver by the means and method described above. Hence, when a particular cart's time slice comes due, the cart broadcasts a very short data burst and then gets off the frequency. Then, the next cart broadcasts a data burst, and so on until all carts have had the opportunity to send information. The base station transmissions are also multiplexed onto the allocated frequency with its own time slot. Such a system eliminates the need for the base station to poll the carts and substantially increases bandwidth efficiency.

The entire communications architecture is a packet communications structure, in which the small messages (packets) are built and then broadcast from point A to point B. Error detection is provided by conventional techniques. In the PROLINK system, acknowledgement error correction is used to ensure that messages are guaranteed to be received.

In a preferred embodiment, error detection is employed through a linear systematic polynomial block code with 16 data bits and 20 code word bits, a (20,16) code. In a preferred embodiment, the code generator polynomial, H(z), chosen was $(z^4+z+1)$. It was found, after extensive simulations, that such code generator polynomial possessed the best error detection capability.

The code, Y(z), may be created by the following equation:

$$Y(z) = z^4 X(z) + A(z)$$

where

X(z) is the 16-bit input data sequence; and

A(z) is the result of the modulo 2 polynomial division of $z^4 X(z)/H(z)$.

To decode, X(z) is inherent in the code word Y(z) by simply shifting 4 bits to the right. However, one must determine whether X(z) is received correctly. This is accomplished by computing the remainder A(z) and comparing such computed remainder with the 4 least significant bits of the received code word. If the two match, then the message is deemed to have been received successfully. If, however, the message was corrupted during the transmission, an error detection technique alone will not suffice to correct it.

Many packet communication systems also have embedded error correction, such that a packet can be detected as having an error and have sufficient redundancy to permit error correction with high reliability. However, a requirement to transmit both error detection and error correction bits in the packets increases overhead and thus reduces bandwidth. The system of the invention uses a technique of acknowledgment error correction for critical messages (packets) in which the base station transmits the packet with any conventional error detection scheme. The cart, if it has detected an error in a message packet from the base station, waits until its next time slice, and then sends a simple status in its transmission to alert the base that the last transmission to that cart contained an error (negative acknowledgement). The base then retransmits that information on the next frame, and this continues until the cart receives error-free message information. If the cart does not acknowledge because it received no message despite the fact that one was sent, the base recognizes the lack of acknowledgement and re-transmits the message on the next available frame. Thus, the PROLINK system is extremely bandwidth efficient at typical bit error rates because there is no need to constantly and periodically transmit error correction redundancy with every packet. Additional bandwidth is used only to request and transmit another packet when it has not been received properly.

Returning now to the discussion of the variable length communications network, this type of network operates considerably faster than polling of carts to obtain efficient two-way communication and with substantial bandwidth efficiency. Updates on the cart positions are available much more often than with polling. Spread spectrum communications (code division multiplexing) is an alternative, but is presently much more expensive to implement than the time division multiplexing (TDM) of the variable length packet network. Spread spectrum requires special digital signal processing which is computationally intensive, and special RF hardware for wide bandwidth operation which is expensive.

It will be helpful to an understanding of this aspect of the invention and its features to describe the variable length packet network in greater detail, commencing with a system overview.

System Overview

The PROLINK system provides command and control with bi-directional communications between a commander (the PROLINK base station) and a plurality of control assets (individual roving units, such as PROLINK-based golf cart). In the presently preferred embodiment, a variable length packet network is used for communications, in which digital messages containing data packets are transmitted between the base station and the roving units in a half duplex Time Division Multiplex (TDM) digital communication system. Each communication message may be a single packet or multiple packets, but available channel bandwidth is maximized by putting as many packets as can be accommodated in each message.

Each message has a message identification header. In general, bit synchronization information is provided at the beginning of each message, but long messages may also contain synchronization information in the middle or at the end of the message. Each packet has an identifier uniquely determinable from other packets in the message, and is embedded with error detection mechanisms.

Communications Timing

The PROLINK system is a half duplex Time Division Multiplexing (TDM) digital communication system. In such a system, the transmission of messages is tightly time controlled to make efficient use of the available channel bandwidth, and to ensure that no more than one transmitter is broadcasting at any one time. Most digital communication systems require the command (base) station to synchronize the network, often with a significant resulting bandwidth reduction.

The PROLINK system, however, relies on the base station and all carts being synchronized to GPS time within a microsecond as described above, and therefore can dispense with the need for direct base synchronization. This is a significant advantage relative to the typical TDM system. All network participants need only be initialized to indicate when they are allowed to transmit. Thereafter, each is free to transmit in its own unique, specific time slot asynchronous of direct base station timing control.

Frame Timing

Each frame begins on an integer GPS second as discussed above with reference to FIG. 9, and is one second long, by definition. Frames repeat each second, and interleaved within the one second frame period are messages between the base station and the carts (i.e., to and from).

Figure 11:
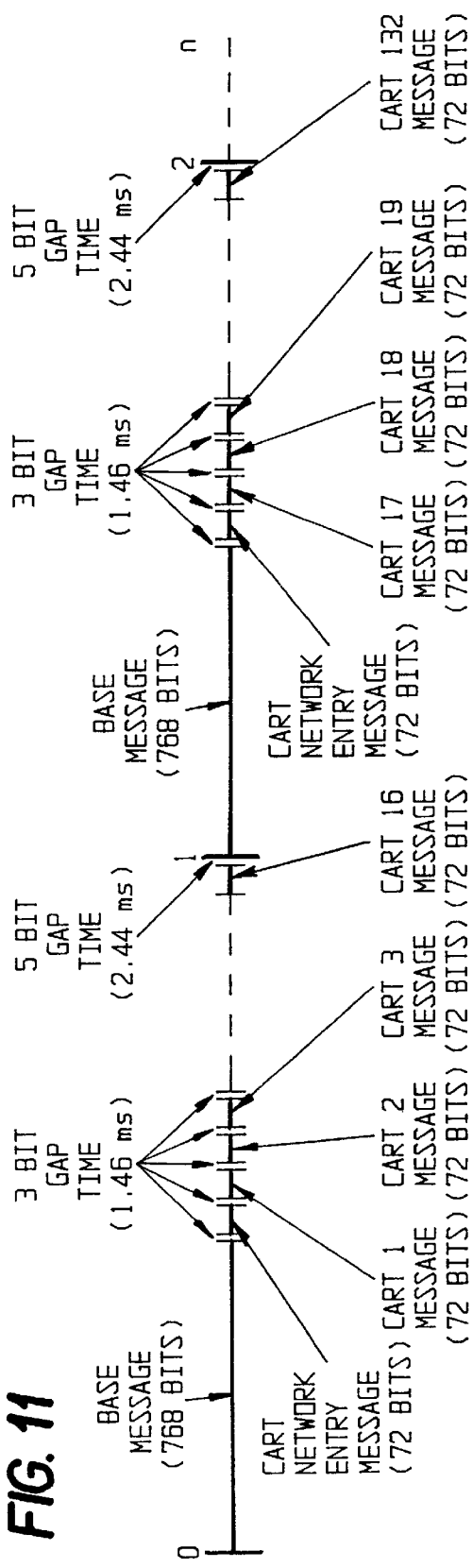
FIG. 11 is a communications network packet timing diagram for the PROLINK system.

Referring to FIG. 11, an exemplary communications network packet timing diagram of the variable length network in accordance with a preferred embodiment of the PROLINK system is shown. With the communications bit rate of 2048 bps, the base station message in a frame may occupy 768 bits which is equal to 37.5% of the available transmission time (375 ms). Each cart message in a frame may occupy 72 bits, or approximately 3.5% of the available transmission time (35 ms). Between transmissions, 3 bits (1.46 ms) allow the current transmitter to cease transmitting (i.e., to release the transmitter key line to drop the carrier power) and the new transmitter to begin transmitting (i.e., to assert the transmitter key line to generate carrier power).

The data rate of 2048 bps is selected because it is the fastest interrupt rate in this embodiment of the PROLINK system. Also, it is very convenient from a system architecture design perspective to use a power of 2 bit rate. Powers of 2 are useful in fixed point processors because bits can be shifted by one position to the right to divide by two or to the left to multiply by 2. A shift of two positions is the equivalent of multiplying by four, etc. In a real time operating system, this technique avoids many extensive computations of floating point systems by use of computationally efficient bit shifts.

A 78 bit gap immediately after the base message transmission allows carts to enter the network via a 72 bit cart message. At the end of the frame, a 5 bit gap (2.44 ms) exists before a new frame is started. A predetermined number of different carts may transmit in a single frame, for example, 16 carts/frame. Moreover, in a preferred embodiment, up to 16 unique frames are allowed in the presently preferred variable length network format. Thus, up to 255 carts (rather than 256, since cart address $00_{hex}$ is not allowed, being an "all call" address) may be employed in any one network. In that way, one PROLINK system base station can readily support three 18 hole courses (54 holes) operating simultaneously. However, it should be noted that there may exist any number of vehicles in a frame as well as any number of frames within a cycle.

Figure 10:
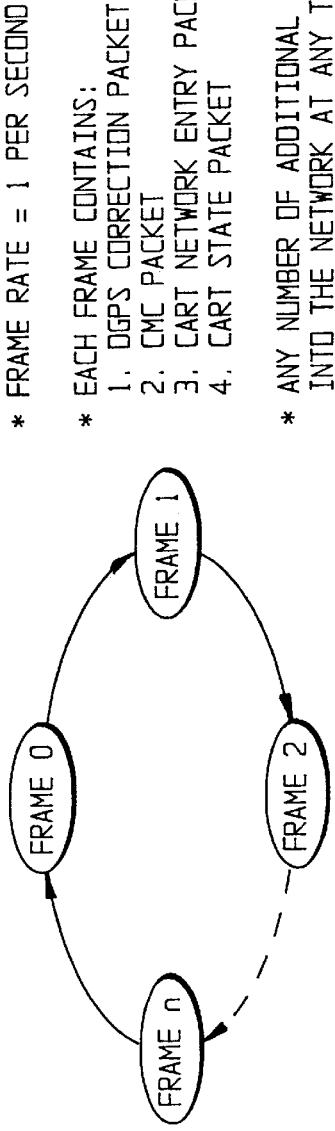
FIG. 10 is a simple diagram of the PROLINK variable length packet length network.

Referring to FIG. 10, a diagram illustrating the variable length network of the PROLINK system is shown. The frame cycle is circular with as many as n unique frames as denoted by frames 0, 1, . . . n, where n is an integer set by the base (command) station according to network load requirements; hence, the name variable length network. In a preferred embodiment, the maximum value of n is equal to 15. When few carts are on the course, the base station maintains only a relatively small number of unique frames to provide a higher update rate of the cart state packet to the course manager/administrator. This higher update rate is attributable to a need for fewer unique frames to be transmitted before the network returns again to frame 0 in the cycle, as shown in FIG. 10.

Since the number of carts in a frame is 16, the number of additional carts accommodated by an increase in the network size is quantized at 16, because only integer frames may be added or subtracted. For example, if 20 carts are on the course, the maximum number of frames required is 2 as determined by the integer function: INTEGER[(20/16)+1]. But if more than 32 carts are on the course, the base must command a network reconfiguration to add a third frame. The fastest unique cart position updates are provided to the base station every second when 16 or fewer carts are on the course, whereas the slowest updates are given every 16 seconds when more than 240 carts are on the course. This variable length structure ensures maximum network efficiency at all times.

No interruptions of a frame or a frame cycle are allowed in mid-execution. Rather, all interruptions in frame broadcast are restricted to the beginning of an integer second at the beginning of the frame cycle. The base is responsible for timing interrupts accordingly through the use of base packet 3 (network control). On reception of network reconfiguration commands in base packet 3, all carts must wait until the end of the frame cycle before enacting the configuration change command. Examples of frame interrupts are (i) preparation for a station identification broadcast, (ii) a network reconfiguration, and (iii) network duty cycle control.

Network Operation

The rules and procedures for overall operation of the variable length network are established with network start, stop, and reconfiguration procedures. Unique shared channel FCC operations are established, and techniques of network robustness are addressed below.

Network Start Up

For the variable length network to operate, the base station must know at all times which carts are on the course, and must have assigned all carts a time slot within a frame for cart communications to the base. Thus, a mechanism is necessary for the base to ascertain which carts are ready to be used, and hence to be initialized, for network operation.

Daily Cart Power Up Initialization

At the beginning of each day, all carts are in the cart garage and are turned off. The attendants power on the carts when they have prepared the cart for use by golfers, and have moved the cart outdoors where the GPS antenna has reasonable line-of-sight to satellites.

When the cart is powered on by the cart attendants, the CPU card initiates power to the GPS engine. The CPU card must wait for the GPS engine to have accurate GPS/UTC time before any RF transmissions can properly take place. At power on, the CPU card attempts to find the base transmission channel by listening on each course channel for a valid base message. If the GPS/UTC time is valid, then the periodic base message transmission time is known. If the GPS/UTC time is not valid, then the base start time is unknown, as the cart is not aware of accurate time. Since the range between the base and the cart is typically quite small, it is only necessary for the CPU to dwell for two seconds on each channel to be assured that the base transmission would not have been missed. Access to each channel is attempted in circular fashion until the base message is successfully received.

If the GPS engine does not report good UTC/GPS time two minutes after a power on, the CPU awaits a base network control packet (packet 3) and initializes the GPS engine with the packet initialization data. Again, the cart is not allowed to transmit until it has good GPS/UTC time.

Cart Network Entry

Once the cart has good GPS/UTC time and has determined the network channel, the cart can begin the network entry process.

The cart initiated network entry process allows a cart to request network privileges at a time that the base station is unaware that the cart is ready for network access. To that end, the cart transmits a cart state packet with a cart network entry request (byte $0=23_{hex}$) in the cart network entry time slot that occurs immediately following the base message (see the frame timing diagram, FIG. 11). To avoid conflicts over network access attributable to more than one cart seeking network entry at the same time, an access arbitration scheme is employed to determine which cart is given priority to take that network entry time slot.

The arbitration scheme used in the preferred embodiment of the PROLINK system, is that each cart seeds a random number generator with its unique cart number upon receiving a valid GPS/UTC time from the GPS engine. The random number generator has a uniform distribution with a range from 1 to 8 in integer steps (eight discrete events). When a cart desires network privileges, it causes the random number generator to be sampled. If a 1 is generated, the cart is allowed to transmit in the next cart network entry time slot. If any other number is generated (2–8), the cart is not allowed to transmit. Each second, the cart samples the random number generator until a 1 is generated and transmission is allowed. The cart continues this process until it is successfully integrated into the network by the base.

The performance of this arbitration scheme can be evaluated as follows. The probability that any cart has the opportunity to transmit in the network entry time slot is:

$$P(\text{Cart } Rn=1)=1/8$$

i.e., the probability that the random number generator will generate a 1 when sampled by Cart Rn is 1 in 8. The probability that this cart will not be given the opportunity to transmit, then, is:

$$P(\text{Cart } Rn \neq 1)=7/8$$

i.e., 7 in 8. Thus, any given cart will statistically be afforded one opportunity in any eight attempts (8 seconds since the frame rate is one Hz) to actually transmit a request for network access.

In a case where two carts are seeking to transmit in the cart network entry time slot at the same time, it may be assumed that all cart random number generators are statistically independent provided that each cart has a different random number seed. Thus, the probability that cart A is attempting to transmit in the same frame as cart B is:

$$P(\text{cart } A=1, \text{ cart } B=1) = P(\text{cart } A=1) \times P(\text{cart} B=1) = (1/8)(1/8) = 1/64$$

The probability that cart A is transmitting and cart B is not transmitting in a given frame is:

$$P(\text{cart } A=1, \text{ cart } B \neq 1) = P(\text{cart } A=1) \times P(\text{cart} B \neq 1) = (1/8)(7/8) = 7/64$$

And the probability that neither cart A nor cart B is transmitting in a given frame is:

$$P(\text{cart } A \neq 1, \text{cart} B \neq 1) = P(\text{cart } A \neq 1) \times P(\text{cart} B \neq 1) = (7/8)(7/8) = 49/64$$

Thus, both cart A and cart B are simultaneously attempting to transmit in the network entry time slot only 1 out of every 64 seconds. In that single conflicting frame, the base station will be unable to understand either cart. However, 7 times out of every 64 seconds ($\approx 1$ in 9 seconds) cart A will succeed in requesting network privileges, and 49 times out of every 64 seconds neither cart will be trying to gain access to the network. Thus, cart A will require about 9 seconds to enter the network when cart B is also attempting to gain entry, versus requiring only 8 seconds when cart A alone is requesting network privileges.

The time (in seconds) required for each cart to gain network access degrades rapidly with an increasing number of carts simultaneously requesting network privileges. It can readily be shown, for example, that if six carts were simultaneously requesting network privileges, each cart would encounter a 16 second delay before successful access to the base station. However, when one of those six carts succeeds, only five carts remain vying for network privileges, and then 4, and so forth. The total time required for all six carts to have gained access to the network is the integral of a curve, which can be shown to be 69 seconds. For 10 carts, the time period is 157 seconds for the base station to integrate all 10 carts into the network. Of course, it is quite unlikely that all carts would request network privileges at the same time.

Cart Time Slot Allocation

After the base recognizes that a cart is requesting network privileges, the base immediately broadcasts a rogue control packet (base packet 4) in the next base message addressed to the specific cart requesting privileges. Byte 0 of the packet must be $84_{hex}$ to require a cart acknowledge. The re-transmit control (upper nibble of byte 2) is set to $0_{hex}$ (no re-transmission required). If the base does not receive a cart acknowledge within two frame cycles, then the base will assume that the cart did not receive the packet and will re-transmit in the next base message, and then once each frame cycle thereafter until the cart successfully acknowledges. If no acknowledge is forthcoming in 16 frame cycles, the base station will delete the cart from the active network member list until the cart sends another network entry request in the network entry time slot.

Upon receipt of packet 4, the cart uses the lower nibble of byte 2 as the current frame indicator. The cart then has responsibility to increment the frame counter on each integer second and to roll over the frame counter (back to zero) when it exceeds the total number of frames indicated by the lower nibble of byte 3 in packet 4. The upper nibble of byte 3 contains the frame that the cart has been assigned for transmission. Byte 4 contains the subframe on which the cart is to transmit in the allocated frame. When the current frame computed by the cart equals the allocated cart transmission frame and the cart timer equals the beginning of the assigned subframe, the cart message is broadcast. In this manner, each cart broadcasts its message at its specific designated time within a specific frame so that no two carts are transmitting at the same time, and that no cart is transmitting when the base is transmitting.

Network Reconfiguration

In the PROLINK system, the network configuration will be required frequently during normal network operations. Activities such as entry of additional carts into the network, transitioning channels and embedding a transmit/receive duty cycle to meet shared channel requirements, and station identification broadcasts, among other possibilities, necessitate network configuration changes.

Network Length Change

For optimum network operation, the base station is tasked to allocate frames and time slots within frames to carts in sequence starting with frames 0 and 1 at network start up. When more than 32 carts are required to be in the network, frames 2 and 3 will be allocated to accommodate additional carts, and so on up to the available total of 16 frames allocable for as many as 255 carts on the network. This ensures a rapid update rate for cart position reports to the CMC, and maximizes the efficient use of available channel bandwidth. The procedure for adding or subtracting network frames will now be described.

If the number of carts required to participate in the network exceeds the number of frames allocated for or by the network, it will be necessary to add frames. In that event, the carts must be informed of the additional frames so as to alter their transmit timing. The notification is transmitted by the base station by way of the network control packet (base packet 3). Byte 6 in base packet 3 contains the current number of frames in the upper nibble and the new required number of frames in the lower nibble. If the upper and lower nibbles are equal, the cart recognizes that no network reconfiguration is taking place. However, if the number of frames in the upper and lower nibbles differ, the cart computes its new transmit timing from the initial timing and the new number of frames. This is done by maintaining the same transmission frame and subframe as originally communicated by the base in the cart control message, but with the total number of frames before cart transmission increased by the added number of frames. This, of course, means that the length of time required to complete a frame cycle is increased by the newly added frame(s), but the actual cart time slot remains the same. An analogous situation occurs where the number of carts in the network is reduced, except that the length of time required to complete a frame cycle is also reduced for the remaining carts, with resulting higher cart state packet transmission rates. Before a network size reduction, the base reassigns rogue transmit frames an subframe to lower numbered frames so that the higher numbered frames may be eliminated.

The base asserts the new number of frames at the beginning of a frame cycle and continuously over the duration of the frame cycle by sending a network control packet every frame. By definition, the carts cannot enact a frame change until the end of a frame cycle, which provides desirable redundancy where a cart may not be receiving reliable base data. Further, if the base fails to receive a particular cart transmission consistently over three frame cycles immediately after a network length change, the base responds by broadcasting a cart control message to that cart to verify the proper time slot data.

The base increases frame size when the number of unavailable subframes slots present in any of the currently allocated frames is less than a threshold allowed for some margin. Further, subframes vacated by carts that have left the network are filled with new carts before allocating new frames thereby maximizing channel bandwidth. Carts used for two rounds a day (morning and afternoon) relinquish their time slots after each round and are allocated new frames and time slots by the base at the beginning of the new round.

At the end of the round, the cart requests to exit the network. The base then removes the cart thereby freeing up its allocated time slot for use by other carts. If the cart is turned off before requesting exit, the base removes the cart from the network after a predetermined period of time, for example, 15-minutes, of not receiving transmissions from that cart.

Network Channel Transition

FCC rules require sharing of channels in the 450–470 MHz range by all users, although a fixed limit does not exist for any particular user's length of stay on such a channel. To preclude any apparent, much less actual, monopoly of a channel by the PROLINK system, several techniques are employed. First, the PROLINK system operates under the UHF offset channel telemetry rules with no more than 2 watts power and an antenna height no greater than 20 feet, which limits both transmission range and interference potential. Under FCC UHF offset band rules, no limitation is placed on the number of frequencies that may be held by a user, and typically, the PROLINK system would maintain from three to six frequencies. Second, the PROLINK system dictates frequent hops to alternate frequencies to allow other users to gain access to the channels to be shared.

The upper nibble of byte 5 in the network control packet (base packet 3) indicates the channel to be used by the cart. If this packet contains a different channel designation than the current channel, all carts are obliged to switch to the new channel at the end of the frame cycle. This is achieved by reprogramming the cart's RF card frequency synthesizers. The base transmission, immediately following a channel change, is padded at the beginning with 20-bytes of non-information bearing data. This enables all carts to begin switching channels at the end of the old frame cycle, and allows time for the frequency synthesizers to be reprogrammed, settle, and return to lock during the first frame of the new frame cycle without loss of any critical cart-specific information. Since the frequency synthesizers can be reprogrammed and settle within 150 ms, all carts are ready to transmit in their respective frames by the time the base completes its transmission.

The base refrains from sending any cart specific packets (packets 1 and 4) until it has received at least one DGPS packet acknowledge (cart state packet byte $\mathbf{0}=50_{hex}$) on the new channel from the cart for which the specific packet is intended. This avoids the possibility of transmissions by the base to a specific cart in the unlikely event that the cart failed to make the designated channel change.

Referring back to FIG. 3, the PROLINK base station employs two PROLINK Computer Units (PCUs)—one of which is the primary base transceiver (44) that operates the entire communications network, and the other (51) serving as a scanner to check all channels for traffic. Upon request by the CMC, PCU 51 reports all current channel traffic activity on which the CMC will base a decision on moving to a new channel.

When a change of channel is decided, the base maintains the upper nibble of byte 5 set to the new channel over the entire frame cycle so that all carts are notified. Once a channel change is declared, it is not subject to change in mid-cycle, which means that a problem could erupt if a shared channel user were to usurp the channel in a frame cycle period and find that the entire network is displacing it on the selected channel at the end of the first frame cycle. To avoid this, however, PCU 51 transmits a Morse Code station identification on the new channel immediately after the channel change has been declared and for that entire frame cycle, so that the PROLINK system immediately "claims" the new channel when it is available, and satisfies the FCC identification requirement.

As a further protection against a cart not receiving a channel change notice (packet 3), the cart, upon recognizing that it is not receiving any further base station transmissions, is adapted to begin scanning each channel with a per-channel dwell time of 2 seconds until it locates the base message. During the scan period, the cart is precluded from transmitting, and when the DGPS packet is received the cart acknowledges such receipt to inform the base station it is available.

To prevent the system from monopolizing a particular channel for too long an interval, the base station occupies a channel for only a predetermined maximum length of time. A channel change will occur after this predetermined time or if a channel intrusion is detected, as will be discussed hereinafter.

Network Emergency Use Access

FCC rules specify that shared channel users declaring a life threatening emergency have channel priority over all others until the emergency has subsided. As the PROLINK system does not employ voice recognition to recognize a declaration of emergency authorization on a particular channel, the following procedure is implemented. If the base detects eight cart state packet transmission failures over two consecutive frames, it assumes that someone has "stepped on" (seeks to confiscate) the channel. The base then immediately ceases all transmission on that channel, and shifts to a clear channel. The carts go through a scanning exercise of the type described above to locate the new base channel. No cart specific packets (packets 1 and 4) are broadcast by the base until a cart DGPS packet acknowledge is received from the cart on the new channel.

Alternatively, the base can invoke a duty cycle on network operations so that the network alternates between operating normally for a predetermined period of time and pausing for another predetermined period of time to allow access to the channel by any shared channel users or emergency users. The network duty cycle is controlled by byte 8 of the network control packet, in which the most significant nibble controls the network "on" period and the least significant nibble controls the network "off" period. A change in the network duty cycle is asserted by the base at the beginning of a frame cycle, in the network control packet. A Received Signal Strength Indicator is used by the base and the carts during the network "off" time to determine if someone cut in on the channel.

Network Station Identification

FCC rules require that the base broadcast a Morse code station identification at least once every 15 minutes. This is done automatically by the scanning receiver just before every network channel change when the new channel is claimed, after an old channel is left, and during duty cycle off periods.

Network Stop & Restart

The base station can prevent carts from transmitting in their time slots by setting the upper nibble of byte 5 of the network control message to $1_{hex}$ at the beginning of a frame cycle, and transmitting a network control packet with the network halt bit asserted for each frame in the frame cycle. This process is continued until all carts are known to be off the air. This capability to halt the network is provided principally for test purposes.

During the halt period, the base and the carts continue propagating the frame count and 2048 Hz counts, and all functions remain operational except the actual broadcast of information in the allocated time slot. The base may continue to broadcast if desired, but without the expectation of any cart response until the network is commanded to restart. Network restart is commanded by the base station by sending a network control packet with the upper nibble of byte 5 set to $2_{hex}$. This process is continued until all carts are known to be on the air through their DGPS packet acknowledges.

Network Robustness

It will be observed from the foregoing descriptions that, in general, the PROLINK variable length network is a hybrid acknowledge based and repeat request based system. The base only requires the cart to acknowledge successful receipt of certain packets at certain times. The base only requests an acknowledge from a cart in one packet type in an entire frame cycle, since the cart can respond only once each frame cycle. For redundancy, the base may broadcast the same packet type with the acknowledge request set many times over the frame cycle to provide the cart a higher probability of receiving the packet, but an acknowledge would not be expected until the cart has the opportunity to broadcast in its time slot. If the base fails to receive the appropriate cart acknowledge, it assumes the cart failed to receive the packet properly and re-transmits the packet until the cart acknowledges. When no packets in a base message request acknowledge, and no golfer status is to be sent, the cart automatically sets the DGPS acknowledge condition.

Each packet has certain unique error handling aspects as follows.

Base DGPS Packet

Each time a cart receives a DGPS packet with the acknowledge request set, the DGPS packet acknowledge must be set in the next-cart state packet transmission. Additionally, the cart sets the DGPS packet acknowledge if no other acknowledges are set or other cart status, such as golfer requests, are required, to act as a cart "heart beat" monitor.

Base Text Message Packet

Text messages are sent from the base station to the carts over as many as 16 frames, and the carts acknowledge only the successful receipt of the entire text message in the cart state packet (byte 0). If a text frame is in error, the carts can request a re-transmission of the specific frame via the cart state packet. If multiple frames are in error, the cart must broadcast a re-transmission request for each errant text frame one frame at a time until a successful receipt of the entire message can be acknowledged to the base.

Base Pin/Tee Box Placement Packet

The base sends a pin/tee box placement (one packet for each course hole) every 16 seconds.

Base Network Control Packet

A network control packet is broadcast every 4 frame cycles by the base, and each cart is required to send an acknowledge only if the acknowledge is requested by the base.

Base Cart (Rogue) Control Packet

Cart/rogue control packets are addressed to specific carts only, and a cart is required to acknowledge successful receipt of such a packet only if the acknowledge is requested by the base.

System Data Packet

System Data Packets are broadcast at approximately a rate of once every 5 minutes. The cart never acknowledges the receipt of a System Data Packet.

Cart State Packet

The cart state packets are sent by the carts to the base. If the base fails to receive 4 consecutive cart state packets during the allocated time slot, a re-transmission request is sent via the cart control packet (byte 2).

Cart Extended Status Packet

Cart extended status packets are sent by the carts to the base. However, broadcast of the extended status packet is minimized because its transmission does not provide a cart location update to the base station. To that end, rules established for cart transmissions are that the base is always the highest priority requester for the cart, re-transmit requests have the second priority, and golfer requests are the third priority. A cart extended status packet is sent to the base only if multiple acknowledge requests have been made by the base without the cart having been given an opportunity to respond, or if re-transmit requests cannot be sent within the second frame cycle following the request, or if the golfer request cannot be sent within the third frame cycle following the request.

Score/Play Speed Packet

Score/Play Speed Packets are broadcast by the cart to the base after completion of each golf hole of play. The base is required to acknowledge the receipt of every Score/Play Speed Packet. The cart also periodically examines whether acknowledges have been received for previous play holes, and if not, resends the Score/Play Speed Packet to the base.

Distance Traveled Packet

A Distance Traveled Packet is broadcast by the cart to the base only at the completion of each golf round of play. The base is required to acknowledge the receipt of every Distance Traveled Packet. The cart is required to resend a distance traveled packet up to two times if it has not yet received an acknowledge from the base before ceasing operation.

Message and Packet Structures

Messages and packets are segregated into base groups and roving groups, with only one base message for the single base station, but as many roving messages as there are roving units on the variable length network. Base message and roving message structures differ for bandwidth efficiency reasons. In this description, the convention is that a byte consists of 8 bits and a word consists of 16 bits (i.e., a double byte), with bit 0 being the least significant bit (LSB) for all bytes and words. In words of a message, the most significant byte is byte 0 and the least significant byte is byte 1. This corresponds to the convention used in Motorola processors, and the Motorola 68332 processor Queued Serial Peripheral Interface (QSPI) transmits and receives the most significant bit first. The base packets and roving packets are as follows:

| | Base Packets | |
|---|---|---|
| Packet Identification | Packet Function | Broadcast Rate |
| $00_{hex}2$ | Differential GPS | 1 Hz |
| $01_{hex}$ | Text Message | As Required |
| $02_{hex}$ | Pin/Tee Box Placement | 1 hole each 16 sec |
| $03_{hex}$ | Network Control | 1 time each 4 frame cycles |

-continued

Base Packets

| Packet Identification | Packet Function | Broadcast Rate |
|---|---|---|
| | | minimum or on channel/size change |
| $04_{hex}$ | Roving Unit Control | As Required |
| $05_{hex}$ | System Data | As Required |

Roving Unit Packets

| Packet Identification | Packet Function | Broadcast Rate |
|---|---|---|
| $00_{hex}$ | Roving Unit State | Depends on Network Size |
| $01_{hex}$ | Extended Status | When required only |
| $02_{hex}$ | Speed of Play | When required only |
| $03_{hex}$ | Distance travelled/On Time | |

The Base Group

Up to 64 messages are possible in the base group, but only a single message is required because of the need for only one base station to support the PROLINK system. Each message may contain up to 256 unique packets, but multiple packets of like number can be sent in the same message subject to message space availability.

Base Message Structure

The base message consists of a bit synchronization word (16 bits), a message identification byte (8 bits), a number of message bytes, a header error detection byte, and packets, as defined in the following Table.

Base Message Structure

| Byte | C Language Type | Byte Identification | Range |
|---|---|---|---|
| 0–1 | unsigned short | bit synchronization | $BFFF_{hex}$ |
| 2 | unsigned char | message identification | $40_{hex}$–$7F_{hex}$ |
| 3–4 | unsigned short | number of message bytes | $0000_{hex}$–$FFFF_{hex}$ |
| 5 | unsigned char | header error detection | $00_{hex}$–$FF_{hex}$ |
| 6 | unsigned char | first packet identification | $00_{hex}$–$FF_{hex}$ |
| — | — | — | — |
| — | — | — | — |
| — | unsigned char | second packet identification | $00_{hex}$–$FF_{hex}$ |
| — | etc. | | |

A Motorola 68332 Time Processor Unit (TPU) is used for bit synchronization. To support TPU detection of bit synchronization, the bit sync word is $BFFF_{hex}$, and the most significant bit (MSB) of the message identification byte must be low. Also, a selected bit, for example bit 14, of byte 2 is chosen to be high to distinguish a cart-based message from a base station message. Thus, a maximum of 64 ($7F_{hex}$–$40_{hex}$) messages may exist. Details of bit synchronization are discussed below.

The number of bytes in a message is limited to 64K (actually, 65,535) by bytes 3 and 4, with consideration given to the physical hardware synchronization mechanism and stability over time. The header error detection upper nibble are the four error detection bits for bytes 2 and 3 while the lower nibble are the error detection bits for byte 4 and a pad byte. The first packet immediately follows the message header, the second packet immediately follows the first, and so on until all packets are embedded in the message. Any dead (unfilled) space between the last packet and the end of the fixed length message is set to $1_{hex}$ (binary 0000 0001). This pattern minimizes interrupts to the 68332 processor, while establishing the proper state for the next receive message to AC couple data from a receiver quadrature detector. A maximum of 96 bytes (768 bits) may be broadcast from the base in any single base message.

Base Packet Structure

Each base packet has a common structure with unique contents to support software commonality. The common structure is a header byte in the byte 0 packet position, and an error detection word or words as the last four bytes in the packet. The MSB of the header byte may be set to request an acknowledge from the receiving rogue(s), so that up to 128 unique packets can be transmitted from the base to the rogues. For example, a packet identification of $81_{hex}$ is identical to $01_{hex}$ to the receiving rogue except the $81_{hex}$ case requires a hard "acknowledge" from the rogue while an $01^{hex}$ does not. A total of 6 base packets is used in the preferred embodiment, viz., (1) a DGPS packet, (2) a text message packet, (3) a pin/tee box placement packet, (4) a network control packet, (5) a rogue control packet, and (6) a system data packet. The contents of these packets are defined below.

DGPS Packet

According to another aspect of the invention, the differential GPS packet is structured in an innovative way. An industry standard known as the "RTCM-104 technical standard for transmission of differential corrections to GPS receivers" contains a message structure used by most of the GPS receivers and base stations to transmit and receive information. The RTCM-104 standard structure was originally developed to meet a U.S. Coast Guard desire to transmit information at 50 bps in the same format as the GPS satellite signals themselves. The Coast Guard carried over a 6 bit parity implementation for error detection used by the GPS satellites, in the form of a cyclic code. In that code, the last bit of each transmitted word determines the polarity of the following transmitted word. Hence, all of the words in the message are chained together in a way that the last bit of each word influences the next word. In a typical RTCM-104 differential correction, as many as 1500 bits of information may be transmitted for the satellite corrections to be applied by the GPS receiver. Unfortunately, in transmitting such a long serial chained bit stream, any channel noise that corrupts one of those bits, creates a strongly likelihood that the entire 1500 bits will be unusable.

In the PROLINK system, the RTCM-104 standard is used in the base station on a NAVSTAR XR5M6 GPS receiver, but the standard message format is repackaged in a much more robust format. To that end, each individual satellite range and range rate is assembled in a message sub packet that has error detection on the sub packet. All of these satellite packets are then stacked up and transmitted together to the carts. The carts then monitor each sub packet, i.e., satellite measurement, for errors. If no error is present, that sub packet is set aside and all remaining packets are checked. Sub packets with errors are discarded. Error-free packets, i.e., for which the satellite range or range rates were broadcast correctly, are reassembled into the RTCM-104 standard message format and transmitted to the GPS receiver.

The advantage of this solution resides in the ability to individually decide which pieces, i.e., which satellites of the 1000 or 1500 bit RTCM stream, are corrupted and to discard those pieces (the corrupted satellites) while retaining and using the ones that are good. Perhaps six out of eight are good, or only four, or all are good, but in any event the determination of "good pieces" ensures much more effective operation. The update rate will be once per second for differential corrections, a desirable outcome considering having been confronted with the possibility of having to discard 1500 bit long streams merely because one bit was corrupted.

Differential GPS corrections are provided in the RTCM-104 format from the GPS receiver 42 to the CMC 41, where they are repackaged into sub packets constituting a less complicated data format and a more robust form for RF transmission. The CMC then places all of these sub packets in the DGPS packet for broadcast to the rogues, with the first sub packet always being the RTCM-104-derived header sub packet. This is followed by either differential correction sub packets formed from a type 1 RTCM-104 message, delta differential correction sub packets formed from a type 2 RTCM-104 message, or constellation health sub packets formed from a type 5 RTCM-104 message.

The header contains information regarding the sub packet type following the header, and the number of such sub packets in the DGPS packet. Only a header sub packet and multiple sub packets of the single type defined in the header are allowed in each DGPS packet, i.e., multiple types are not allowed. For example, differential correction sub packets and delta differential correction sub packets can be sent only in two separate DGPS packets. Multiple DGPS packets may be included in any one frame.

The DGPS packet is the only variable length packet in the network and is the highest priority base packet since it must be sent at 1 Hz. While the MSB in RTCM-104 is the lower order bit, the MSB in the system of the invention is the higher order bit to maintain common convention with all other packets. A detailed description of the DGPS packet is illustrated in the following Table.

| | | Packet 0 - DGPS | |
|---|---|---|---|
| Byte | C Language Type | Byte Identification | Range |
| 0 | unsigned char | packet identification | $80_{hex}$ or $00_{hex}$ |
| 1 | N/A | start of header sub packet | |
| — | | | |
| 6 | N/A | end of header sub packet | |
| 7 | N/A | start of first sub packet defined in header (length = i) | |
| — | — | — | — |
| 7 + i - 1 | N/A | end of first sub packet defined in header (length = i) | — |
| 7 + i | N/A | start of second sub packet defined in header (length = i) | |
| — | — | — | — |
| 7 + 2 * i - 1 | N/A | end of second sub packet defined in header (length = i) | — |
| — | — | — | — |
| 7 + N * i | N/A | start of $N^{th}$ sub packet defined in header (length = i) | |
| — | — | — | — |
| 7 + (N + 1) * i - 1 | N/A | end of $N^{th}$ sub packet defined in header (length = i) | |

The packet identification byte (0) for the DGPS packet is 0, by definition. An $80_{hex}$ requires the rogue to acknowledge the successful receipt of the packet; a $00_{hex}$ does not. The data sub packet is of length i, determined by the rogues from the sub packet type defined in the header sub packet, and N data sub packets of the same type are included in one DGPS packet. The DGPS packet is the only packet that does not have error detection since there is adequate error detection on all sub packets.

Header Sub Packet

The header sub packet which is formed from the RTCM-104 header is illustrated in the following Table.

| | | Header Sub packet | |
|---|---|---|---|
| Byte | C Language Type | Byte Identification | Range |
| 0–1 | unsigned short | sub packet type/number of following sub packets | $0000_{hex}$–$FFFF_{hex}$ |
| 2–3 | unsigned short | modified Z-count/station health | $0000_{hex}$–$FFFF_{hex}$ |
| 4 | unsigned char | error detection | $00_{hex}$–$FF_{hex}$ |

The RTCM-104 header preamble ($66_{hex}$) is not included in the header sub packet for bandwidth efficiency reasons. Accordingly, the roving unit must insert the preamble during RTCM-104 message reconstruction for transfer to the GPS engine, which is a generic term used to describe a GPS receiver circuit card. Bytes 0 and 1 for the header sub packet are broken out as illustrated in the following Table.

| Bytes 0–1 | |
|---|---|
| Bits | Function |
| 15–10 | sub packet type (range 1 to 64 where 64 = $000000_{binary}$) |
| 9–5 | Number of sub packets |
| 4–0 | spares |

The sub packet type is equivalent to the RTCM-104 message type (frame ID).

Bytes 0 and 1, bits 5–9 also contain the number of sub packets following but not including the header sub packet. The number of sub packets is not a direct RTCM-104 value. RTCM-104 specifies a length of frame value in 30 bit words where data occupies 24 bits and the remaining 6 bits are for parity. An RTCM-104 message has a length of N+2 words, where N=number of words in the message and the two extra words are for the header.

Bytes 2 and 3 for the header sub packet are identical to the RTCM-104 modified Z-count and station health. The three bit RTCM-104 sequence number is not broadcast as part of the header. The rogue is required to create, implement, and rollover the sequence number upon receipt of each DGPS packet before the handover to the GPS engine. Bytes 2 and 3 are defined as follows:

| Bytes 2–3 | |
|---|---|
| Bits | Function |
| 15–3 | modified Z-count (LSB = 0.6 seconds) |
| 2–0 | station health |
| | $000_{binary}$ = station staleness < 12 seconds |
| | $001_{binary}$ = station staleness < 18 seconds |
| | $010_{binary}$ = station staleness < 24 seconds |
| | $011_{binary}$ = station staleness < 48 seconds |

-continued

Bytes 2–3

| Bits | Function |
|---|---|
| | $100_{binary}$ = station staleness < 96 seconds |
| | $101_{binary}$ = station staleness ≥ 96 seconds |
| | $110_{binary}$ = reference RTCM-104 MSG type 16 |
| | $111_{binary}$ = reference station not working |

Each type 1 and type 2 message may contain as many SV (satellite vehicle) corrections and delta corrections as the number of SV's in view. A single correction requires 40 bits. If the last correction does not end on an integer word, fill bits are used to pad to the end of the last data (24 bits) in a 30 bit word, in a fill pattern of alternating 1's and 0's. Thus, a conversion from the RTCM-104 length of frame to the header sub packet number of sub packets for a type 1 or type 2 RTCM message is:

of sub packets=(int) ((RTCM-104 length of frame)*24/40)

where the calculation is carried out by the base station. When the roving unit reconstructs the RTCM-104 message (using only sub packets received error-free) to be turned over to the GPS engine, it computes the RTCM-104 length of frame from the number of "good" sub packets by reversing the above equation.

The byte 5 error detection upper nibble is for bytes 0 and 1 and the lower nibble is for bytes 2 and 3. If the header sub packet is in error, all remaining DGPS packet sub packets are discarded before any decoding begins.

Differential Correction Sub Packet

A differential correction sub packet follows the header sub packet, containing a single SV differential correction derived from a type 1 RTCM-104 message, and is illustrated in the following Table.

Differential Correction Sub packet

| Byte | C Language Type | Byte Identification | Range |
|---|---|---|---|
| 0 | unsigned char | scale factor/UDRE/SV ID | $00_{hex}$–$FF_{hex}$ |
| 1–2 | short | pseudo range correction | $0000_{hex}$–$FFFF_{hex}$ |
| 3 | short | range rate correction | $00_{hex}$–$FF_{hex}$ |
| 4 | unsigned char | issue of data | $00_{hex}$–$FF_{hex}$ |
| 5 | unsigned char | error detection | $00_{hex}$–$FF_{hex}$ |

Byte 0 contains a pseudo range/range rate scale factor, User Differential Range error (UDRE), and satellite identification, as shown in the following Table.

Byte 0

| Bits | Function |
|---|---|
| 7 | pseudo range/range rate scale factor |
| | (0: PR = 0.02 m, RR = 0.002 m/s) |
| | (1: PR = 9.32 m, RR = 0.032 m/s) |
| 6–5 | UDRE |
| | $00_{binary}$ - $1\sigma \leq 1$ meter |
| | $01_{binary}$ - 1 meter < $1\sigma \leq 4$ meters |
| | $10_{binary}$ - 4 meters < $1\sigma \leq 8$ meters |

-continued

Byte 0

| Bits | Function |
|---|---|
| | $11_{binary}$ - $1\sigma > 8$ meters |
| 4–0 | SV ID range = 1 to 32, where 32 = $00000_{binary}$ |

The issue of data (byte 4) is defined in U.S. D.O.D. Interface Control Document—GPS-200 and is a unique byte for each SV that corresponds to the ephemeris version used to compute the SV pseudo range and range rate. Bytes 1 and 2 contain the pseudo range correction for the SV identified in byte 0 bits 4-0. Byte 3 contains the range rate. The pseudo range and range rate LSB scale factors are defined in byte 0 bit 7, where the pseudo range correction is a 16 bit quantity and the range rate correction is an 8 bit quantity. The byte 5 error detection upper nibble is for bytes 0 and 1 and the lower nibble are error detection for bytes 2 & 3. The byte 4 issue at data does not require error detection as an invalid value simply results in the SV correction not being used by the GPS engine. If the differential correction sub packet is in error, the sub packet is discarded. The roving unit uses only validated differential correction sub packets when reassembling the RTCM-104 message for transmission to the GPS receiver.

Delta Differential Correction Sub Packet

The delta differential correction sub packet follows the header sub packet and contains a single SV delta differential correction derived from a type 2 RTCM-104 message as illustrated in the Table below.

Delta Differential Correction Sub packet

| Byte | C Language Type | Byte Identification | Range |
|---|---|---|---|
| 0 | unsigned char | SF/UDRE/SV ID | $00_{hex}$–$FF_{hex}$ |
| 1–2 | unsigned char | delta pseudo range correction | $0000_{hex}$–$FFFF_{hex}$ |
| 3 | short | delta range rate correction | $00_{hex}$–$FF_{hex}$ |
| 4 | char | issue of data | $00_{hex}$–$FF_{hex}$ |
| 5 | unsigned char | error detection | $00_{hex}$–$FF_{hex}$ |

This sub packet is identical to the differential correction sub packet in all bit, byte, word scaling and definitions. Its purpose is to provide SV ephemeris corrections when the base GPS receiver begins using a new ephemeris for an SV. In this case, the base station may have a different issue of data from the roving unit. The delta message corrects for this ephemeris difference until the roving unit acquires the new SV ephemeris in the 50 bits per second (bps) GPS SV digital transmission.

The byte 5 error detection upper nibble is for bytes 0 and 1 and the lower nibble is for bytes 2 & 3. The byte 4 issue of data does not remove error detection since an error simply results in the SV correction not being used by the GPS engine. If the delta differential correction sub packet is in error, the failing sub packet is discarded. The roving unit uses only validated delta differential correction sub packets when reassembling the RTCM-104 message for transmission to the GPS receiver.

Constellation Health Sub Packet

The constellation health sub packet is identical to the RTCM-104 type 5 message, and covers only one SV at a time, as illustrated in the following Table:

Constellation Health Sub packet

| Byte | C Language Type | Byte Identification | Range |
|---|---|---|---|
| 0–2 | N/A | constellation health | $000000_{hex}$–$FFFFFF_{hex}$ |
| 3 | unsigned char | error detection | $00_{hex}$–$FF_{hex}$ |

Bytes 0–3 are coded as shown in the following Table:

Bytes 0–2

| Bits | Function |
|---|---|
| 23–19 | Satellite ID: SV ID range = 1 to 32 and where 32 = $00000_{binary}$ |
| 18 | Issue of data link: 0 indicates this information refers to nav data with IOD in type 1 or type 9 message. 1 indicates this information refers to nav data with IOD in type 2 message |
| 17–15 | Data health: see table 20-VII of ICD-GPS-200 |
| 14–9 | Carrier to noise ratio: sf = 1dB/Hz, range = 25 to 56, LBS is bit 13 |
| 8 | Health enable: if 1, SV is healthy even though SV nav data indicates unhealthy |
| 7 | New navigation data: new SV nav data is being collected that will soon result in new IOD for the type 1 message |
| 6 | Navigation data warning: a 1 indicates a problem in SV nav data |
| 5 | Loss of satellite warning: if i then SV is scheduled to be switched to unhealthy |
| 4–2 | Time to unhealthy: if but 17 is set, then bits 18–21 define how much time until the SV is set unhealthy. LSB = 5 minutes. Range is 0 to 80 minutes |
| 1–0 | spares |

The byte 4 error detection upper nibble is used for bytes 0 & 1 and the lower nibble is used for byte 2 and a pad byte=$0_{hex}$. If the constellation health sub packet is in error, the failing sub packet is discarded. The roving unit uses only validated constellation health sub packets when reassembling the RTCM-104 message for transmission to the GPS receiver.

Text Message Packet

The text message packet enables the course manager to send a common message to all roving units (golf carts), or to send specific messages to any individual golf cart. A common message, for example, might be the score of a game, a lunch special, or other information which the course manager desires to transmit to all active carts. A unique message to a specific cart might be warnings regarding unauthorized behavior (e.g., driving the cart on the green), or a message from a business associate. Up to 24 characters can be transmitted at one time in a packet; however, up to 16 frames of the packet can be transmitted, which allows a total message length of 384 characters including punctuation and spaces (amounting to about five full text lines). The roving units do not display any part of the message until all frames have been received successfully. At that time the entire message is displayed in a pop up window.

The text message packet structure is illustrated as follows:

Packet 1 - Text Message Packet

| Byte | C Language Type | Byte Identification | Range |
|---|---|---|---|
| 0 | unsigned char | packet identification | $01_{hex}$ |
| 1 | unsigned char | cart address | $00_{hex}$–$FF_{hex}$ |
| 2 | unsigned char | issue of data message | $00_{hex}$–$FF_{hex}$ |
| 3 | unsigned char | number of frames for message/ current frame number | $00_{hex}$–$FF_{hex}$ |
| 4 | unsigned char | ASCII character 1 | $00_{hex}$–$FF_{hex}$ |
| 5 | unsigned char | ASCII character 2 | $00_{hex}$–$FF_{hex}$ |
| 6 | unsigned char | ASCII character 3 | $00_{hex}$–$FF_{hex}$ |
| — | — | — | — |
| 27 | unsigned char | ASCII character 24 | $00_{hex}$–$FF_{hex}$ |
| 28 | unsigned char | error detection | $00_{hex}$–$FF_{hex}$ |

The packet identification (byte 0) for the text packet is 1. A cart address (byte 1) of $00_{hex}$ is the all call address and is set if it is desired for all carts to receive a transmission. Any other address will communicate only with the specific cart number identified by the address, and with no other carts on the course.

Byte 2 is an Issue of Data Message (IODM) that identifies a particular message being sent from other messages either recently sent or to be sent. The purpose is to avoid confusion by roving units that successfully received a text message if the same text message is repeated at the request of other roving units that did not receive the original or received it in error. The IODM starts at $00_{hex}$ and increments by one each time a new text message is transmitted. In a repeat of a text message the IODM is set to the IODM that accompanied the original of that text message. When the IODM gets to $FF_{hex}$, it simply reverts to $00_{hex}$.

In byte 3, the upper nibble is the total number frames required to send the complete message, and the lower nibble is the frame number of the current transmission. Thus, if the message was to be sent in 12 total frames (frames 0 through 11) and frame 10 is currently being sent, byte 3 would be equal to $CA_{hex}$. A zero for each of the upper and lower nibbles of byte 3 indicates that the message consists of 16 frames and that frame 0 is currently being sent. This mechanization allows the roving unit to know if any frames were missed, and to request a repeat of a specific frame instead of the entire message, with concomitant saving of bandwidth and time.

Bytes 4 through 27 are the 24 specific ASCII characters that make up the piece of the message for the particular frame. The upper bit of each byte is an odd parity bit. If the parity for any character fails the entire packet is considered bad. Byte 28 is the error detection for the text message packet header with the upper nibble supporting bytes 0 & 1 and the lower nibble supporting bytes 2 & 3. Any detected error shall result in the entire packet being discarded.

Pin/Tee Box Placement Packet

Many courses change their pin locations on each hole on a daily basis. Although tee box locations are typically changed less frequently, an automated technique for updating the system database is still a requirement. To that end, in the PROLINK system a pin/tee box placement packet is broadcast every 16 seconds for each hole of the course. The "power on" default assumption (until an update is available) for all carts is that the pin is in the center of the green and the tee box locations have not changed from the previously stored baseline. Since the packet contains information for one hole, a total of 18 different packets are sent, one each 16 seconds in succession. A round of golf consists of 18 holes; therefore, all 18 pin/tee box placement packets are broadcast every 288 seconds.

The pin/tee box placement packet is preferably assigned the lowest order of packet transmission priority, which is to say that if a base message has no space available, broadcast of the pin/tee box placement packet may be deferred to a subsequent frame in which space is available. Partly for that reason, although the 18 packets should be periodic on 16 second intervals, they may be distributed in any desired sequence throughout the 288 second interval to optimize message loading. This particular packet structure is defined in the following Table.

| \multicolumn{4}{c}{Packet 2 - Pin/Tee Box Placement} |
|---|---|---|---|
| Byte | C Language Type | Byte Identification | Range |
| 0 | unsigned char | packet identification | $02_{hex}$ |
| 1 | unsigned char | hole number | $00_{hex}$–$FF_{hex}$ |
| 2–3 | short | pin X position (LSB = $2^{-3}$) | $8000_{hex}$–$7FFF_{hex}$ ($2^{s}$ complement for) –4096 m– 4095.875 m |
| 4–5 | short | pin Y position (LSB = $2^{-3}$) | $8000_{hex}$–$7FFF_{hex}$ ($2^{s}$ complement for) –4096 m– 4095.875 m |
| 6 | unsigned char | front tee/front-middle tee | $00_{hex}$–$FF_{hex}$ |
| 7 | unsigned char | back-middle tee/back tee | 00hex–FFhex |
| 8–9 | unsigned short | packet checksum | $0000_{hex}$–$FFFF_{hex}$ |

The packet identification (byte 0) is 2, by definition. The hole number (byte 1) can range theoretically from 1 to 255 with an 8-bit byte, although nothing beyond coverage of a 54 hole course would be required as a practical matter. The pin position for the hole is precisely indicated by bytes 2–3 and 4–5, while bytes 6–7 indicate all tee box locations. For instance, the upper nibble of byte 6 contains the tee box number that is the active front tee box, and the lower nibble of byte 6 contains the tee box number that is active in the front-middle position. Similarly, the upper and lower nibbles of byte 7 indicate active back-middle and active back (championship) positions of the respective tee boxes.

With a maximum of 16 different tee box locations allowed on each hole, colors for the active tee boxes (which are generally unique to the specific course) are stored in the course data base. The color schedule is common to both the base station and the carts. On courses having only three tee boxes, the back-middle tee identifier is $0_{hex}$. Bytes 8 and 9 are the error detection bits with bytes 0 & 1 using the upper nibble of byte 8, bytes 2 & 3 using the lower nibble of byte 8, 4 & 5 using the upper nibble of byte 9, and 6 & 7 using the lower nibble of byte 9. If an error is detected the packet is discarded.

Network Control Packet

A network control packet provides information to all carts for cold start when adequate UTC (universal Time Coordinated) time and position data are not available from the GPS engine. This packet also contains cues for changing the network frequency, number of carts on the network, and halting or restarting the communications network under certain conditions. The packet is broadcast interval is four times the number of frames in a frame cycle and can be broadcast immediately when a network reconfiguration is required. The network control packet is defined as follows:

| \multicolumn{4}{c}{Packet 3 - Network Control} |
|---|---|---|---|
| Byte | C Language Type | Byte Identification | Range |
| 0 | unsigned char | packet identification | $03_{hex}$–$83_{hex}$ |
| 1–2 | unsigned short | GPS week since Jan 6, 1980 | $0000_{hex}$–$FFFF_{hex}$ |
| 3–4 | unsigned short | seconds in the week since midnight Saturday (LSB = 10 seconds) | 0–604,800 s |
| 5 | unsigned char | frequency / network status | $00_{hex}$–$FF_{hex}$ |
| 6 | unsigned char | current number of frames / new number of frames | $00_{hex}$–$FF_{hex}$ |
| 7 | unsigned char | network frame counter | $00_{hex}$–$FF_{hex}$ |
| 8 | unsigned char | network duty cycle control | $00_{hex}$–$FF_{hex}$ |
| 9 | unsigned char | spare | $00_{hex}$ |
| 10, 11, 12 | unsigned char | error detection | $000000_{hex}$–$FFFFFF_{hex}$ |

The packet identification (byte 0) is 3. An $83_{hex}$ requires the cart to acknowledge successful receipt of a packet, whereas an $03_{hex}$ requires no acknowledgement. The Rockwell Navcore V GPS engine receives its initialization data from the network control packet (bytes 1–4) as shown in the above table. The GPS time (bytes 1–4) is broadcast in a different format from that required by the Rockwell Navcore V, to save bandwidth. The GPS week (bytes 1–2) started (week 0) on Sunday morning, Jan. 6, 1980. Bytes 3–4 contain the number of seconds since the beginning of the GPS week scaled at 10 seconds per bit. The CPU card should reformat the time data to that required by the Navcore V. In addition to time, the GPS engine needs the initial position for rapid acquisition. Since each cart has the defined location of the origin of the course map coordinate system in memory to support course reference frame positioning, this latitude, longitude and altitude can be used to initialize the GPS engine.

The upper nibble of byte 5 indicates the channel to be used by the network, and the lower nibble shows the network control commands. Byte 5 is described further in the following Table:

| | Byte 5 | |
|---|---|---|
| Bits | Function | |
| 0–3 | bits 0–3 = $0_{hex}$ --> network continues operating in its previous state | |
| | bits 0–3 = $1_{hex}$ --> halt network (rogues immediately cease transmitting) | |
| | bits 0–3 = $2_{hex}$ --> restart network (rogues immediately begin transmitting in their time slots defined by bytes 16 and 17 conditioned by byte 18 - duty cycle) | |
| | bits 0–3 = $3_{hex}$ --> station identification to follow | |
| | bits 0–3 = $4_{hex}$ --> Spare | |
| | — — — — — | |
| | — — — — — | |
| | — — — — — | |
| | bits 0–3 = $F_{hex}$ --> Spare | |
| 4–7 | bits 4–7 = $0_{hex}$ --> tune to channel 10 | |
| | bits 4–7 = $1_{hex}$ --> tune to channel 1 | |
| | — — — — — — — — | |
| | — — — — — — — — | |
| | — — — — — — — — | |
| | bits 4–7 = $F_{hex}$ --> tune to channel 15 | |

The correlation between channel number and frequency is part of the unique course database.

Byte 6 is used by the carts to compute new broadcast time slots. The upper nibble of byte 6 contains the old number of unique network frames with a range from 0 to 15, and the lower nibble contains the new number of unique frames with a range from 0 to 15. If the upper and lower nibbles are equal, then a network reconfiguration (time slot change) will not take place. If they differ, the carts must then compute their new time slot by using byte 6 and their previous respective time slot. The algorithm used by a cart for that purpose will be defined presently.

Byte 7 is the network frame counter indicating the current frame being used by the network when the network control packet is received. Broadcast of the frame counter is performed to ensure the carts know the current frame. With 16 possible frames, the frame counter range is $00_{hex}$ to $FF_{hex}$.

Network duty cycle is to provide off time for compliance with the FCC shared channel rules and to ensure there is an off time available for transmission of the channel id Morse code signal. The most significant 5 bits of byte 8 (bits 7–3) define the network on-time, and the least significant 3 bits define the network off-time. Byte 8 is further described by the Table below.

| | Byte 8 | |
|---|---|---|
| Bits | Function | |
| 0–2 | (bits 0–2) * 2 seconds off time per period (range = 2 to 16 seconds) | |
| 3–7 | (bits 3–7) * 4 seconds on time per period + (range = 4 to 128 seconds) | |

If byte 8 is $00_{hex}$, the network is "on" at all times, with no dead time for shared channel users to cut in and use the channel. This does not preclude the fact that often the network frequency will be changed to allow shared channel users adequate access. When byte 8 is not zero, the entire communications network (base station and the carts) is allowed to function normally for the time indicated by bits 3–7, and then all transmissions must cease for the time indicated by bits 0–2. This action is carried out periodically by the base station and the carts while byte 8 is non-zero.

The duty cycle parameters are always synchronized to the beginning of the GPS week (bytes 1–2). For example, if byte 8=$A3_{hex}$, the network on time is 80 seconds and the network off time is 6 seconds. The total period is 86 seconds. To synchronize with the current network duty cycle, a cart computes the number of periods since the beginning of the week, and then uses the fractional remainder to determine the duty cycle state for the current period.

Although network off time (bits 0–2) may be selected by a user, care is required since no DGPS corrections are provided during the period of the off time, with consequent potential degradation of yardage accuracy during that period.

Byte 9 is a spare. Bytes 10, 11, and 12 are for error detection in bytes 0–9 respectively.

Roving Unit ("Rogue") Control Packet

A rogue control packet is used by the base station to specify to the carts their respective network transmission time slots, and to request packet transmission repeats when previous rogue packet checksum failures occur. This packet is further defined by the Table below.

| | | Packet 4 - Rogue Control | |
|---|---|---|---|
| Byte | C Language Type | Byte Identification | Range |
| 0 | unsigned char | packet identification | $04_{hex}$ or $84_{hex}$ |
| 1 | unsigned char | cart address | $01_{hex}$–$FF_{hex}$ |
| 2 | unsigned char | re transmit control / current frame | $00_{hex}$–$FF_{hex}$ |

-continued

Packet 4 - Rogue Control

| Byte | C Language Type | Byte Identification | Range |
|---|---|---|---|
| 3 | unsigned char | transmit frame number / total number of frames | $00_{hex}$–$FF_{hex}$ |
| 4 | | subframe/spare | 0–F |
| 5 | | spare | 0 |
| 6–7 | unsigned short | error detection packet checksum | $0000_{hex}$–$FFFF_{hex}$ |

The rogue control packet identification (byte 0) is 84, by definition. An $84_{hex}$ requires acknowledge of the cart's successful receipt of the packet. The cart address (byte 1) is the identification (ID) number assigned by the course administrator to the cart, and ranges from 1 up to 255 carts. Address $00_{hex}$ (the "all call" address) is not allowed, because the rogue control packet is only intended for a specific cart.

The upper nibble of byte 2 of the rogue control packet is a request for re-transmission of previous cart packets either not received as they should have been, or received in error and other miscellaneous cart acknowledges. The lower nibble of byte 2 informs the cart of the current transmission frame on receipt of the rogue control message, to synchronize the cart with the other carts on the network. Byte 2 of this packet is further described in the following table:

| | Byte 2 |
|---|---|
| Bits | Function |
| 7–4 | $0_{hex}$ - null . . . no re-transmission requested<br>$1_{hex}$ - re transmit the last rogue packet<br>$2_{hex}$ - re transmit the second to last rogue packet<br>$3_{hex}$ - re transmit the third to last rogue packet<br>$4_{hex}$ - spare<br>$5_{hex}$ - spare<br>$6_{hex}$ - spare<br>$7_{hex}$ - spare<br>$8_{hex}$ - spare<br>$9_{hex}$ - spare<br>$A_{hex}$ - spare<br>$B_{hex}$ - acknowledges distance/on-time packet<br>$C_{hex}$ - acknowledges golfer's request<br>$D_{hex}$ - acknowledges score/speed of play packet<br>$E_{hex}$ - cease network operation immediately<br>$F_{hex}$ - base acknowledges cart net exit request |
| 3–0 | $0_{hex}$ - frame 0<br>$1_{hex}$ - frame 1<br>$2_{hex}$ - frame 2<br>— — —<br>— — —<br>— — —<br>$F_{hex}$ - frame 15 |

If byte 2 bits 7–4=b $0_{hex}$, then no re-transmission is requested. Bits 3–0 of byte 2 indicate the current frame number in the variable length packet network. The current frame indicator provides the initial condition for the cart to determine its transmission time slot. The cart propagates the frame number internally on each integer GPS second after the initial frame, and rolls over the frame count to maintain synchronization with the base station.

The most significant nibble of byte 3 defines the frame to be used by the cart for transmission of all information to the base station, and the least significant nibble of that byte defines the total number of frames (maximum of 16) currently being used in the variable length network. This information is used by the cart to determine where a frame rollover occurs.

Bits 7–4 of byte 4 define the subframe within the frame at which the cart is authorized to transmit. Each frame contains 16 cart transmit frames (0 to 15). Bytes 5 and 6 are the error detection bytes for bytes 0–4.

System Data Packet

The System Data Packet (packet number five) contains the time zone of operation for the PROLINK system and is broadcast globally to all carts on the course approximately once every five minutes. The remainder of the packet contains spares for future expansion as defined in the table below:

Packet 5 - System Data Packet

| Byte | C Language Type | Byte Identification | Range |
|---|---|---|---|
| 0 | unsigned char | packet id | 0 × 05 |
| 1 | signed char | time zone offset (LSB = 900 seconds) | 2's complement ± 50 (±14 hours) |
| 2–7 | — | spares | 0 |
| 8–9 | unsigned short | error detection | 0000–FFFF |

Byte zero is the System Data Packet ID. Byte one is the time zone offset for UTC time for the particular location of the PROLINK system quantized at 15 minute intervals. The time zone information allows accurate display of local time to golfers during their round. Bytes 2–7 are spares for future expansion. Bytes 8 and 9 are the (20,1) code error detection bits with the upper nibble of byte 8 being used for byte 0 and 1 error detection, the lower nibble of byte 8 being used for byte 2 and 3 error detection and so on through byte 7 of the packet.

The Cart Group

The cart group contains as many cart messages as there are carts. Each message may contain only one packet at any given time, but up to 8 different packets are allowed.

Message and Packet Structures

Cart Message Structure

The cart message consists of a bit synchronization word (16 bits), a combination message identification and packet identification word (16 bits total), and the actual packets. This format is truncated significantly from the base station format for bandwidth efficiency; however, the messages maintain uniqueness between the base station and the carts for easy identification. The cart messages are an exact fixed length (9 bytes), and the base station uses this information to compute the checksum for error detection. The cart message structure is illustrated in the following table:

| Cart Message Structure | | | |
|---|---|---|---|
| Byte | C Language Type | Byte Identification | Range |
| 0–1 | unsigned short | bit synchronization | $BFFF_{hex}$ |
| 2–3 | unsigned short | message/packet identification | $00_{hex}$–$3F_{hex}$ |
| 4 | — | packet contents | — |
| — | — | | — |
| — | — | | — |
| — | — | | — |
| 8 | — | end of packet | — |

The bit synchronization embedded in the cart messages (bytes 0 and 1=$BFFF_{hex}$) is identical to that of the base messages. The message and packet identification are quite different, but are easily separable as follows.

| Bytes 2 and 3 | |
|---|---|
| Bits | Function |
| 15 | 1 - terminate bit synchronization properly |
| 14–7 | Message identification byte (same as rogue ID or address) |
| | $00_{hex}$ - no definition |
| | $01_{hex}$ - cart 1 |
| | $02_{hex}$ - cart 2 |
| | $03_{hex}$ - cart 3 |
| | - - - - |
| | - - - - |
| | - - - - |
| | $FF_{hex}$ - cart 255 |
| 6–4 | $00_{hex}$ - packet 0 |
| | $01_{hex}$ - packet 1 |
| | $02_{hex}$ - packet 2 |
| | - - - - |
| | $07_{hex}$ - packet 7 |
| 3–0 | error detection |

The MSB of the message/packet identification word must always be low to support bit synchronization. The next 8 bits (bits 14–7) define the cart address, the next 3 bits (bits 6–4) define the cart packet type with up to 8 packets supported, and the last 4 bits support error detection. To prevent confusion with an "all call" address, the cart address cannot be $00_{hex}$.

Cart Packet Structure

Each cart packet consists of data starting at packet byte 0 (message byte 4) and error detection at packet byte 4 (message byte 8), so that each packet may have up to 4 bytes (32 bits) of data.

Cart State Packet

The cart state packet (packet 0) is the primary packet for course management. It contains the location of the cart in the course coordinate frame and a one byte status, as follows:

| Packet 0 - Rogue State | | | |
|---|---|---|---|
| Byte | C Language Type | Byte Identification | Range |
| 0 | unsigned char | rogue status | $00_{hex}$–$FF_{hex}$ |
| 1–3 | N/A | rogue position | $000000_{hex}$–$FFFFFF_{hex}$ |
| 4 | unsigned char | packet error detection | $00_{hex}$–$FF_{hex}$ |

The cart status (byte 0) is a catch-all status byte for the cart that contains the following information:

| Byte 0 - Cart Status | |
|---|---|
| Byte Value | Function |
| $00_{hex}$ | Null . . . no status or information to report |
| $01_{hex}$ | spare |
| $02_{hex}$ | spare |
| $03_{hex}$ | spare |
| — | — |
| $0F_{hex}$ | spare |
| $10_{hex}$ | resend text message packet (base packet 1) frame 1 |
| $11_{hex}$ | resend text message packet (base packet 1) frame 2 |
| $12_{hex}$ | resend text message packet (base packet 1) frame 3 |
| $13_{hex}$ | resend text message packet (base packet 1) frame 4 |
| $14_{hex}$ | resend text message packet (base packet 1) frame 5 |
| $15_{hex}$ | resend text message packet (base packet 1) frame 6 |
| $16_{hex}$ | resend text message packet (base packet 1) frame 7 |
| $17_{hex}$ | resend text message packet (base packet 1) frame 8 |
| $18_{hex}$ | resend text message packet (base packet 1) frame 9 |
| $19_{hex}$ | resend text message packet (base packet 1) frame 10 |
| $1A_{hex}$ | resend text message packet (base packet 1) frame 11 |
| $1B_{hex}$ | resend text message packet (base packet 1) frame 12 |
| $1C_{hex}$ | resend text message packet (base packet 1) frame 13 |
| $1D_{hex}$ | resend text message packet (base packet 1) frame 14 |
| $1E_{hex}$ | resend text message packet (base packet 1) frame 15 |
| $1F_{hex}$ | resend text message packet (base packet 1) frame 16 |
| $20_{hex}$ | spare |
| $21_{hex}$ | spare |
| $22_{hex}$ | spare |
| $23_{hex}$ | network entry request |
| $24_{hex}$ | network exit request |
| $25_{hex}$ | spare |
| — | — |
| $2F_{hex}$ | spare |
| $30_{hex}$ | golfer request - send refreshment cart |
| $31_{hex}$ | golfer request - send ranger |
| $32_{hex}$ | golfer request - send extra balls |
| $33_{hex}$ | golfer request - send medical assistance |
| $34_{hex}$ | golfer request - Cart disabled . . . send another cart |
| $35_{hex}$ | golfer request - Send a cellular telephone |
| $36_{hex}$ | golfer request - "Yes" response to any base question |
| $37_{hex}$ | golfer request - "No" response to any base question |
| $38_{hex}$ | spare |
| — | — |
| $4F_{hex}$ | spare |
| $50_{hex}$ | DGPS packet acknowledge |
| $51_{hex}$ | complete text message successfully received acknowledge |
| $52_{hex}$ | spare |
| $53_{hex}$ | rogue control packet acknowledge |
| $54_{hex}$ | network control packet acknowledge |
| $55_{hex}$ | spare |
| — | — |
| $C0_{hex}$ | no hole |
| $C1_{hex}$ | hole 1 |
| $C2_{hex}$ | hole 2 |
| — | — |
| $F6_{hex}$ | hole 54 |
| $F7_{hex}$ | unit zone |
| $F8_{hex}$ | dead zone |
| $F9_{hex}$ | tee zone |
| $FA_{hex}$ | turn point zoom zone |
| $FB_{hex}$ | pin zone |
| $FC_{hex}$ | hole zone |
| $FD_{hex}$ | spare |
| $FE_{hex}$ | spare |
| $FF_{hex}$ | spare |

Bytes 1 through 3 form two 12 bit words that indicate the cart position as follows:

| Bytes 1–3/Cart Position | |
|---|---|
| Bits | Function |
| 23–12 | Cart X-position --> 12 bit signed value with the LSB = 2 meters |
| 11–0 | Cart Y-position --> 12 bit signed value with the LSB = 2 meters |

Byte 4 is an 8 bit error detection byte where bytes 0 and 1 use the upper nibble of byte 4.

Extended Status Packet

The cart state packet allows only a single catch-all status byte to be sent for each cart transmission. Because of the number of status indicators, this status byte is not bit oriented. If a cart were requested by the base station to send a cart control packet acknowledge when the golfer requests the refreshment cart, requests would be sent in the next cart state packet and the following packet, which could take considerable time in a large network. This problem is exacerbated if more than two status responses are in the queue and must be sequentially broadcast.

An extended status packet allows a cart to catch up if it is unable to get status information to the base station fast enough. This can occur in networks with many frames because the base station may broadcast on every frame whereas the cart may only broadcast once each frame cycle. If, however, the cart chooses an extended status packet, the cart location will not be broadcast in the frame cycle, and hence, minimal use should be made of this packet. The extended status packet is described in the following table:

| Packet 1 - Extended Status | | | |
|---|---|---|---|
| Byte | C Language Type | Byte Identification | Range |
| 0 | unsigned char | cart status 1 | $00_{hex}$–$FF_{hex}$ |
| 1 | unsigned char | cart status 2 | $00_{hex}$–$FF_{hex}$ |
| 2 | unsigned char | cart status 3 | $00_{hex}$–$FF_{hex}$ |
| 3 | unsigned char | cart status 4 | $00_{hex}$–$FF_{hex}$ |
| 4 | unsigned char | error detection | $00_{hex}$–$FF_{hex}$ |

Each cart status byte in this packet is a catch-all status byte for the cart, containing information identical to that in the cart state packet. Thus, up to four unique status bytes can be broadcast in the extended status packet. Byte 4 is the 8 bit error detection byte with the same definition of packet 0.

| Rogue Packet 2 - Hole Score/Speed of Play | | | |
|---|---|---|---|
| Byte | C Language Type | Byte Identification | Range |
| 0 | unsigned character | rogue status | $00_{hex}$–$FF_{hex}$ |
| 1 | unsigned character | rogue statues byte with hole code set | $C1_{hex}$–$F6_{hex}$ |
| 2 | unsigned character | score: player 1 in low nibble, player 2 in high nibble; Score range is 1–15 0 = no score data | $00_{hex}$–$FF_{hex}$ |
| 3 | unsigned character | hole play time - LSB 10 sec | $00_{hex}$–$FF_{hex}$ |
| 4 | unsigned character | error detection | $00_{hex}$–$FF_{hex}$ |

Packet 2—Hole Score/Speed of Play Packet:

The hole score/speed of play packet is broadcast by the cart at the conclusion of play on each hole. If the base successfully receives packet 2, then an $0D_{hex}$ acknowledge is sent in the rouge control packet to the cart. The cart continues to send the packet 2 at a low periodic rate until the $0D_{hex}$ acknowledge is received. Byte 0 status can be any status defined in the cart status table. Byte 1 contains the hole number status from the cart status table. Byte 2 contains the player 1 score in the upper nibble and the player 2 score in the lower nibble where a score of $00_{hex}$ indicates that no score is available. Byte 3 contains the play time for the hole and is quantized at 10 seconds per bit. Byte 4 is the error detection byte and is handled identically to the other rogue packets.

Packet 3—Distance Traveled/On-Time Packet

The Distance Traveled/On-Time Packet contains the total distance traveled by the golf cart during the round of play. Additionally, the packet contains the total time that the PROLINK system has been on for the round. This packet is only broadcast at the end of each golf round and is defined in detail below:

| Packet 3 - Distance Traveled/One-Time Packet | | | |
|---|---|---|---|
| Byte | C Language Type | Byte Identification | Range |
| 0 | unsigned char | rouge status | 00–FF |
| 1–2 | unsigned char | distance traveled (LSB = 1 meter) | 0000–FFFF |
| 3 | unsigned char | PROLINK on-time (LSB = 300 sec) | 00–FF |
| 4 | unsigned char | error detection | 00–FF |

Byte zero is a position for the rogue status byte as defined in Byte 0—Cart Status Table. This byte is set to zero if there is no status to send. Bytes one and two contain the total distance that the cart has traveled during the round with byte one being the MSB and byte 2 the LSB. Byte three contains the PROLINK on-time quantized at 300 seconds per bit. Byte 4 is the (20,16) code error detection bits with the upper nibble of byte 4 being used for byte 0 and 1 error detection, the lower nibble of byte 4 being used for byte 2 and 3 error detection.

Bit Synchronization

In most digital communication systems, a challenge is presented to synchronize a receiver clocking in the digital data stream with a transmitter clocking out the digital bit stream asynchronously. In the preferred embodiment of the PROLINK computer units 16, 44 and 51, the bit synchronization method takes advantage of the power of a Motorola 68332 microcontroller.

The PROLINK digital communication system functions are primarily carried out by PCUs 44 and 51 of the base station and PCU 16 of the carts, and hence, by the 68332 microprocessor. Referring back to FIG. 8, the digital data transceiver includes a transmitting CPU circuitry 95 with a source encoder 102 for the information source 101, an encryptor 103 (optional), and a channel encoder 104, RF transmitting circuitry 96 with a data modulator 105 for transmission over communications channel 107. On the other side of the communications channel, the transceiver includes a receiving RF circuitry 97 with a data demodulator 109, and receiving CPU circuitry 98 with bit synchronization 110, a channel decoder 111, a decryptor 112 (if an encryptor is used on the transmitting side), and a source decoder 113 for outputting the received information 114. It is noteworthy that CPU circuitry 95 and 98 are embodied within CPU card 18 of cart PCU 16 and base station PCU's 44 and 51, while RF circuitry 96 and 97 are embodied within RF card 22 of cart PCU 16 and base station primary and secondary PCU's 44 and 51. The RF card has no "intelligence", and is only responsible for modulating and demodulating the data on the carrier. The PROLINK system is partitioned in this manner to substantially reduce recurring cost, with considerable power afforded by the 68332 microcontroller on the CPU card, and obviating a need for an independent microcontroller for proper operation of the RF card.

The 68332 microcontroller is effectively two independent microcontrollers on a single chip. One is a powerful CPU-32 core, which is utilized in the presently preferred embodiment for all PROLINK graphics processing and interface control. The other is a Time Processor Unit (TPU), which handles select discrete I/O and bit synchronization functions of that embodiment.

The RF digital data stream is received by a 68332 Queued Serial Peripheral Interface (QSPI), which requires a clock synchronous with the received data to clock the data into a receive shift register. A series of synchronization bits is embedded by the transmitter at the start of the data stream. The receiving PCU TPU detects the synchronization bits and generates the QSPI receive clock. Such bit synchronization is considerably more efficient than one which sends start and stops bits at the expense of about 20% of channel bandwidth.

A preferred technique to accomplish bit synchronization will now be described. All falling edges of the input data stream create an interrupt to the 68332 processor via a TPU Period Pulse Width Accumulation (PPWA) function. The latter function measures the positive going period of any input waveform. As noted above, the PROLINK bit synchronization word is $BFFF_{hex}$, which indicates that 14 high bits exist for use in identifying a bit synchronization word. Upon interrupt, the 68332 processor immediately resets the PPWA function, which then begins accumulation of pulses at the next low to high transition of the data. Accumulation ceases at the following high to low transition where the processor is interrupted.

The 68332 processor reads the TPU PPWA accumulator to see whether 14 bits worth of accumulation has occurred. At the high to low transition, the PPWA automatically links to another TPU channel which immediately begins performing an output compare (OC) function. The OC function allows a programmable delay to transpire before the start of a 50% duty cycle clock. The clock is delayed one-half of one bit time (244 $\mu s$) before starting to synchronize with the incoming bit stream. If the 68332 check of the PPWA accumulation shows a non-14 bit time value, the 68332 shuts off the OC function before the clock can begin when in the bit synchronization search mode. The interrupt is masked, and therefore ignored, after the bit synchronization word has been detected and the data is being clocked in.

Once the clock is running, every occurrence of 14 high bits in the data stream simply resynchronizes the clock. The 68332 processor has the option of inspecting the first three bytes of any message (header) to ensure that the message is valid, and, if not, to halt the clock. Since all messages in the PROLINK communications network are fixed and time coherent, the 68332 processor can simply "look" for the message at the proper time, and shut off the OC generated clock after the message has been received to prevent clocking in any erroneous data.

It is important that clock drift should be well understood to define the maximum possible message length without a new bit synchronization word. This discussion stems from the fact that the cart and the base master oscillators are not synchronized, and any delta between the two results in a constant serial data stream clock bias. The base and all carts must periodically calibrate their master clocks in order to generate exactly 2048 interrupts in a one second period to provide adequate transmit time accuracy. This is possible since the GPS PPS can be used to measure the CPU card oscillator clock drift and compensate the interrupt counter for this drift as previously discussed. Since the TPU clock source is simply one fourth the master clock rate, once the master clock is calibrated the TPU clock is also calibrated. Although the PPWA and OC periods could be calibrated to reflect clock drift and seek to maintain synchronization between the transmitting and receiving CPU cards, that would be undesirable. The TPU timing resolution is 244 ns. Given that a bit is 1/2048 s=488 $\mu s$, quantization error alone results in a 500 ppm (±250 ppm) error. The crystal oscillator on the CPU card is accurate to ±100 ppm over the PROLINK temperature range. Furthermore, the oscillator temperature coefficient is negative. The base station and the carts typically experience the same temperatures. Thus, the delta clock error between the base and the carts will be well under 100 ppm. The root sum square of the base and cart clock errors (±100 ppm) yields a 3$\sigma$ relative clock error of ±141 ppm. Thus, the hardware clock accuracy far surpasses the potential TPU performance. As a result, the PPWA and OC periods programmed by the base and the carts is a constant of the same value.

Delta clock error is only an issue for the base message since it is so long (375 ms) compared to the cart messages. Clock drift over the transmission interval is assumed to be quite small since the transmission intervals are correspondingly small. The delta clock error must not cause a serial clock bias greater than one fourth of a bit time (122 $\mu s$) during the receipt of the base message. This means that the TPU clock bias must be better than 326 parts per million during the message transfer (375 ms duration). Clock bias on the order of 100 ppm allows over 1.2 seconds of data transfer with a one fourth bit time error requirement. This allows approximately 2500 bits to be transmitted before the required occurrence of another bit synchronization word. The result is potential channel bandwidth overhead as low as 0.7 percent. This compares to the 20 percent number discussed earlier for transmission of start and stop bits for each byte.

Communications Link Performance

Preferably, the PROLINK system utilizes a single transceiver located at the golf course club house to reliably communicate with all golf carts on the course. This radius of operations rarely exceeds 2 kilometers. On many flatter courses this can be done with little communications link margin. However, on courses with substantial hills significant link margin can be sacrificed due to terrain losses. As described earlier herein, in these instances passive reflectors are utilized to improve link margin in areas that are non-line-of-sight from the club house. As a last resort, the base transceiver can be located at a site different from the clubhouse that provides improved line-of-sight conditions, but significant power and communications hardwiring are required.

Transceiver Characteristics & Requirements

Recognizing cost as a paramount consideration in the design of a suitable transceiver, a simple Coherent Phase Frequency Shift Keying (CPFSK) is preferred for the digital modulation in the PROLINK system. CPFSK is not, however, as bandwidth efficient as some other forms of modulation, resulting in a maximum possible bit rate of about 2400 bps. But considerable bandwidth efficiency is made up through the use of the highly efficient PROLINK variable length network.

The key characteristics and requirements for the PRO-LINK transceiver are set out in the following table:

| PROLINK System Characteristics/Requirements | |
|---|---|
| Transmit/Receive IF Bandwidth | $\leq 15$ kHz |
| Receiver Sensitivity At Antenna Input | $\leq -113$ dBm for a 12 dB SINAD |
| Receiver Noise Figure | $\leq 7$ dB |
| Bit Rate | 2048 bps |
| Modulation | CPFSK |
| Bit Error Rate (BER) Requirement | $\leq 1 \times 10^{-5}$ |
| Synthesized Frequency Range | 450–470 MHz |
| System Radius Of Operations | $\leq 2$ km |

Background Noise

For any link margin calculation, the natural background noise must be examined as the limiting factor in receiver performance. The background noise is computed by $$N_{bkgnd} = kTB$$

where k=Boltzman's Constant=$1.38 \times 10^{-23}$

T=Noise Temperature in degrees Kelvin

B=Receiver Bandwidth

A noise temperature of 310 K (100 F.) is assumed. The computed background noise, then, is:

$$N_{bkgnd} = 10 \log(1.38 \times 10^{-23} \text{CDOT } 15{,}000 \times 310) = -162 \text{ dB}$$

Required Carrier to Noise Ratio

A minimum required carrier to noise ratio exists for a given modulation technique, to achieve bit error rate requirements. PROLINK uses CPFSK modulation running at 2048 bps, with the probability of a bit error as a function of the energy per bit being:

$$P_e = (1/2) erfc(\gamma_b/2)^{1/3}$$

where $\gamma_b$=energy per bit erfc=complementary error function

To provide a $10^{-5}$ bit error rate, the signal to noise ratio per bit must be 12.6 dB. Therefore, at 2048 bps, the signal to noise ratio must be at least 45.7 dB.

Free Space Path Losses

The free space path loss is computed by $$L_s = (\lambda/4\pi R)^2$$

where $\lambda$=wavelength (meters)

R=range (meters)

For the PROLINK system, since the maximum frequency is 470 MHz ($\lambda$=0.6383 meters) and the maximum range is 2000 meters, the maximum free space path loss is 91.5 dB.

Link Margin

The PROLINK system link margin is defined as:

| LINK GAINS | |
|---|---|
| Transmit Power | 2 Watts = 3 dB |
| Transmit Antenna Gain | 1.5 dB |
| Receive Antenna Gain | 1.5 dB |
| TOTAL GAINS | 6 dB |

| LINK LOSSES | |
|---|---|
| Transmit Insertion Loss | 1.5 dB |
| Free Space Path Loss | 91.5 dB |
| Terrain Losses | X dB |
| Multipath Losses | Y dB |
| Receive Insertion Loss | 1.5 dB |
| TOTAL LOSSES | 94.5 dB + X dB + Y dB |

The total gains less the total losses are −88.5 dB−X dB−Y dB. The terrain and multipath losses are left as variables and in essence are allocated whatever is left of the link margin. A significant margin must remain to support these less predictable losses.

Since the background noise floor is −162 dB and the receiver noise figure requirement is 7 dB, the receiver noise floor should be about −155 dB. At least 45.7 dB above this noise floor is required to achieve 2048 bps with less than 1 bit error in 100,000 bits transmitted. Thus, the received signal must have a power of at least −109.3 dB.

Therefore, the terrain and multipath losses can be as high as $$X + Y = 20.8 \text{ db.}$$

Cart-Based Units

Figure 12:
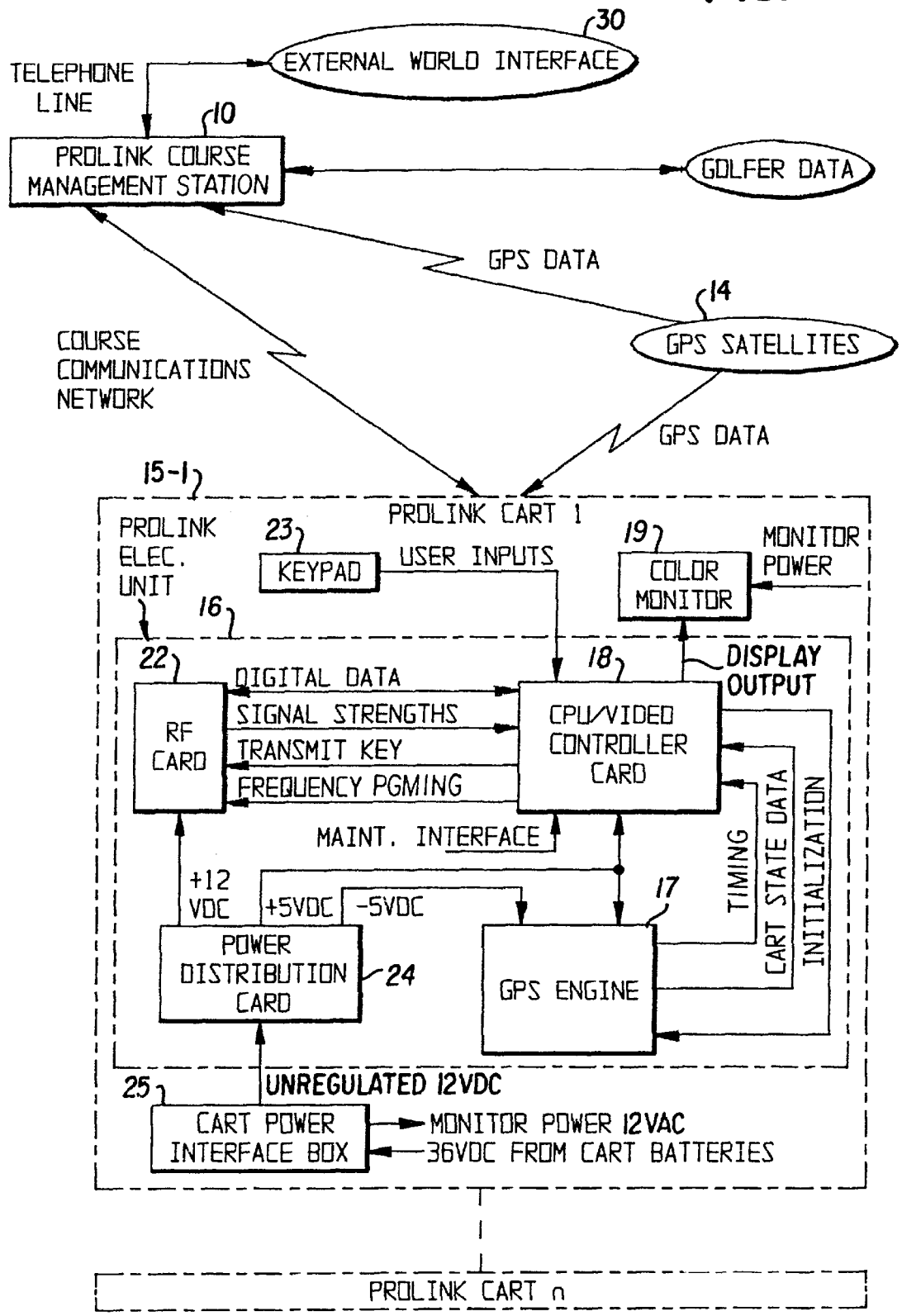
FIG. 12 is a more detailed block diagram of the electronic components of the cart-based unit (CBU) portion of the PROLINK system.

Referring now to FIG. 12, in which like reference numbers to those used in FIGS. 1, 2 and 3, for example, refer to like portions of the PROLINK system, a detailed block diagram of the electronic components of cart-based units 15-1 is shown. The GPS data are received by the cart 15-1 from the satellites 14-1, . . . , 14-n, together with data from the base station (course management station) 10 on the course communications network. The cart includes a cart-based unit (CBU) PROLINK Computer Unit (PCU) 16 which is substantially similar to primary PCUs 44 and 51 (of FIG. 4) with the exception that PCU 16 additionally includes a GPS engine (17) while PCUs 44 and 51 utilize GPS subsystem 42 of FIG. 4. Cart-based PCU 16 includes a CPU/video controller card 18, GPS engine 17, digital data transceiver/RF card 22, and power distribution card 24, and interacts with keypad 23 and color monitor 19. Power distribution card 24 is supplied by a cart power interface box 25, which is itself energized by the cart batteries. The color monitor assembly 19 is mounted inside the golf cart below the roof for ease of viewing by the cart occupants without interfering with the driver's view of the cart path. Such mounting of monitor 19 is significant for allowing color readability in sunlight, the details of which will be discussed later. The key pad assembly 23 mounted below the base of the monitor allows ready access by the cart operator. The PCU 16 is embedded in the cart roof, and a cart power interface box 25 is mounted in the cart out of the way of the occupants.

The cart's color monitor (19) is preferably a 7.5-inch or 9-inch (diagonal measure) Sony Trinitron (trademark of Sony Corp.) CRT, having drive electronics that adhere to the video graphics array (VGA) standard for personal computers (PCs). The monitor resolution is 640×480 pixels, and a video controller card (chip) provides up to 256 colors on the screen of the monitor at any one time. The monitor has a dot pitch of 0.26 millimeters. The one-dimensional screen surface allows easy hand application of anti-glare coatings.

Figure 21:
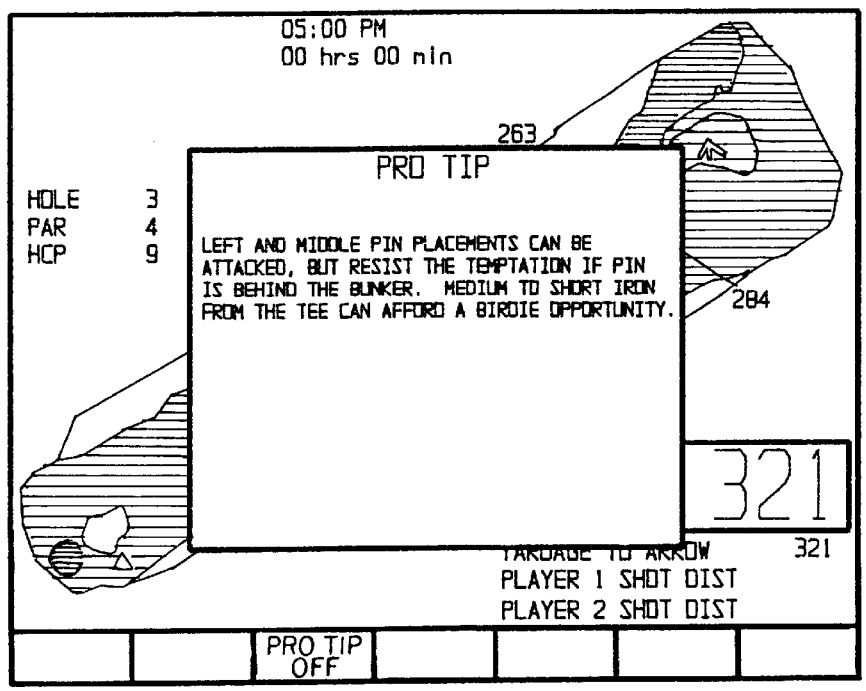
FIG. 21 is a pictorial diagram illustrating a pop-up window for displaying a pro tip on a monitor of the cart.

The keypad assembly (22) is mounted below the base of the monitor beneath the CRT, with soft keys, i.e., keys that are software controllable, illustrated in FIG. 1C, as well as FIGS. 20–22 (to be discussed later). The key mechanism to be pressed by the golfer using the unit is a small keypad strip that runs just underneath the tube in the monitor. The physical mechanical keys are beneath the software label illuminated on the screen. For example, in FIG. 20, the legend "PLAYER 1 ZERO CARRY" is directly above a button on the keypad, as are the "HELP" indicator, "PRO TIPS", and "PLAYER 2 ZERO CARRY". The yardage arrow for the PROLINK unit may be a joy stick assembly, a trackball assembly, or four to eight arrows that allow the golfer to move the arrow around with ease.

Soft keys are used to assure that the PROLINK system has flexibility for growth, and for incorporating immediate golfer feedback. Soft keys can be reprogrammed as necessary if a particular golfer has a preferable location for a particular key, and that reprogramming is done strictly through software. Similarly, the label for each key is created in software along the bottom strip of the CRT, so that these keys may be reprogrammed to have different meanings at any time.

A Cart Power Interface Box (25) is mounted under the seat of the cart or could alternately be mounted underside of the roof of the cart, alongside PCU 16. As shown in FIG. 12, a pair of wires run from the DC power supply (typically several batteries supplying +36 volts) and the ground reference of the golf cart into the roof assembly and to the cart power interface box. The power interface box converts this unregulated 36 v supply to unregulated 15 v DC which is used to power PCU 16, and to 120 v AC used to power monitor 19. The PROLINK electronics use unregulated 12–15 v DC as the primary power source because similar system concepts are applicable not only to the golf market, but to many other markets as well. For example, unregulated 12 v power is readily obtained from many types of motor vehicles, tractors, aviation equipment, airplanes, and so forth.

Figure 13:
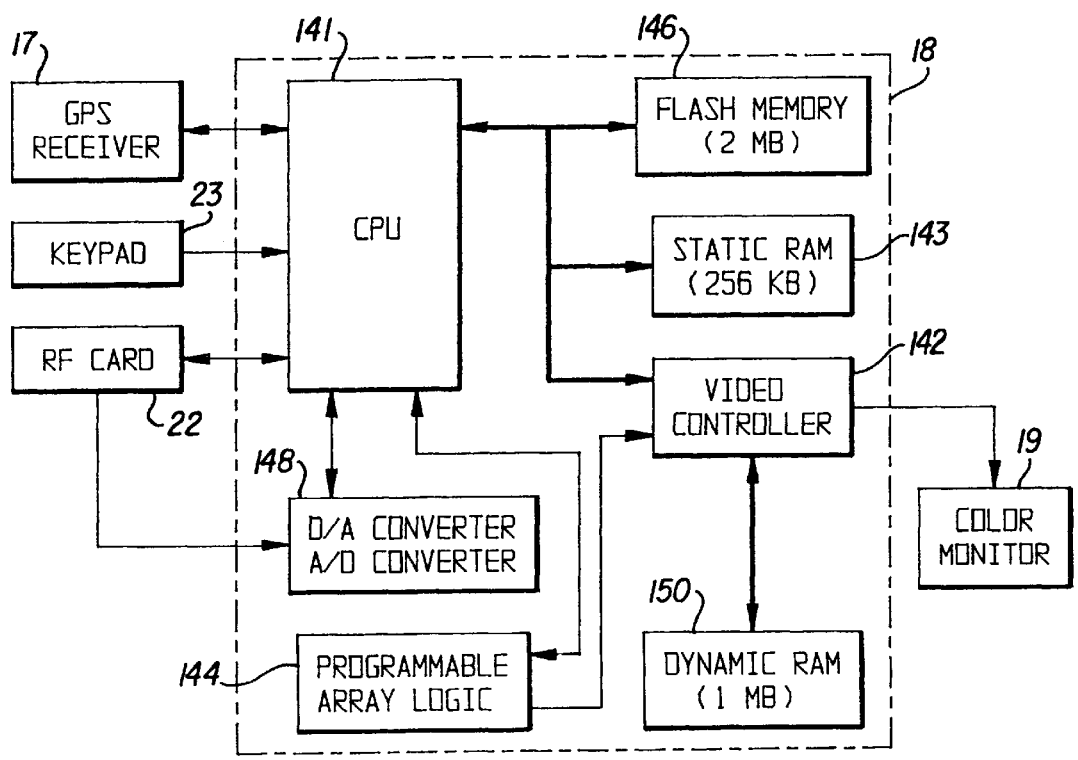
FIG. 13 is a detailed block diagram of the CPU/video controller card of FIG. 12.

A block diagram of CPU video card 18 is shown in FIG. 13. The card has two primary sections, the first section being the CPU 141, and the second being the video controller 142. In a preferred embodiment, CPU 141 takes the form of the Motorola 68332 microcontroller device, as mentioned above, which has a large linear address space that allows it to address up to 16 megabytes (MB) of memory. A single compressed advertisement may occupy 64 kilobytes (KB, or K) of memory, which would severely crimp address space for programs, scratch pad, and video memory needs with smaller capacity address capability. Additionally, this device was selected because of its 32 bit core, which provides high speed processing efficiencies. All data and address registers within the device are 32 bits wide to enable 32 bit multiply and divide operations, dynamic range addition and subtraction, and very efficient movement of data in 32 bit memory blocks.

The processor supports a large number of peripheral devices on chip through a Queued Serial Peripheral Interface (QSPI) which constitutes a high speed serial interface used to "talk" to peripheral devices, such as RF card 22. As aforementioned, the 32 bit microcontroller also has an on-chip Time Processing Unit, or TPU, that provides a 16 channel input/output timing function capability independent of the processor core. Thus, the TPU can sample and compute timing information on discrete inputs without interfering with other processing being performed by the 68020 core, akin to parallel processing. The TPU supports real time interrupt requirements of the system, and bit synchronization on the incoming RF digital data stream.

The microcontroller of the mobile unit is a 5 volt version (i.e., 5 volt TTL logic level) that runs at a maximum clock speed of 16.77 megahertz (MHz), and consumes approximately 600 milliwatts (mw) of power. A 3 volt version of the 68332, currently under development, would enable reduction of power consumption by a factor of 2 to 3. While that is not especially important for a cart-based system with the large battery capacity of the cart, it is highly desirable to enable a hand-held, lightweight, battery operated version of the Prolink system as the roving mobile unit where a cart is not used by the golfer.

The 5 volt version of the 68332 used in the presently preferred embodiment of roving units in the PROLINK system has power saving modes. For example, power dissipation is reduced by running the clock at lower speeds. With its internal static RAM, the clock can be stopped without losing the internal state of the device. This enables reducing clock speed from 16.77 MHz to DC without loss of any information. Clock speed reduction of smaller amounts is desirable in various circumstances. For example, redrawing a graphic screen containing a digital map of a hole can be done at a lower clock speed than the 16.77 MHz used to draw the original screen, such as 12 MHz, with attendant power savings.

The CPU card also includes 256K of static RAM (143) organized in two 128K×8 chips, one being for the lower byte (8 bits) of a word and the other for the upper byte of the word.

Logic support for processing operations is provided by programmable array logic (PALs) 144, with the ability to create numerous logic gates on a single chip. The CPU card also includes flash memory chips 146 of sufficient capacity to support the desired advertising display requirements of the system, with slots for expansion of memory as necessary to accommodate even greater graphic requirements.

The 68332 microcontroller also provides the capability to implement $I^2C$ access ($I^2C$ is a trademark of Philips Corp. for its inter integrated circuit bus—a serial communications interface between integrated circuits), primarily in software but also to an extent in the processor hardware. Many integrated circuits (ICs) can carry on communications among each other with high speed parallel interfaces that may require from ten to twenty parallel traces in a circuit card. In contrast, the $I^2C$ bus serial interface requires running only two etches or two traces to the chip, albeit that a serial bus transfers information at a much slower rate than a parallel bus. In the PROLINK system, the $I^2C$ bus is implemented in software, using an interrupt service routine running at 512 Hz, although it could be done at up to 100 KHz. The hardware requirement is only two output discrete devices, namely, the serial data line and the serial clock line, from the 68332 device.

Frequency synthesizers used on the RF card of the preferred embodiment are $I^2C$ bus compatible. The frequency synthesizers are programmed with the appropriate RF frequency to which the Prolink system is tuned, to transmit to and receive transmissions from the base station, using the $I^2C$ bus. Additionally, the CPU card contains an analog-to-digital/digital-to-analog (A-to-D/D-to-A) converter 148, with four A-to-D inputs and one D-to-A output, driven by the $I^2C$ bus. This contributes to a very small, tightly integrated, few trace package, without need for a more complicated multi-layer card. The CPU card is only a six layer card with a power plane, a ground plane and four digital trace planes. If parallel interfaces to the A-to-D/D-to-A converter and the frequency synthesizers had been used, at least one and possibly two more layers would have been added with attendant complexity and cost.

The other main section of the CPU video controller card (the first being the CPU section and its components) is the video controller section 142. The principal video controller requirements for the PROLINK system are the need to drive a high resolution color graphics monitor, and to display information on either or both a cathode ray tube (CRT, or computer monitor) and an LCD panel. The high resolution color graphics display supports photograph-quality advertisements and digital course map details. As LCD brightness is improved and LCD panel cost is lowered, the LCD panel may become advantageous for use over a CRT display. The CRT currently used in the preferred embodiment of the cart-based unit is a monitor using a Sony Trinitron tube and developed by Display Technologies, Inc.

Video controller 142 requires a very high level of chip integration, to avoid numerous discrete components or many low level ICs, resulting in selection of the 90C20A video controller available from Western Digital. The 90C20A device is capable of supporting up to 1 MB of dynamic RAM (150), which is compatible with the PROLINK system usage, and to address and write video imagery data to the RAM. In addition, the 68332 microcontroller can access the dynamic RAM through the 90C20A device to update graphics images. The 90C20A video controller is periodically refreshed to support full video graphics array operation, and represents a single chip solution for the CRT horizontal and vertical timing or flat panel timing, DRAM refresh control color pallet registers, and RAM DACs. The 68332 device writes video data into DRAM 150 via the 90C20A, the contents of the DRAM are then scanned and pumped through the RAM DAC to create red, green, and blue drive signals for the red, green, and blue electron guns.

Also on board the 90C20 video controller 142 is a color palate register which provides the 256 colors for the display. Importantly, the highly integrated single chip video solution is quite economical in that it carries a relatively low price tag for purchases in quantity. Another factor, taken in conjunction with the use of FSK transmitters as discussed above, that helps achieve a low-cost, affordable golf course yardage and information system.

The PROLINK CPU 141 (used in PCUs 44, 51 and 16) accepts user commands, controls displays, controls the transfer of data between the individual carts and the base station, monitors the performance of the RF interface, and performs the calculations necessary to provide accurate distance information to the user. CPU control is exercised by the digital electronic processor—a microprocessor or microcontroller of the type previously described herein. The processor reads binary instructions that direct the operation of the system from the EPROM constituting program memory. The memory may also contain data describing the golf course including layout and hole maps, distance data, equipment configuration data, RF communications data, GPS satellite communications data, diagnostic instructions, advertising matter, and other information necessary for reliable operation and which requires nonvolatile memory storage. The RAM memory 143 is used by the processor to perform distance calculations, and to store communications data, golfer scores or handicaps, and any other transient data necessary to operate the system.

The CPU provides an external communications interface for maintenance functions to be performed, golf course data or control program instructions to be updated, and any portion of nonvolatile memory to be either examined or updated. User commands are accepted by the CPU from keypad 23 having individual keys and a directional controller, and configured in row and column format that allows each depressed key to be individually identified. The system software enables the function labels for the individual keys to be viewed by the user along the bottom edge of the display, and each of the keys to be redefined by appropriate software programming whenever a new display mode is selected. The directional controller preferably has mouse, trackball, or other device with analogous characteristics that will allow the user to move the cursor at will on the display.

Individual hole maps for the course, score data, advertising matter, keypad function labels and other information are displayed on color video monitor 19 from the CPU. The processor expands packed binary data retrieved from the flash memory and updates readable/writable memory 150 dedicated to driving the display. The display memory should be of sufficient capacity to hold two screen images simultaneously so that either image may be selectively presented on the display. This significantly decreases throughput requirement for the processor since one image can be created while the other is being displayed. Sufficient definition is provided by the display to support 640×480 pixel 256 color images.

A bi-directional serial communications interface is provided between the CPU and a GPS module. The serial interface enables the processor to write configuration data to the GPS module and read position data and various GPS satellite configuration data. The module includes an antenna for receiving data transmitted by the GPS satellites. The GPS module provides present position data for the mobile unit by processing RF data transmitted by the satellites, and also provides a discrete digital electronic time pulse signal as the system's time base or reference as discussed above.

The CPU interface to an RF card at the roving unit enables each golf cart to communicate information to the base station RF card located in the pro shop or other convenient location on the course. The antenna location either provides good direct line-of-sight communication to all carts on the course, or can be adapted to do so by means of repeaters, reflectors or the like as previously described herein. The mobile (roving unit) RF receiver receives data from the base transmitter and stores it in memory for use in calculating its position and for other tasks. The mobile RF transmitter transmits serial data to the base station receiver identifying the cart and its location every few seconds. By virtue of these transmissions, the specific location of each cart is determined and identified on the digital mapping display on the base station monitor.

Figure 14A:
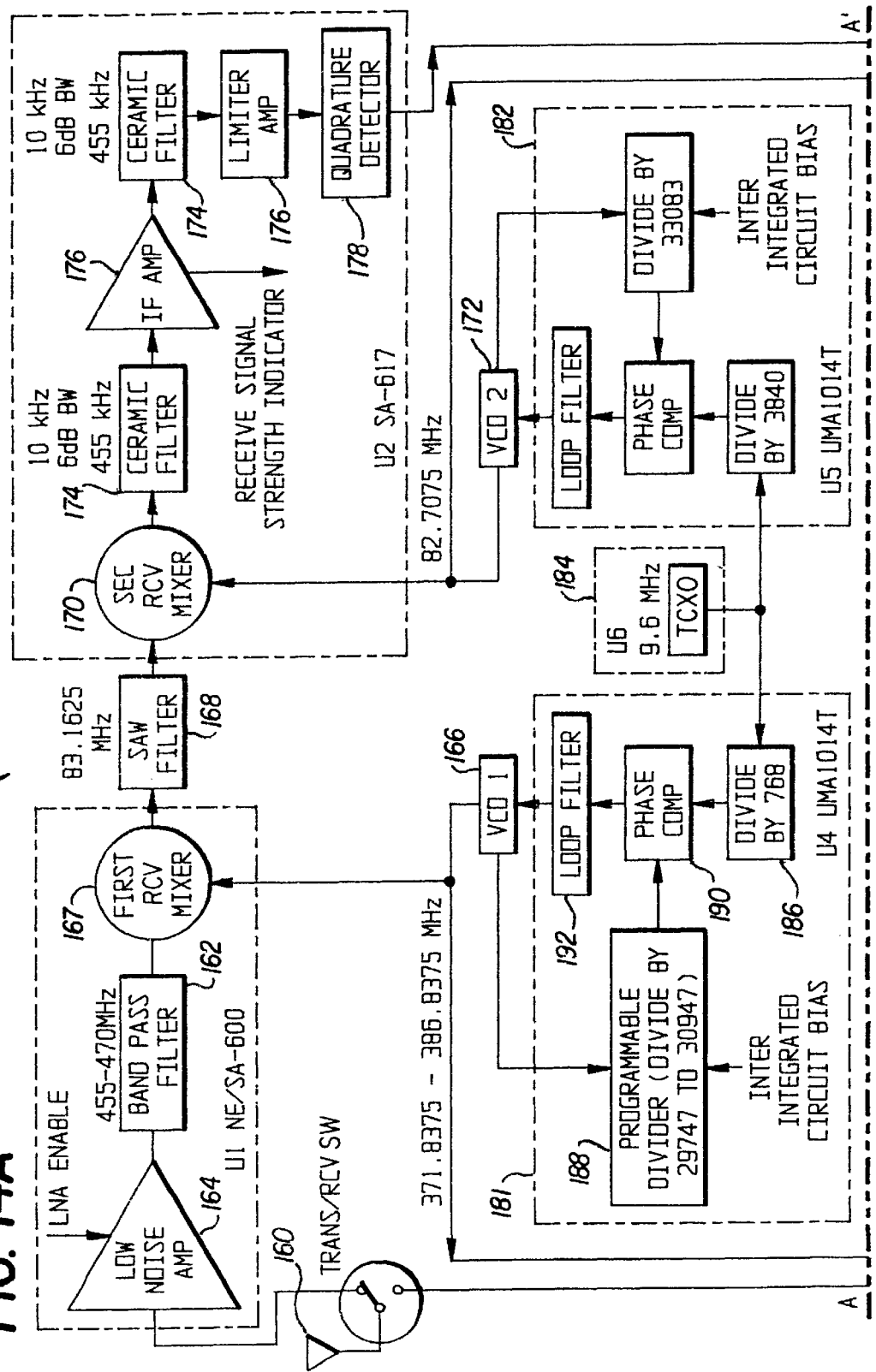
FIG. 14 is a detailed block diagram of the digital data transceiver/RF card of FIG. 12.
Figure 14B:
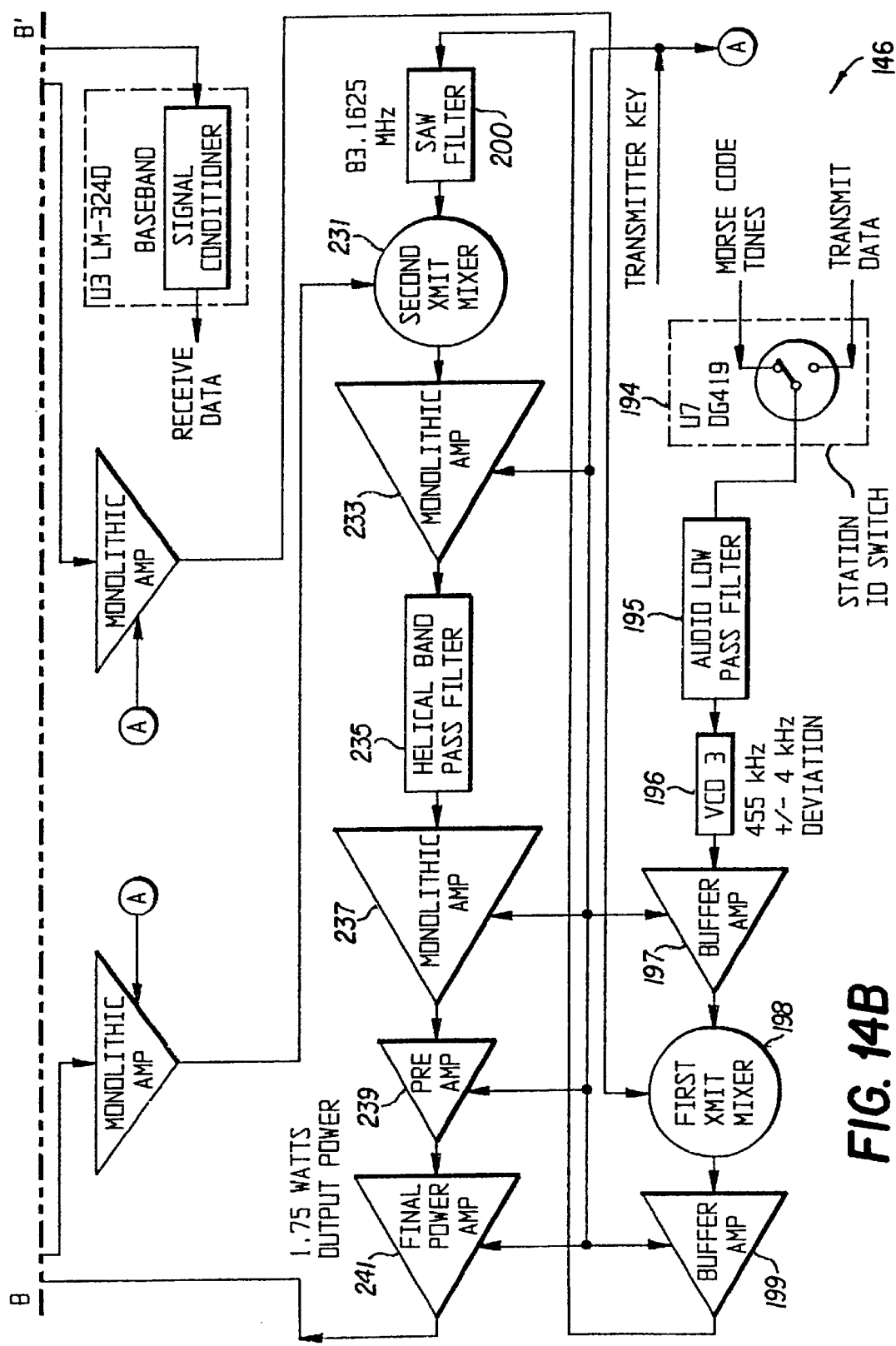

A block diagram of RF card 22 is shown in FIG. 14. The RF card includes a digitally tuned UHF FSK transceiver. A key requirement for the RF card is that it be able to transmit as well as to receive. The operating range of the system is preferably a minimum of two kilometers, with a transmit power of not more than two watts, in order to comply with current FCC limitations. Two watts allows the system to fall under the regulatory rules of the UHF offset band in the 450–470 MHz region of the spectrum, which is a typical radius of operations for a golf course (i.e., two kilometers or an approximately one and one-quarter mile radius is about the largest size to be expected for a typical 18 hole course). The RF card is frequency synthesized in design, so that the CPU card may command the RF card to tune to different frequencies. This is important for dynamic asset management. For example, if a course has 80 PROLINK system carts and is currently regularly only using 40, the 40 unused carts may readily be transferred to another course for greater utilization and return on assets. To that end, it is important that the receiver and transmitter have the capability to change frequencies to enable transmissions on the frequencies authorized for the other course by the FCC, and to avoid a need to modify the RF card for a new frequency.

Referring now in greater detail to FIG. 14, the RF card is relatively small, typically three inches by four inches, with four layers consisting of a trace layer on top and bottom a ground plane, and a power plane in between. A connector and various other components are also placed on the back side of the card. The RF card is powered by +12 volts, and has a frequency range of operation between 455–470 MHz. The received RF signal passes from antenna 160, through a low noise amplifier, and to band pass filter 162, which may be implemented in discrete components, acting as a preselect filter over the entire frequency range, which prevents any spurious signals in the cellular band or the VHF band from squeezing through into the mixer stage. Continuing on the receiving side, an NE 600 Philips/Signetics Semiconductor circuit chip includes low noise amplifier 164 and first stage mixer receiver 167 that boosts the incoming RF signal gain about 20 db. An automatic gain control is implemented in the low noise amplifier, via signal LNA enable, in that the NE 600 may be turned on or off through the CPU card and the 68332 processor.

Voltage controlled oscillator (VCO) 166 operating between about 370–385 MHz is coupled to mixer 167 for mixing the incoming RF data down to a 83.1625 MHz signal, which is passed through surface acoustic wave (SAW) filter 168. This filter has very high roll off characteristics to reject the image frequency. After passing through the SAW filter, the signal goes into second receiver mixer 170, which is part of an NE 617 chip also manufactured by Philips/ Signetics Semiconductor. The second mixer is also coupled to VCO 172 for converting the 83.1625 MHz signal to 455 kHz, a traditional intermediate frequency. Thus, the PROLINK RF card has two IF (intermediate frequency) one at 83.1625 MHz and another at 455 KHz. The single chip NE 617 device implements the receiver mixer 170, ceramic filters 174, amplifier 176, and quadrature detector 178. A received signal strength indicator is passed through the A/D converter on the CPU card into the 68332 processor, and gives the 68332 knowledge of that signal strength.

The quadrature detector of the NE 617 chip aids in demodulating frequency shift keying data in that it provides an indication of the baseband signal that is either higher or lower than the reference. If the deviation were 5 KHz for the frequency shift keying, and the carrier frequency were 460 MHz to the center of the band, the FSK would shift around the 455 KHz IF frequency, and would move from 455 to 460 to 455 to 450 KHz, with the frequency of transitions being proportional to the bit rate. A logic one may be represented by a 460 KHz IF demodulated signal, and a logic zero may be represented by a 450 KHz signal. The quadrature detector takes the ±4 KHz deviation baseband demodulated signal and provides a digital representation through a comparator, as the received digital data. The output voltage of the quadrature detector is applied through a signal conditioner, and, if that output voltage is higher than the reference, it becomes a logic one, or, if lower than the reference, it becomes a logic zero. Hence, the received digital data stream is reconstructed by the quadrature detector and the signal conditioner/comparator.

RF card 22 includes two frequency synthesizers 181 and 182 that may take the form of Philips/Signetics model UMA 1014T. Both frequency synthesizers are fed by a common, conventional temperature compensated crystal oscillator (TCXO) 184 running at 9.6 MHz. The TCXO must perform at a maximum error of five parts per million over the full temperature range of operation to comply with FCC rules on frequency selectivity for the transmitter. If, for example, a transmitter is to transmit at 460 MHz but actually transmits at 460 MHz plus 50 KHz, not only has the signal been missed, or the channel slot been missed, but the signal is riding on top of another channel slot and therefore interfering with another operator.

Frequency synthesizer 181 uses the 9.6 MHz TCXO to generate a frequency reference in the range of 370 to 385 MHz for VCO 166. This range is achieved in that the CPU/video controller card can program the frequency of the synthesizer through the I²C bus. For example, programming a divide-down factor such as divide by 768, via divider 186, to provide a 12.5 KHz output, as the channel spacing or ±12.5 KHz as a 25 KHz bandwidth, may be used to shift around the 360 to 380 MHz VCO. In essence, the output of the frequency synthesizer steers the VCO to achieve the desired frequency, e.g., the mid-point of the band 370 MHz, which is fed back to the frequency synthesizer through programmable divider 188 (a prescaler), that reduces the frequency to a convenient value.

A phase locked loop, comprised of phase comparator 190, loop filter 192, VCO 166 and divider 188, compares the 12.5 KHz output from the synthesizer divider to the feedback frequency that has been divided down. If they are the same, then the frequency is 370 MHz. If they are different, however, then the phase locked loop changes the output voltage driving the device to pull the VCO to the right frequency.

In a similar manner, frequency synthesizer 182 is also programmed by the I²C bus to generate the reference frequency of 82.7075 MHz to second stage mixer 170.

It will be seen, then, that the receiver is implemented primarily using four circuit chips—the NE 600, NE 617, and two UMA 1014's for the first and second stage mixers, along with a few discrete components such as the VCO's, the SAW filter, the band pass filter, the antenna input, and so forth.

The transmitter can run up to 2048 bps, as is done in the PROLINK system, without exceeding the allocated FCC bandwidth. That is a strategic number in that 2,048 is 2 to the 11th power. By processing or transmitting data at a power of 2 bit rate data can also be received at that rate, which allows more effective scaling of input information. A divide or multiply function can be implemented by merely shifting bits left or right. That is important to preserving throughput in the processor without need for a floating point processor or co-processor, either of which would add considerably to system cost. When a logic one is transmitted by the CPU/ video controller card over the transmit serial data interface, the 455 KHz frequency is pulled up to 460 KHz, whereas a logic zero pulls the frequency down 5 KHz to 450 KHz. This provides an open loop VCO, with no phase locked loop to hold the frequency at 455 KHz. Therefore, the serial data stream can be transmitted in a very simple manner, with the frequency shift keying for a logic one and a logic zero and a 5 KHz deviation for transmitting data.

The PROLINK RF receiver/transmitter card utilizes a unique method of conversion from the transmitter. It is desirable to transmit and receive on the same frequency—to use only one FCC frequency to implement the system. In turn it is then only necessary to feed one set of frequency synthesizers, if properly done, and the transmit up conversion from IF of 455 KHz to the second IF of 83.1625 MHz, to the RF frequency of 455–470 MHz is precisely the reverse of the received down conversion frequencies. Hence, the first mixer is driven by the same frequency synthesizer that drove the second mixer on the receiver section of the card. Also, the second mixer on the transmit side is driven by the same frequency synthesizer as the first receiver mixer.

The PROLINK transceiver must be able to send digital data to support PROLINK unique requirements, and Morse code station identification data to support FCC requirements. A solid state switch is used to pass either the digital data, or the Morse code information. The PROLINK transceiver has no provision to send traditional analog voice information. Even though only digital data or a Morse code tone is transmitted, an audio low pass filter has been implemented to prevent any possibility of over modulation of the transceiver. The low pass filter is a third order Butterworth design and completely meets the FCC requirements. Additionally, the transmit binary digital data stream edges are rounded to reduce the modulation index and hence the occupied bandwidth of the transceiver. The PROLINK digital modulation circuits physically can not have a frequency deviation of more ±4 kHz by design in that the varactor tuning range is incapable of anything greater.

After filtering, the transmit modulation drives a voltage controlled oscillator to modulate the first IF by nominally ±4 kHz. The signal is buffered before entering the first transmit mixer. A major innovation is the ability of the PROLINK system to support communications with up to 255 carts on a single frequency. As a result of this efficient use of spectrum, only half duplex communications is required. Thus, significant cost and integration size reductions are realized by using the receiver frequency synthesizers to drive the transmit up convert mixers. The first transmit up convert mixer is driven by the second receive frequency synthesizer to mix up to 83.1625 Mhz. The frequency drift over temperature of the TCXO is less than ±2.5 parts per million easily meeting the FCC requirement of ±5.0 parts per million. The 83.1625 Mhz IF transmit signal is buffered and passed through a SAW filter to reject the $f_{mixer}-f_o$ (82.7075 Mhz) signal. The IF signal is then passed through the second transmit up covert mixer using the first receiver frequency synthesizer to achieve the 455 to 470 Mhz RF signal. The RF signal is amplified and then passed through a helical bandpass filter to attenuate any spurious frequencies below the FCC requirements. Finally, the RF signal transmits through several intermediate power amplifiers before having enough power to drive the 1.75 watt final power amplifier.

The RF frequency shift keying transceiver is not only cost effective and of very simple design, but also can be programmed under computer control. Thus, the computer can readily maintain the FCC authorized frequency without concern for deviation from that frequency.

Figure 15:
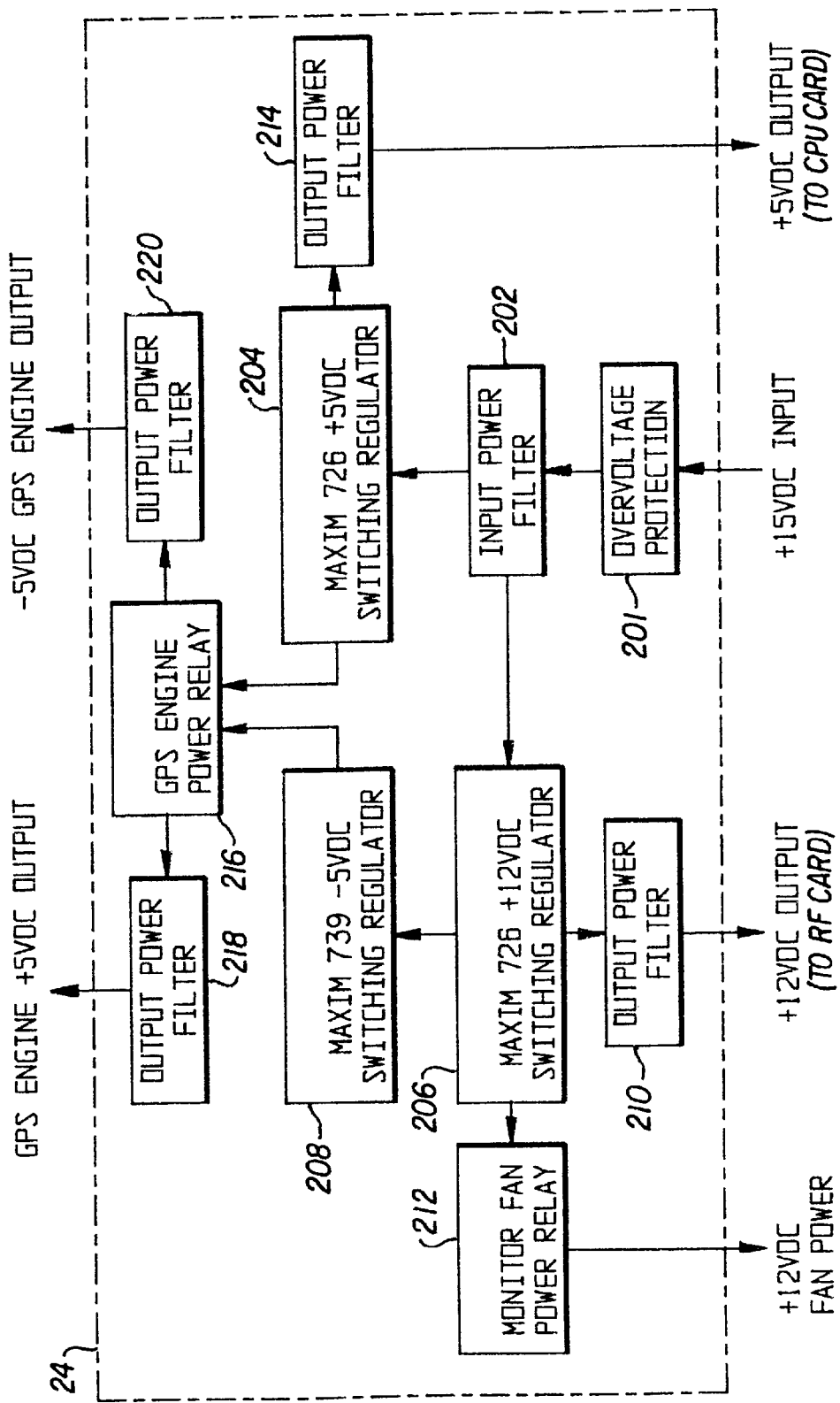
FIG. 15 is a detailed block diagram of the power distribution card of FIG. 12.

A block diagram of the PROLINK power distribution card 24 of FIG. 12 is shown in FIG. 15. The card includes overvoltage protection circuit 201 and input power filter 202 for receiving a 15-volt DC input power supply voltage. The output of the input power filter is coupled to three switching regulators: (1) +5 volts switching regulator 204; (2) +12 volts switching regulator 206, and (3) -5 volts switching regulator 208 wherein regulator 208 is coupled to the input power filter via regulator 206. In a preferred embodiment, regulators 204 and 206 may take the form of a Maxim 726 regulator, and regulator 208 may take the form of a Maxim 739 regulator.

The output of the +12 volts regulator is supplied to output power filter 214 and then supplied to RF card 22 (of FIG. 12). The output of the +12 volt regulator is also supplied to fan power relay 212 for supplying +12 volts to a fan (not shown).

The output of the +5 volts regulator is supplied to output power filter 214 and then supplied to CPU/video card 18 (FIG. 12). Also, the output of the +5 volts regulator is supplied to one input of GPS engine relay 216.

The output of the -5 volts regulator is supplied to the other input of GPS engine relay 216 such that +5 volts and -5 volts may be supplied to GPS engine 17 (FIG. 12) via a power filter.

Method and Technique For Surveying and Collecting Data On A Golf Course

Referring back to FIG. 3 and the PROLINK course management computer, a precise, digital, color graphic map of the entire golf course displayed on the CMC monitor 54 enables the course administrator to track the location of each roving unit (and thus, the golfer(s) to which that unit is assigned) on the course, including the relationship to features of the hole being played. Furthermore, referring back to FIGS. 1B and 12, color monitor 19 corresponding to each roving unit automatically displays a map of the particular hole being played, from the time the tee box of the particular hole is approached to the time the cart is driven (or the hand-held unit is taken) from the vicinity of the green and toward the location of the tee box for the next hole. The golfer commanding the unit is able to zoom in on a portion of the hole with a specific feature of interest such as a water hazard or a sand trap. These display capabilities are provided by the digital mapping of the course stored in the PROLINK system, and by the real time data supplied by each roving unit to the CMC as to their respective locations on the course.

This digital map of the golf course is created by use of unique differentially-corrected GPS survey techniques that will now be described. The course features are stored and displayed using a vector-based map storage scheme that provides several advantages over standard bit-mapped graphics representations, including advantages of memory storage, scaling, and rotation. The digital map data base for each hole contains all of the important features of the hole, such as the green, fairway, water hazards, sand traps, grass bunkers. rough areas, cart paths, the pin, and so forth. Each feature is mapped by a series of DGPS position measurements around the perimeter of features that cover an area, such as greens or fairways. An analogous process of data collection is performed along the length of linear features such as cart paths. As a result of the survey, a vector list is compiled to describe each feature, including the outline of an area feature, for example.

The vector list is processed to the extent required to remove spurious data points, smooth out jagged outlines, and close the outline of area-type features. Data points which add little or no information to the map may be deleted to reduce the memory storage requirements of the map data base. Course features associated with a particular hole are combined to form a data base for that hole, for display in distinctive colors. A sand trap for example may be sand color, a water hazard depicted as blue, a green as green, and so forth.

Since each feature of the golf course is surveyed individually, the survey can be easily updated when features are changed by the course. For example, tee box and pin locations for each hole can be programmed into the data base as they are changed, which typically would be daily. Features may be added or removed from the map data base to improve detail or reduce clutter as required.

A vector based map storage and display technique as described above has some of the following significant advantages. First, memory storage requirements are reduced relative to other techniques since only the outlines of map features are stored, thereby allowing detailed features to be represented by very few data points. The area features are drawn and filled from these few stored data points at the time the particular features are displayed. In contrast, bit-mapped images require that all of the filled area also be stored. Therefore, significant memory requirements are avoided in the vector based scheme, with the trade-off being a modest amount of computer processing. Yet, the vector based scheme provides comparable high resolution. Second, scaling is also enhanced because in the vector based system, displayed features may be reduced or enlarged on the screen with no loss of information (subject, however, to the resolution of the display). Additionally, a single feature may be displayed at different magnifications. In contrast, bit-mapping requires storage of a separate image for each magnification, if high image quality is to be maintained at higher magnifications. Among other things, this necessitates the availability of considerably more memory than is required for the vector based system. Third, rotation enjoys similar advantages to scaling in a vector based system compared to a bit mapped system. The former easily displays features such as the hole map at different orientations, as desired, depending on the overall shape of the hole. In contrast, bit-mapped images are not readily rotated because the huge computational power is required to rotate the huge amount of data comprising the bit-mapped stored image.

The process of creating the digital map includes collecting differential GPS corrected coordinates around the outline of each object (fairway, green, tee box, etc.) and connecting the points to produce a vector list describing the outline of each object. The survey data are then processed using computer algorithms which smooth the segments, perform data compression, and correct the vector list for crossing vectors and overlapping points. First, the GPS coordinates of a reference point for the course survey data are determined by placing a reference GPS receiver at a point near the golf course. For example, this point may be near the golf clubhouse or the anticipated location of the course management station. The geodetic coordinates (latitude, longitude, altitude) of the referenced receiver antenna do not have to be determined precisely because all survey data is collected relative to this reference point and positioning of the golf carts during subsequent operation of the system is also performed relative to this reference point. By using such a reference point, the need for a precise survey of the reference receiver antenna location is eliminated.

The outline of each object on the golf course is determined by collecting DGPS position data around the perimeter of each object. Objects that are simply linear such as golf cart paths or narrow streams are surveyed by collecting data along them from one end to the other. The output of the GPS receiver as it is moved along the object perimeter are geodetic coordinates at regular time intervals, typically 1 per second. It is understood that universal transverse mercator (UTM) coordinates could also be used instead of geodetic coordinates. These coordinates are stored for later post-processing as will be discussed shortly. Moreover, each object is identified by a unique object number and an object type to determine how it is post-processed and drawn when displayed.

The survey data are corrected for selective availability and atmospheric errors using data collected by the reference GPS receiver. It is understood that any number of differential GPS methods can be used to remove these common errors from the survey data relative to the reference point. Such methods include but are not limited to 1) computing position solutions at the reference station using the same groups of satellites used by the GPS receiver used for surveying where position offsets from the reference point due to the above errors can be used to correct the survey data in real time via a data link or by post processing, or 2) computing range and range-rate corrections for each satellite signal received at the reference point and transmitting these corrections to the GPS receiver used for surveying in real time. This latter technique, referred, in Blackwell, as "method one" DGPS, is by far the most reliable survey method and the one used by PROLINK.

Each of the absolute geodetic coordinates are converted into an x-y grid coordinate. The coordinates for each survey data point is computed as shown in equations 1 and 2.

$$x=(\phi_{survey}-\phi_{ref})(\rho+h_{ref}) \qquad \text{EQN. 1}$$

$$y=(\Lambda_{survey}-\Lambda_{ref})(v+h_{ref})\cos(\phi_{ref}) \qquad \text{EQN. 2}$$

where $\phi$ is latitude, $\Lambda$ is longitude, and h is altitude.

The meridional and prime vertical radii of curvature, $\rho$ and $v$, respectively are computed as shown below:

$$v=a(1-\sin\phi^2_{ref})^{-1/2}$$

$$\rho=a(1-e^2)(1-\sin\phi^2_{ref})^{-3/2}$$

where a and e are the earth semimajor axis and eccentricity, respectively. Once these data are collected and converted into x-y coordinates, a post-processing algorithm is performed on the data as will now be described.

Survey Data Post-Processing Procedure

Figure 16:
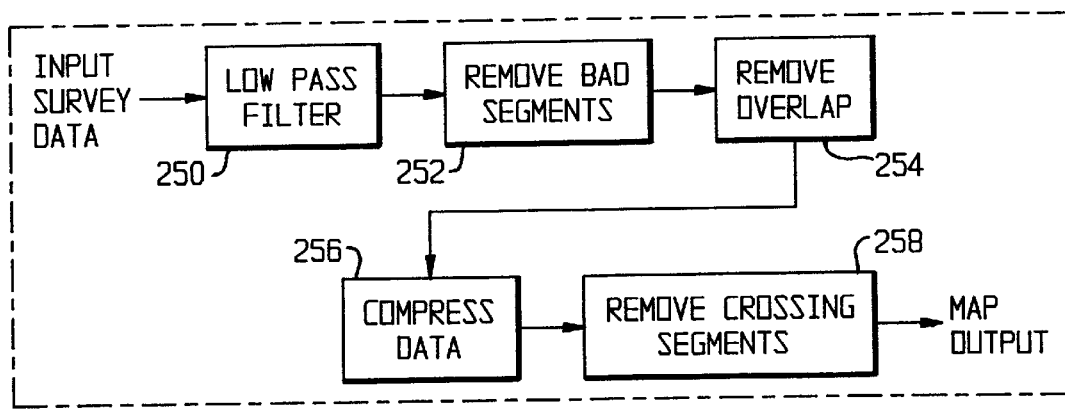
FIG. 16 is a block diagram illustrating a post processing algorithm for use with data obtained from surveying a golf course.

Referring to FIG. 16, a post-processing block diagram is shown. The input survey data are first sent through low pass filter algorithm 250 in order to reduce noise in the data. This filtering smooths the object outline and improves the performance of the subsequent processing steps.

The remove bad segments block 252 performs the removal of spurious data points that may appear in the collected data. This block makes use of the knowledge that the process of slowly tracing the outline of an object will produce true data points no more than a few meters apart such that data farther than a threshold distance from a previous data point can be eliminated from the vector list.

The process of tracing the outline of a closed object typically produces a region where the start and end points overlap. The remove overlap block 254 can be used to reduce the number of survey points in the database by removing the points in an overlapping region since they add no information. The overlap removal is accomplished by removing points from the end of the vector list until the distance from the new end point to the start point stops decreasing. This process is repeated with the start points to insure that all possible points are removed. Typical results of the overlap removal algorithm are shown in FIG. 17.

The compressed data block 256 makes use of the fact that the outline of an object is drawn as a series of straight line segments (vectors) to remove data points (segment vertices) where the object outline is relatively straight, but retain points where the outline curvature is relatively significant. To that end, data points are removed from the outline of an object until the error in the outline becomes greater than a predetermined maximum allowed distance for that object. For example, the accuracy of the fairway outline is not as critical as that of the green because the system always displays fairways at low magnification levels such that small errors in the outline are invisible to the user. The green, on the other hand, can be shown magnified and thus the detailed curvature of the green must be accounted for.

Figure 19A:
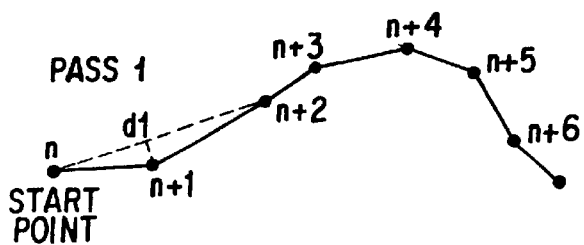
FIGS. 19A–F are pictorial diagrams illustrating the results of a portion of the post processing algorithm for compressing data.
Figure 19B:
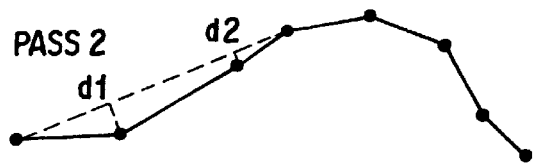
Figure 19C:
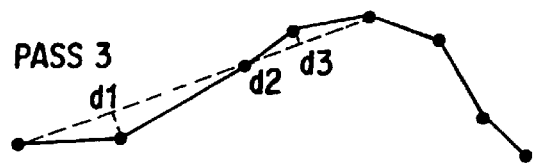
Figure 19D:
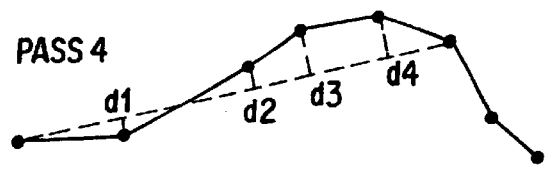
Figure 19E:
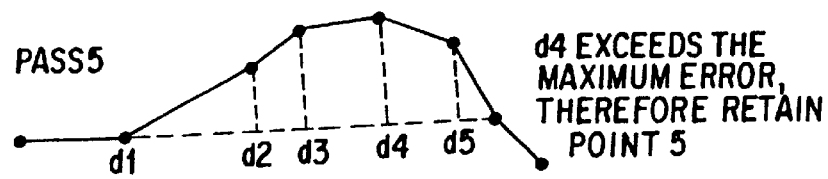

Referring to FIGS. 19A–F, an example of the data compression algorithm is illustrated. From a start point in the vector list, a vector is constructed to each subsequent point in succession until the distance between any of the intervening points and the vector becomes greater than the predetermined limit for that object. If this condition is detected for a vector from the start point, N, to N+5, then points N+1, N+2, N+3 are discarded and point N+4 is retained. Referring to FIG. 19A–G, passes 1–5 show the succession of vectors constructed from the start point to each successive point in the perimeter (points N+2 through N+6). In FIG. 19E (pass 5), the distance D4 from the line to point N+4 is greater than the maximum predetermined distance. As a result, points N+1 through N+4 are discarded and point N+5 is retained.

Figure 19F:
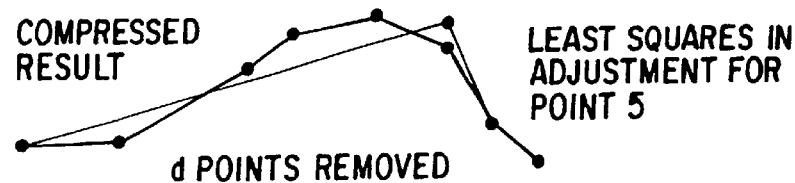

In order to improve the accuracy of the compressed data a least squares fit may be performed on the data points to be discarded and the first point to be retained. The best fit line to these data points is used to adjust the location of the point to be retained. The result of the least squares fit in this example is shown in FIG. 19F where the location of point N+5 is adjusted upward so that the vector connecting points N and N+5 minimizes the error between it and the discarded points.

This process is again repeated using the end point from the last compression step as the new starting point until the end of the perimeter vector list is reached.

Additionally, noise in the survey data can produce object perimeters which can contain segments which cross each other. Although smoothing and compression will usually eliminate these crossing line segments, those which pass are removed via removed crossing segments block 258. Referring to FIG. 18, an example of a crossing line condition is shown. Remove crossing segments block will detect such crossing segments and all of the data points between the crossing segments are replaced by the vertex of the crossing segments. The results of removed crossing segments block are shown in FIG. 18.

The survey data are converted for display on both the CMC monitor 54 and the cart monitors 19, by shifting, scaling and rotating the map data. The north and east vector coordinates of the objects are offset such that one hole or group of holes are coordinatized with respect to the upper left corner of the display. The shifted points are multiplied by a scale factor so that features which may be hundreds of yards long are reduced to fit on a 640×480 pixel screen. For the cart display, hole maps are typically rotated so that the tee box of the hole is at the bottom of the screen and the green is at the top. CMC displays are typically rotated so that the map is oriented with north at the top of the screen.

The accuracy of the map display cart correlation is better than two yards. If the scale is one yard equals one pixel on the computer screen, the cart is so accurately correlated on the hole depicted on the screen to its actual location on the hole on the course, that the error is a margin of only three pixels. Such an error is almost imperceptible on the screen. This important innovation of the system of the invention is less a function of the correlation algorithms than of the accuracy of the unique surveying process used to create the digital map.

In this manner, the outline of a golf course including the fairways, the greens, the tee boxes and various hazards such as sand traps, water and trees can be stored into memory by using vectors as described above in a very efficient and accurate manner.

Zone Detection Algorithm

Once the outline of the golf course has been obtained and stored in the manner described above, such data can be used to generate an efficient method for determining and detecting the location of a golf cart within various zones or regions of the golf course. Such a zone detection algorithm is necessary to implement system features such as the automated hole display sequencing, whereby color monitor 19 of the golferxs cart automatically displays the current hole being played, and the speed/pace of play timing both of which require knowledge of where the golf cart is relative to important zones/regions within the golf course such as a particular tee zone or green zone.

The PROLINK system is based on a concept of "zones" which can be defined geometrically such as by a circle, an ellipse or a rectangle. The zone is created by encompassing the area of interest with one or more of the desired geometric shape. With this mathematical description of each area via the zone shapes, the coordinates of a golf cart can be compared against each zone to determine whether or not the golf cart is inside a specific zone, and hence in a specific area of interest. As an example, a rectangular zone shape is very efficient for this application. A rectangle on the golf course map can be described on an x-y coordinate grid by its center (X0, Y0), semi-major and semi-minor axis DX and DY, and rotation angle a of the semi-major axis with respect to the survey grid x axis. Given the specific coordinates of a golf cart as denoted by (x,y), as determined by the cart's GPS system and corrected by the cart's computer system, it can be determined if a golf cart is inside the rectangular zone using the following equations.

$$dx = (x-X0)\text{Cos}(\alpha) + (y-Y0)\text{Sin}(\alpha)$$

$$dy = (y-Y0)\text{Cos}(\alpha) - (x-X0)\text{Sin}(\alpha)$$

If the absolute values of dx and dy are respectively less than DX and DY, then the golf cart is inside the rectangle and hence inside the area of interest. To improve computation speed, the sine and cosine of the rotation angle α may be computed a priori and stored in memory. Moreover, the algorithm can be formulated to use scaled integer arithmetic to further improve speed.

By the use of such zone detection algorithms, the PROLINK system has the capability to determine when a golf cart enters any predetermined zone within the golf course. Accordingly, the feature of automatic hole sequencing can be accomplished whereby when the system detects that the golf cart leaves the green area of hole 1 and subsequently enters the tee box area of hole 2, the stored outline of hole 2 can be automatically displayed on the color monitor of the golf cart. Moreover, the feature of automatically displaying high resolution color advertisements as the cart travels from one hole to the next may be implemented by detecting when the golf cart has just exited an area associated with the green region of a hole and is in transition to the tee box region of the subsequent hole. Additionally, the feature of automatically determining and recording a golfer's pace of play for a hole may be accomplished by starting a timer when the golf cart enters the tee box region associated with a hole and stopping the timer when the golf cart leaves or exits the green region associated with that hole. This feature and algorithm will be discussed in more detail later.

Operation of Cart-Based Units

Figure 23:
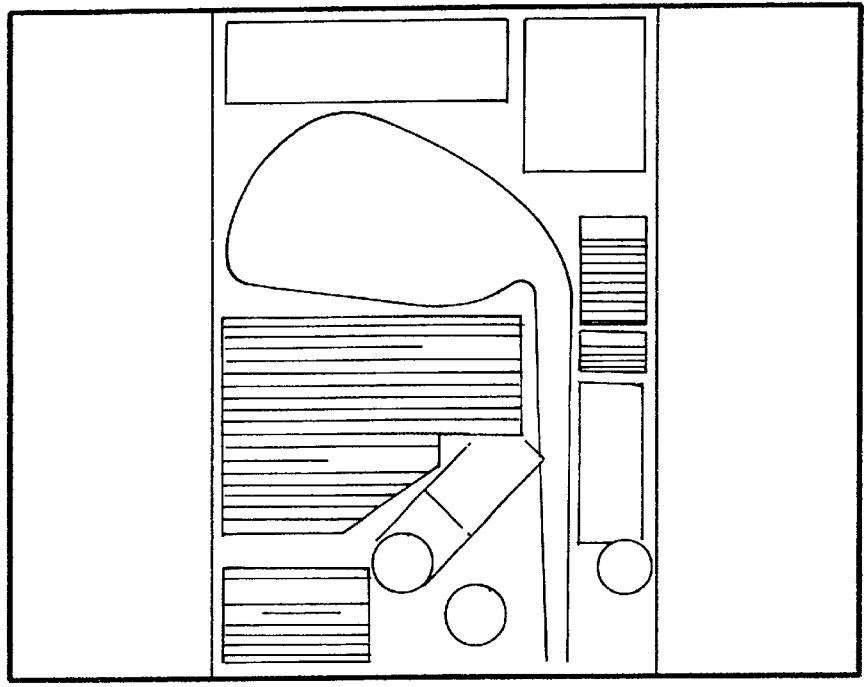
FIG. 23 is a pictorial diagram illustrating an advertisement for displaying on a monitor of the cart.

In the preferred embodiment of the PROLINK system, the cart CRT monitor 19 provides a full color graphic display in up to 256 colors in 640×480 pixels. As the cart approaches a hole to commence play—at least for the first hole—the cart monitor may, for example, display the course logo and a promotional message for the course or an advertisement for a particular manufacturer's golf clubs by accessing data stored in memory as shown in FIG. 23. Alternatively, the base station may transmit promotional messages or advertising messages globally to all carts on the course, which would be displayed in pop-up windows subject to priority given to pop-ups featuring golf tips for the hole.

When the cart is within a predetermined distance of the tee box for play of a hole, the golfer may press a "PRO TIP" button on the console. The system responds with a pop-up window on the display monitor that furnishes a set of recommendations or suggestions for play of that hole provided by the course professional (the course "pro"). Exemplary displays might be: "Watch sand traps on right side of fairway during drive," or "This green is shared with hole 16—approach fuller part of green." This "PRO TIP" function is illustrated in FIG. 21.

After reviewing the pro tips for the hole, the golfer would want to view the reading of yardage to the pin on the cart monitor, for selection of the appropriate club to drive from the tee. The calculation of the yardage to the pin is readily calculated by the cart's PCU using the received GPS data in a well-known manner.

In addition, the golfer may view the range from the roving unit location to points selected by the course pro as key points of interest for play of the hole. These are shown on the digital map of the hole when it is displayed on the cart monitor screen. FIG. 20 illustrates examples of range points on hole 3 of the course, such as to a particular point of a water hazard (263 yards) and to the near and far ends of a sand trap (98 yards and 284 yards, respectively). Moreover, FIG. 20 illustrates the display of the "YARDAGE TO PIN", in this case 321 yards. The golfer's position is represented on the display by a white triangle, shown at the bottom of FIG. 20 where, in this example, the golfer is positioned to drive his first ball from the blue tee box. The specific ranges and graphics displayed on the screen give the player important information for avoiding hazards which are not be visible with the naked eye from the tee box.

The golfer can also use the yardage cursor arrow in the PROLINK system to determine the best lay up shot. In the example of FIG. 20, distances from the white triangle to various locations of the golf course as well as to the yardage arrow are shown. Thus, the golfer has considerable range information available to enable strategic planning of each shot.

Next, the golfer "zeroes" the carry distance, i.e., to cancel out any previously accumulated range yardage for the last (and any earlier) shot. After the carry distance is zeroed, the golfer hits his shot from the tee. As the player drives his cart to the new location of the ball (the lie), the carry distance is displayed as a continuously increasing incremental count from zero. When the cart arrives at the ball location from the tee shot, it is an accurate measure, typically within three yards or less, of the distance covered by the last drive (i.e., the carry distance).

In preparation for the next shot, the range points and yardage are viewed again. If the hole is short, the golfer may begin an approach to the green at this point. For a longer hole the player would now set up for another drive.

At any time during play, the course manager has the capability to send a message to any or all golfers on the course from the clubhouse. Such messages when transmitted appear in one or more pop-up windows on the monitor screen of the cart assigned to the player(s) for whom they are intended. In that respect, they are similar to the "PRO TIP" window of FIG. 21, except that the message in the window in this instance is transmitted from the base station. For example, a typical message to all golfers on the course (and thus shown on all active cart screens) might be: "Clear the course, there is lightning in the area," or a private message to a certain player might be: "Mr. Jones, call your office."

The PROLINK system of the cart may also be used by the player to request or otherwise advise the clubhouse of the need for a service attendant, such as for the refreshment cart or for cart repair or replacement, or for a ranger, or for a medical emergency.

Figure 22:
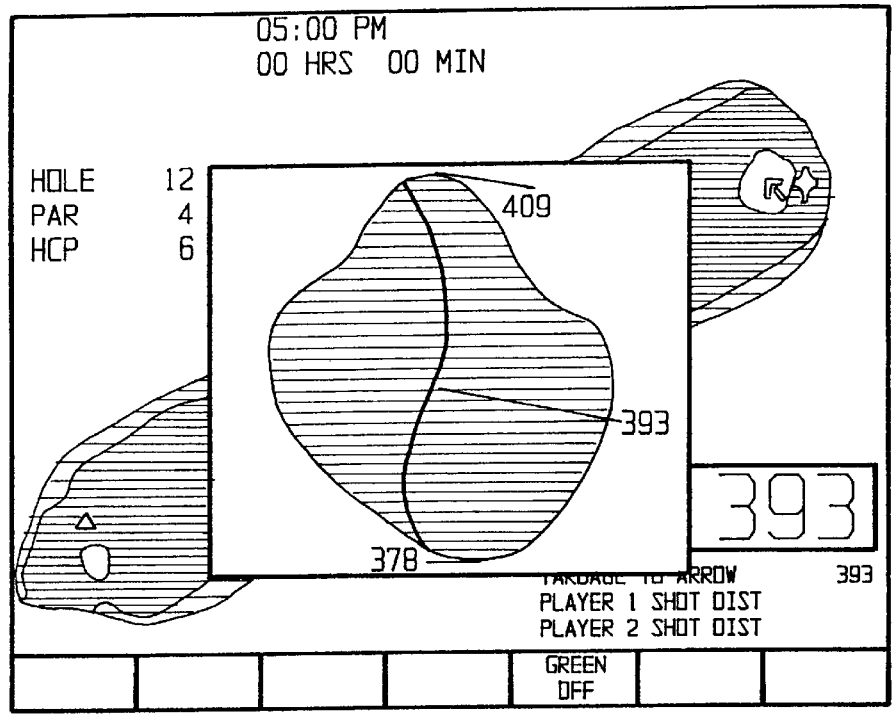
FIG. 22 is pictorial diagram illustrating the green zoom function for displaying an enlarged version of a green on a monitor of the cart.

When the golfer has a green approach shot on a hole, a zoom function may be activated to provide a blowup (enlarged version) of the green itself in a considerably larger size in a window of the same dimensions as those of either of the message or play tips windows as shown in FIG. 22. The displayed yardage may be to key points such as to the front of the green, the back of the green, and the pin. The display of the green includes contour lines 301 that indicate the slope of the green, as additional information to the golfer to play his approach shot or his putt. This information allows the golfer to determine whether the putt should be made, for example, to undershoot the pin because of the direction of slope of the green, and to avoid an unfavorable lie on an overshoot attributable to the contour of the green in that area.

After completing the putting on the green, the cart is driven to the next hole. By the use of the zoning algorithm as discussed above, a high resolution color advertisement may be automatically displayed, as illustrated in FIG. 23, during the transition time of the cart leaving the green area of one hole and. traveling to the tee box area of the next subsequent hole, without need for intervention by any person, and triggered solely by the PROLINK system's capability to identify the precise location of the cart on the course. The advertisement might be displayed on the screen for a period of 30 seconds. for example, extolling the virtues of a particular automobile, golf clubs, sister golf course under the same course management, or other subject matter. This display advertising capability to a captive audience as the cart is moving between holes or at the beginning or end of the round, provides the course with an additional revenue opportunity. The ability to display such high resolution color graphics is partly attributable to the PROLINK'S very large memory map, e.g., 16 megabytes (MB), and by virtue of the use of a Motorola 68332 processor. Additionally, CPU card 18 (of FIG. 13) contains 2 MB of flash memory (146) whereby a major function of the flash memory is to hold the full color (256 colors maximum) ads that are displayed to the golfer during the transition between holes. Furthermore, it is understood that additional memory may be added to store additional advertisements.

Algorithm for Improving Yardage Accuracy

As mentioned earlier, the 5 meter accuracy that is typically attainable with DGPS still represents considerable error from the viewpoint of the golfer seeking to determine yardage from his or her ball lie to pin placement on the hole. Accordingly, the PROLINK system employs an unique filtering algorithm for reducing the remaining error so as to obtain position accuracy of less than 2 meters as will now be described.

By way of background, it is well known that GPS receivers make independent range and range-rate measurements for each tracked satellite. In typical GPS receiver navigation data processing algorithms, the range measurements are primarily used to estimate the position of the receiver, and the range-rate measurements are primarily used to estimate the velocity of the receiver. Range measurements, however, are typically more noisy than range-rate measurements and are more susceptible to multipath errors. Therefore, the use of velocity estimates from a GPS receiver is typically a better choice than position estimates.

Furthermore, the navigation performance of a DGPS systems depends on the characteristics of the rogue GPS receiver and the DGPS corrections generated by the base station GPS receiver. Typical methods of generating differential GPS pseudo-range and range-rate corrections involve computing the clock offset of the base station receiver from all or a subset of the satellites being tracked and removing this common bias from all of the computed DGPS corrections. However, a problem with this approach is that when the set of satellites used to compute the clock offset varies, the clock offset estimate correspondingly varies. This leads to a corresponding instantaneous change in the DGPS pseudo-range corrections, the magnitude of which can be as large as 200 meters. Accordingly, typical rogue GPS receivers, which contain navigation algorithms to support a wide variety of vehicles, will correspondingly produce a transient position errors on the order of 10 to 20 meters due to the change in the pseudo range corrections. Additionally, these instantaneous correction changes can occur as frequently as once every 30 minutes. However, depending upon the mechanization of the base station GPS receiver, there may be relatively little or no change in the range-rate correction, producing little or no velocity error from the rogue GPS receiver.

Figure 24:
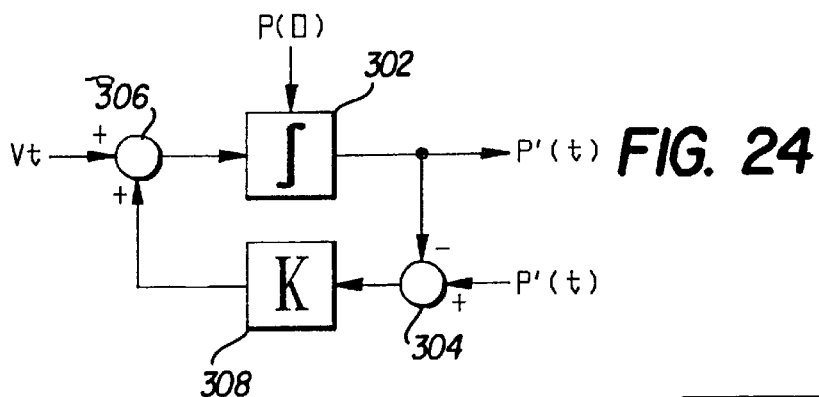
FIG. 24 is a detailed block diagram illustrating a complementary filter for blending position data with velocity data to improve position accuracy of the PROLINK system.

Accordingly, since GPS velocity data is typically better than position data, the PROLINK system uses velocity data to reduce position errors. This is accomplished through a filtering mechanism known as a complementary filter. Referring to FIG. 24, a block diagram illustrating complementary filter 301 for blending position data with velocity data to improve position accuracy is shown. Such a filter is used in the X and Y horizontal axes; the PROLINK system does not display altitude data, so special filtering is not performed in the Z axis. In operation, measured velocity, V, which is a function of time, is integrated via integrator 302, to produce an estimate of position as denoted by P'. The difference between the measured position (P) and the estimated position (P') is calculated via subtractor 304 when P and P' are also functions of time. This difference is then fed back to adder 306 to correct the measured velocity via feedback gain element 308. A low feedback gain gradually blends position measurements to correct slow drift in the position estimate from the integrated velocity. A value of K between 1/30 and 1/50, for example, provides a good balance between position and velocity measurement errors for a low dynamic vehicle such as a golf cart.

Zero Velocity Filter Algorithm

The PROLINK system additionally includes a range display filtering mechanism for insuring that the display provides a fixed constant yardage readout when the golf cart is not moving. For a yardage measurement system, the golfer expects to see a constant yardage readout when the golf cart is not moving. However, without special processing, the yardage estimate may change slightly due to measurement noise even though the golf cart is stationary. The PROLINK system solves this problem by utilizing a unique zero velocity filtering algorithm for freezing the yardage readout when the golf cart is detected to be stationary.

To that end, the PROLINK system utilizes the fact that electrically-powered golf carts typically have a minimum speed when under power on level ground. Slightly depressing the pedal turns the electric motor on at a minimum RPM (revolutions per minute). The minimum speed is roughly 0.15 meters per second, which is above the typical velocity magnitude error for differential GPS navigation systems. The PROLINK system uses a filtering algorithm that averages a number of past velocity measurements, for example 4, such that if the output of the filter is below 0.15 meters per second, the golf cart is assumed to be stationary and the display of yardage is frozen on the screen. Therefore, when the golf cart is stationary, the user always observes a yardage readout that is constant and does not flicker between two or more different readouts.

Golf Pace-Of-Play Timing Algorithms

By making use of the zone detection algorithm, the PROLINK system has the capability to determine the length of time it takes a golfer to play a hole, a selected plurality of holes, or an entire round of golf. The PROLINK system allows the capability of both the golf cart and the course management system to keep track of the play time using similar algorithms. Briefly, the course management system displays a running timer for each golf cart for the current hole and the round and play times for each hole completed. The golf cart computes the play times for each hole and transmits its times to the course management system. The course management system stores the play speed data for each golf cart so that it may be analyzed off-line.

Golf is typically played by moving from tee to green and then to the tee of the next hole. By making use of this fixed sequence of events and the previously described zoning algorithm, the play speed times for each hole can be computed. Referring back to the zoning algorithm, the PROLINK system has defined predetermined zones or regions around the tee boxes and greens (as well as other objects) of each hole to encompass the areas where players usually park their carts while teeing off and putting. The zone detection algorithm may be used to determine if the cart is near a tee or a green. The time required for the golf cart to move from the tee box of a hole to the tee box of the next subsequent hole is the play time for that hole. Time is kept for each hole by using the CPU clock which, as previously described, is calibrated with GPS time from the GPS receiver.

The algorithm in place on the golf carts operates in the following manner. When the algorithm detects that the golf cart has entered the zone of a tee box associated with the current hole being played, the play timer is started. The algorithm then waits for the golf cart to enter the green zone of such current hole and for the cart to remain in that zone for a predetermined minimum period of time, for example, 15 seconds. This time period must be long enough to prevent it from being exceeded by simply driving the cart through the green zone, but it must be shorter than the minimum time required to putt. After the cart spends the required time in the green zone, the algorithm expects the cart to enter the tee zone of the next subsequent hole. When this occurs, the play timer for the hole is stopped and a timer for the next hole is started. Additionally, the cart transmits the time of the completed hole to the course management system.

The tee zone of the first hole played, however, is treated uniquely by the algorithm because the cart did not enter and remain, for a predetermined time, in a green zone of a previous hole. Therefore, with respect to the first hole, the cart must spend a predetermined minimum time in the tee zone of the first hole to ensure that the play timer does not inadvertently start if the cart is driven through the tee area of the hole. After the cart has been in the initial tee zone for the predetermined minimum period of time, the play timer is started when the cart leaves the zone. In this manner, the play time for the first hole being played does not include the time spent waiting for previous groups of golfers to tee off.

The course management system also runs play speed timers for all active golf carts in order to provide a real time display of play time for the current hole as well as cumulative play time for all holes played. The algorithm of the course management system is a simpler version of the one used by the golf carts. A timer is started for a cart when its reported position is in a tee zone. After a cart spends a minimum time in the tee zone, the algorithm expects the cart to appear in the tee zone of another hole. Accordingly, when that cart spends the predetermined minimum time in that new tee zone, the time for the original hole is stored and the timer is restarted for the next hole. If the cart leaves a tee zone before the predetermined minimum time has expired, the hole timer is reset and the algorithm waits for the cart to enter any tee zone. When a play time for a hole is received from a cart, any time for that hole previously computed by the course management system is overwritten, since the cart computed time, which is based on a more rigorous algorithm, is assumed to be more accurate. Additionally, the course management system also runs a full round timer. This timer starts when the course management system starts the hole timer on the first hole played by the cart. This full round timer is corrected using the hole play times received from the cart to correct for any errors in the start time.

Referring to FIG. 25, a display on the color monitor 54 of CMC 41 illustrates the times for the current hole being played, the completed holes, and the cumulative time for the round for each active golf cart. The cart (car) number is shown on the left side of the display, the times for each hole played are shown to the right of the cart and target time for each hole is shown along the top. At the far right of the display, the total round time, the target time for the holes played and the time behind or ahead of the target time is shown. When hole or round times exceed the target play times, the cart symbols on the map can be highlighted or the colors for that display can be changed thereby allowing the operator to quickly identify slow playing carts.

Mounting of Color Monitor in the Golf Carts

As discussed above, cart based monitor 19 has the capability to provide fill color maps of the course being played to the golfer. This allows the golfer to clearly see a layout of the golf hole being played, including all objects within the course such as the tee boxes, the fairways, the green, water hazards and sand traps. Moreover, cart based monitor 19 also has a capability to provide full color high resolution graphics for use in advertising. Accordingly, one of the features of the PROLINK system is to provide a color monitor screen that is readable in the bright sunlight that is typically encountered on a golf course.

Cost effective color display sunlight readability is one of the most difficult technical problems today. However, the PROLINK system provides an unique technique for providing high resolution color graphics with sunlight readability. To accomplish this feature, the PROLINK system is located in the roof of a golf cart. Such a roof location provides unobstructed access to the PROLINK system while at the same time making the system non-intrusive to the golfer by preserving the full 360° field of view of the golf course from the golf cart. More importantly, the roof mounted design provided shade for the color monitor so that the golfer was not viewing the display with a bright sunlight background.

Additionally, the underside of the golf cart roof is colored black and has a diffuse coating for scattering light. The color black significantly improves the effective display contrast while the diffuse coating significantly reduces the reflectivity of the roof underside.

Figure 26:
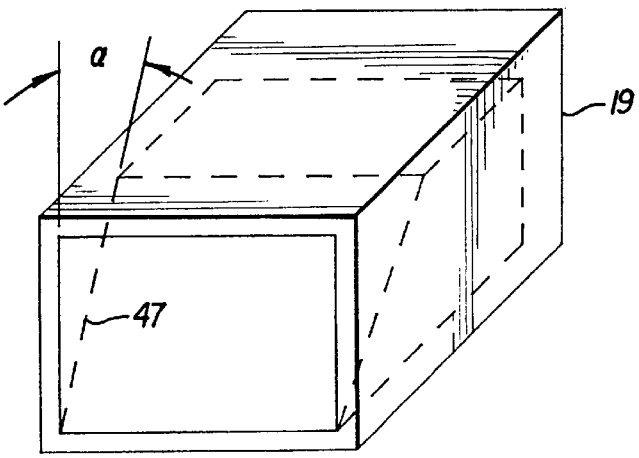
FIG. 26 is a pictorial diagram illustrating the mounting of a monitor to the roof of a golf cart for promoting enhanced sunlight readability.

Moreover, referring to FIG. 26, screen 47 of color monitor 19 is canted back by a predetermined angle ($\alpha$), for example, 7.5°, by the bezel that surrounds the screen such that the screen is titled away from the golfer. This requires an angle of incidence of a light ray entering the golf cart to be near horizontal for the light ray to reflect off the display and into the golfer's eyes. The likelihood of a near horizontal light ray is very small compared to the likelihood of a light ray coming in at a different angle. Accordingly, this results in substantially reduced glare.

Finally, the PROLINK system makes use of a high brightness 7.5 inch diagonal Sony Trinitron Cathode Ray Tube (CRT) for color monitor 19 to be used in each of the golf carts. A CRT has a higher luminance than any other cost effective display. For example, the CRT costs about $700 but an equivalent brightness Liquid Crystal Display (LCD) with a strong back light costs approximately $2000. However, as technology advances and costs are reduced, it is likely that LCD technology would be suitable, i.e., bright enough, for the PROLINK cart color monitor.

Although a preferred embodiment and method have been described to illustrate the best mode presently contemplated of practicing the invention, it will be apparent to those skilled in the relevant art that variations and modifications may be made without departing from the true spirit and scope of the invention. Accordingly, it is intended that the invention be deemed limited only to the extent required by the appended claims and the rules and principles of the relevant law.

What is claimed is:

1. A golf cart adapted to support an occupant, said cart having a roof with an underside, a video display monitor mounted on the underside of the roof in a position for ease of viewing by the occupant in sunlight and without substantially interfering with the occupant's view forward of the cart.

2. The golf cart of claim 1, wherein the underside of the roof has a flat black coating applied thereto for ease of viewing by the occupant in sunlight.

3. The golf cart of claim 1, wherein the video display monitor has a screen and a black bezel surrounding the screen.

4. The golf cart of claim 1, wherein the video display monitor is a color monitor that displays video images in color.

5. The golfcart of claim 1, wherein the video display monitor has a screen, the cart comprising a component of a system for use in determining the relative position of and distance between objects on a golf course, said video display monitor displaying the objects on the screen.

6. The golf cart of claim 1, wherein the cart has a seat for the occupant and the roof has a forward portion and a rearward portion, the video display monitor being mounted to the underside of the roof at the forward portion thereof and forwardly of the seat for ease of viewing by the occupant.

7. A golf cart having a seat and a roof with an underside, a video display monitor having a screen and being mounted at the underside of the roof forward of the seat in a position for ease of viewing by an occupant in the seat and without substantially interfering with the occupant's view forward of the cart, the underside of the roof having a flat black coating for ease of viewing the screen of the monitor in sunlight.

8. The golf cart of claim 7, wherein the video display monitor is a color monitor that displays video images in color.

9. A golf cart adapted to support an occupant, said cart having a roof with an underside, a video means for displaying objects on a golf course, the video means being mounted on the underside of the roof in a position for ease of viewing by the occupant in sunlight and without substantially interfering with the occupant's view forward of the cart.

10. The golf cart of claim 9, wherein the objects comprise tee boxes, fairways, greens, cups and hazards of the golf course.

11. The golf cart of claim 10, wherein the cart comprises a component of a system for use in determining the relative position of and distance between objects on a golf course.

* * * * *